United States Patent
Penilla et al.

(10) Patent No.: US 10,210,487 B2
(45) Date of Patent: *Feb. 19, 2019

(54) SYSTEMS FOR INTERFACING VEHICLES AND CLOUD SYSTEMS FOR PROVIDING REMOTE DIAGNOSTICS INFORMATION

(71) Applicant: Emerging Automotive, LLC, Los Altos, CA (US)

(72) Inventors: Angel A. Penilla, Sacramento, CA (US); Albert S. Penilla, Sunnyvale, CA (US)

(73) Assignee: Emerging Automotive, LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/786,578

(22) Filed: Oct. 17, 2017

(65) Prior Publication Data
US 2018/0089912 A1    Mar. 29, 2018

Related U.S. Application Data

(63) Continuation of application No. 15/615,812, filed on Jun. 6, 2017, now Pat. No. 9,818,088, which is a
(Continued)

(51) Int. Cl.
*G06Q 10/00* (2012.01)
*G01M 17/007* (2006.01)
(Continued)

(52) U.S. Cl.
CPC .......... *G06Q 10/20* (2013.01); *G01M 17/007* (2013.01); *G06Q 10/06314* (2013.01);
(Continued)

(58) Field of Classification Search
CPC .. G06Q 10/20; G06Q 10/06314; G06Q 30/08; G06Q 10/1095; G06Q 30/0611;
(Continued)

(56) References Cited

U.S. PATENT DOCUMENTS 3,690,397 A   9/1972  Parker
3,799,063 A   3/1974  Reed
(Continued)

*Primary Examiner* — Nha T Nguyen

(57) ABSTRACT

A system of a vehicle is provided. The system includes a wireless communication device for providing the vehicle with access to a network for exchanging vehicle condition information with a server. An on-board computer of the vehicle is configured for interfacing with vehicle systems and said wireless communication device. The on-board computer is configured to process input received from at least one vehicle interface of the vehicle and processing output via at least one vehicle output of the vehicle. The on-board computer is programmable to access a user account that is used to interface with said server. The wireless communication device is configured to send vehicle data, based on settings in the user account, to the server over the network for vehicle status information. The vehicle status information is for one or more vehicle systems of the vehicle. The server is configured to access at least one database that include diagnostics data for a vehicle type of the vehicle and crowd sourced data for the vehicle type. The crowd sourced data includes comments received from one or more users of vehicles of the vehicle type that relate to the vehicle status information and related to one or more vehicle systems of the vehicle. The server is configured to process the comments to identify a condition derived from the comments related to substantially similar circumstances associated with a condition of the vehicle. The server is configured to automatically process the vehicle data that is received against the diagnostics data and the crowd sourced data. The processing is configured to select an alert from among a plurality of possible alerts, and the alert is selected for the condition of a vehicle system of the one or more vehicle systems of the vehicle. The on-board computer is configured to output data using the at least one vehicle output regarding the alert selected for the condition of the vehicle.

9 Claims, 41 Drawing Sheets

Related U.S. Application Data continuation of application No. 14/176,138, filed on Feb. 9, 2014, now Pat. No. 9,697,503, which is a continuation-in-part of application No. 14/063,837, filed on Oct. 25, 2013, now Pat. No. 9,139,091, which is a continuation-in-part of application No. 13/842,158, filed on Mar. 15, 2013, now Pat. No. 9,229,905, said application No. 14/176,138 is a continuation-in-part of application No. 13/452,882, filed on Apr. 22, 2012, now Pat. No. 9,123,035.

(60) Provisional application No. 61/896,007, filed on Oct. 25, 2013, provisional application No. 61/745,729, filed on Dec. 24, 2012, provisional application No. 61/478,436, filed on Apr. 22, 2011.

(51) Int. Cl.
  *G06Q 30/08* (2012.01)
  *G06Q 10/06* (2012.01)
  *G06Q 10/10* (2012.01)
  *G07C 5/00* (2006.01)
  *G07C 5/08* (2006.01)
  *G06Q 30/02* (2012.01)
  *G06Q 30/06* (2012.01)
  *H04W 4/02* (2018.01)

(52) U.S. Cl.
  CPC ......... *G06Q 10/1095* (2013.01); *G06Q 30/08* (2013.01); *G07C 5/006* (2013.01); *G07C 5/0808* (2013.01); *G06Q 30/0282* (2013.01); *G06Q 30/0283* (2013.01); *G06Q 30/0611* (2013.01); *G07C 5/008* (2013.01); *H04W 4/023* (2013.01)

(58) Field of Classification Search
  CPC .......... G06Q 30/0283; G06Q 30/0282; G01M 17/007; G06C 30/08; G07C 5/0808; G07C 5/006; G07C 5/008; H04W 4/023
  See application file for complete search history.

(56) References Cited

U.S. PATENT DOCUMENTS

| | | | |
|---|---|---|---|
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diler et al. |
| 5,488,283 A | 1/1996 | Dougherty et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestmanm et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,850,898 B1 | 2/2005 | Murakami |
| 6,915,869 B2 | 7/2005 | Botti et al. |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |

(56) References Cited

U.S. PATENT DOCUMENTS

| | | |
|---|---|---|
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,747,648 B1 * | 6/2010 | Kraft .................. G06F 17/30604 707/790 |
| 7,751,945 B2 | 7/2010 | Obata |
| 7,778,746 B2 | 8/2010 | McLeod et al. |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 2002/0064258 A1 | 5/2002 | Schelberg et al. |
| 2002/0085043 A1 | 7/2002 | Ribak |
| 2002/0103582 A1 * | 8/2002 | Ohmura .................. G07C 5/008 701/31.4 |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0195301 A1 * | 8/2008 | Fabre .................. G08G 5/0021 701/120 |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichai et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |

(56) References Cited

U.S. PATENT DOCUMENTS

| | | |
|---|---|---|
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0238258 A1* | 9/2011 | Singh .................. G07C 5/0808 701/31.4 |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0066010 A1* | 3/2012 | Williams ........... G06Q 10/0633 705/4 |
| 2012/0074903 A1 | 3/2012 | nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Trucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran et al. |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

* cited by examiner

User 1

| User 1 Logins | User 1 Roles | User 1 Vehicles |
|---|---|---|
| • Administrator(edit)<br>Add New | • Owner(edit)<br>• Weekend driving(edit)<br>• Commute driving(edit)<br>Add New | • Ford SUV(edit)<br>• Honda Hybrid(edit)<br>Add New |

User 2

| User 2 Logins | User 2 Roles | User 2 Vehicles |
|---|---|---|
| • Child(edit) | • School commute(edit)<br>• Errands(edit) | • Honda Hybrid |

User 1

| User 2 Logins | User 2 Roles | User 2 Vehicles |
|---|---|---|
| • Child(edit)<br>Add New | • School commute(edit)<br>• Errands(edit)<br>Add New | • Honda Hybrid<br>Add New |

FIG. 2

User 2

| User 2's login settings for login: CHILD ||
|---|---|
| Fuel use settings | • Electric battery<br>• Plug in<br>• Fuel<br>• Hybrid |
| Driving characteristics | • Speed restrictions<br>• Fuel use restrictions |
| Location based settings | • GPS aided travel restrictions<br>• Map restrictions<br>• Travel radius boundaries<br>• Dynamically load maps<br>• Dynamically load directions<br>• Dynamically load fuel<br>• Dynamically load charge<br>• Dynamically load battery<br>• Fuel purchase location restrictions |
| Time based use and restrictions | • Day driving<br>• Night driving<br>• Time specific driving |
| Automatic purchase settings | • Financial institution linking<br>• Fuel purchase settings<br>• Charge time purchase settings<br>• Battery purchase settings<br>• Car wash purchase settings |

User editable

Admin or restricted

FIG. 4

User 2

| User 1's login settings for login: CHILD | |
|---|---|
| Tracking & metrics | • Vehicle cameras<br>• Vehicle event recording<br>• Mileage usage characteristics<br>• Top & average speeds<br>• Driving history maps and graphs<br>• Fuel efficiency<br>• Wear and tear notifications |
| Comfort | • Climate<br>• Seats positions<br>• Seat heater / cooler<br>• Suspension/ride settings<br>• Entry lighting<br>• Remote start / stop |
| Entertainment | • Radio Memory<br>• Internet access settings<br>• Streaming services |
| Driving Modes | • Sport<br>• Comfortable<br>• Soft<br>• Off-road<br>• High performance<br>• Economy |
| Refueling routing and purchase | • Incentive based fuel finder<br>• Refueling availability maps<br>• Offers<br>• History<br>• Metrics |

User editable

Admin or restricted

FIG. 5

Manufacturer API ⌐130
Class:
HVAC

↙1950

1954 ⌐ Data declarations:
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 1956 ⌐ Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

104
↘EZ FUN HVAC APP
1972
↘updateTemp(80,76);
{
    setLeftTo = 80;
    setRightTo = 76;
    theCurrentTempR = getTempRight(temp);
    theCurrenTempL = getTempLeft(temp);
    if setLeftTo != theCurrentTempL
    {
        setTempLeft(left);
    }
    if setRightTo != theCurrentTempR
    {
        setTempRight(right);
    }
    updateDisplay()

If isError()
    {
        return isError();
    }

Learned Behavior Vehicle Application

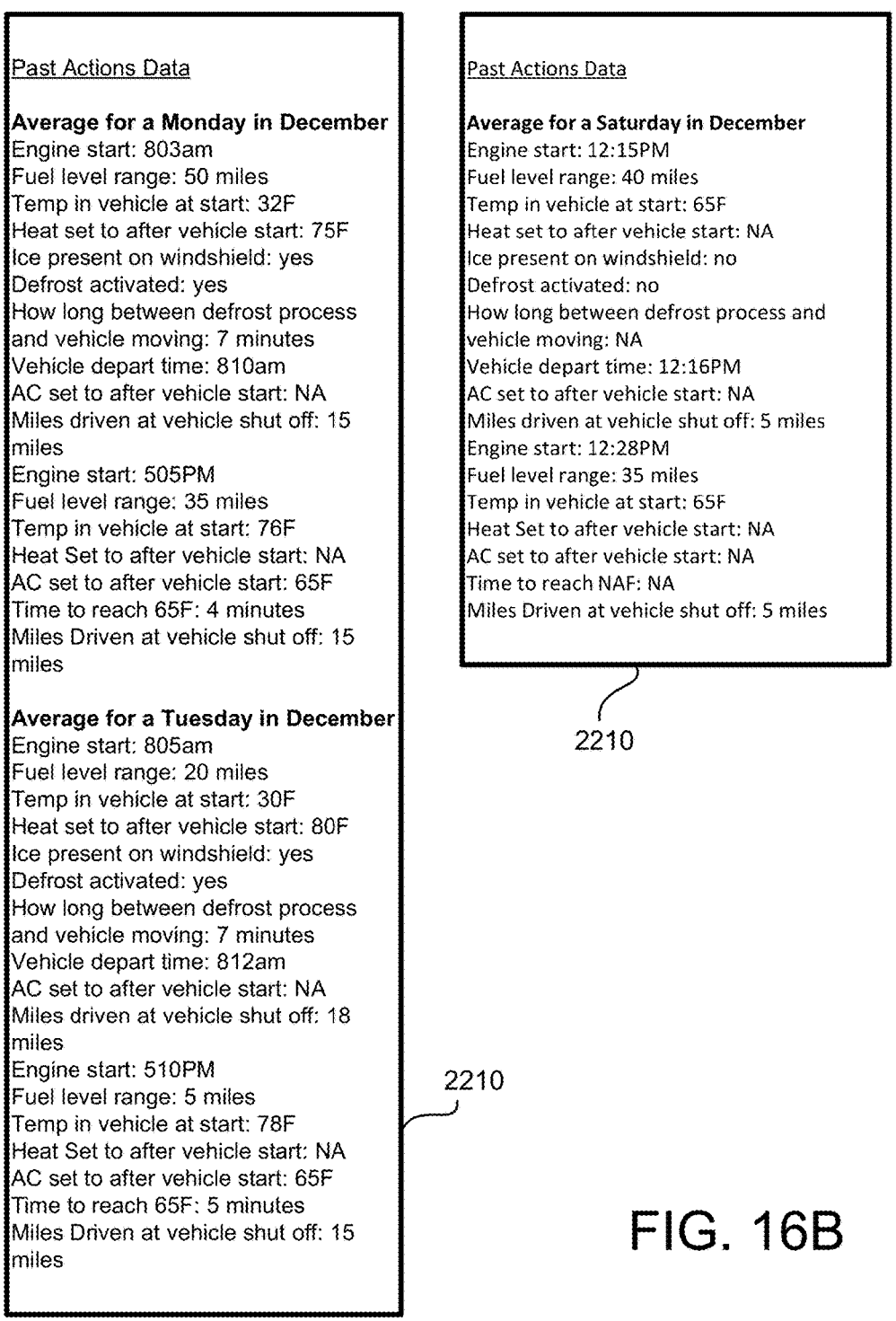

Past Actions Data

Average for a Monday in December
Engine start: 803am
Fuel level range: 50 miles
Temp in vehicle at start: 32F
Heat set to after vehicle start: 75F
Ice present on windshield: yes
Defrost activated: yes
How long between defrost process and vehicle moving: 7 minutes
Vehicle depart time: 810am
AC set to after vehicle start: NA
Miles driven at vehicle shut off: 15 miles
Engine start: 505PM
Fuel level range: 35 miles
Temp in vehicle at start: 76F
Heat Set to after vehicle start: NA
AC set to after vehicle start: 65F
Time to reach 65F: 4 minutes
Miles Driven at vehicle shut off: 15 miles

Average for a Tuesday in December
Engine start: 805am
Fuel level range: 20 miles
Temp in vehicle at start: 30F
Heat set to after vehicle start: 80F
Ice present on windshield: yes
Defrost activated: yes
How long between defrost process and vehicle moving: 7 minutes
Vehicle depart time: 812am
AC set to after vehicle start: NA
Miles driven at vehicle shut off: 18 miles
Engine start: 510PM
Fuel level range: 5 miles
Temp in vehicle at start: 78F
Heat Set to after vehicle start: NA
AC set to after vehicle start: 65F
Time to reach 65F: 5 minutes
Miles Driven at vehicle shut off: 15 miles Past Actions Data

Average for a Saturday in December
Engine start: 12:15PM
Fuel level range: 40 miles
Temp in vehicle at start: 65F
Heat set to after vehicle start: NA
Ice present on windshield: no
Defrost activated: no
How long between defrost process and vehicle moving: NA
Vehicle depart time: 12:16PM
AC set to after vehicle start: NA
Miles driven at vehicle shut off: 5 miles
Engine start: 12:28PM
Fuel level range: 35 miles
Temp in vehicle at start: 65F
Heat Set to after vehicle start: NA
AC set to after vehicle start: NA
Time to reach NAF: NA
Miles Driven at vehicle shut off: 5 miles

Learned Behavior Vehicle Application

Learned Behavior Logic Assumptions and Deductive Reasoning

Check the user's calendar and adjust assumptions based on when the first meeting is, the meeting's location, how long it will take to get the vehicle's temperature and defrosting if applicable completed and if the user needs to re-fuel before arriving at work.

User most likely will start the engine between 803am and 805am

If the temperature is in the 30s inside the vehicle, the user will most likely heat the vehicle to the mid 70s to 80 degrees. Also the user is not likely to use the AC.

If there is ice present on the windshield, the user will most likely activate defrosting measures for 7 minutes before departure.

User usually drives between 15 and 18 miles

The user usually starts the vehicle in the afternoon between 5:05 and 5:10PM

If the temperature is in the mid 70s, the user usually activates the AC to achieve a temperature of 65 degrees The user is normally comfortable on Saturdays when the temperature in the vehicle is 65 degrees. No advance cooling or heating required. The usually makes frequent stops on Saturday and may benefit from route prioritization apps and Gas/Time saving routes, fuel stations, sponsored paths etc.

Learned Behavior Vehicle Application

Potential Actions using Logic & Past Data

Vehicle Learning App Decisions:

Tuesday PM:
The user will most likely need to drive ~16.5 miles on Wednesday morning but only has a range of 5 miles. Email and or text the user that they will need extra time to get to work in the morning due to re-fueling and that the vehicle will be auto starting 12 minutes earlier than usual. Confirm decision is ok with the user.

Wednesday AM:
Vehicle is usually started at ~804am and defrosted for 7 minutes when ice is present and usually departs at 811am, but the user needs 12 minutes to refuel. Start vehicle at 752am and defrost until 759am while heating to 77F because when the temperature is 34F like today inside the vehicle, the user likes the temperature to be about 77F. Set the user's ratio station to 102.5, the most commonly listened to station at this time. Display stock information for the most commonly queries stocks at this time. Check most common commute route in and make sure there aren't delays, else suggest a new route in advance. The user typically goes to coffee on the way to work. Launch the nearest Starbucks coffee location APP. The user usually "one button touch" orders and pays for a medium coffee. Directly from the app.

Friday PM:
Tell the user Saturdays are normally full of errands. Suggest the user send tomorrow's itinerary to the vehicle's app on the network or directly on the vehicle to report if and when the user should get started due to traffic, road construction, suggest fuel locations and ask if 65F degrees is still ok or adjust to a different temperature before the user enters the car around 12pm. Ask the user what time they will most likely depart if its not at 12pm like usual. Download specials and coupons for locations the user typically frequents on Saturdays and display to the user on the vehicle's interface on the user's mobile device.

Saturday PM:
The user said they would like to get started at 10am today but the vehicle interior is more than 20% lower than the user usually likes it. Turn the vehicle on at 955am and heat to 65F since 65F seems to be the user's most commonly used temperature. Display the specials for the nearest dry cleaner since the user typically gets dry cleaning done on Saturdays based on GPS data. Show the user lunch specials nearby and deals to claim since the user usually stops for lunch while out on errands on Saturday.

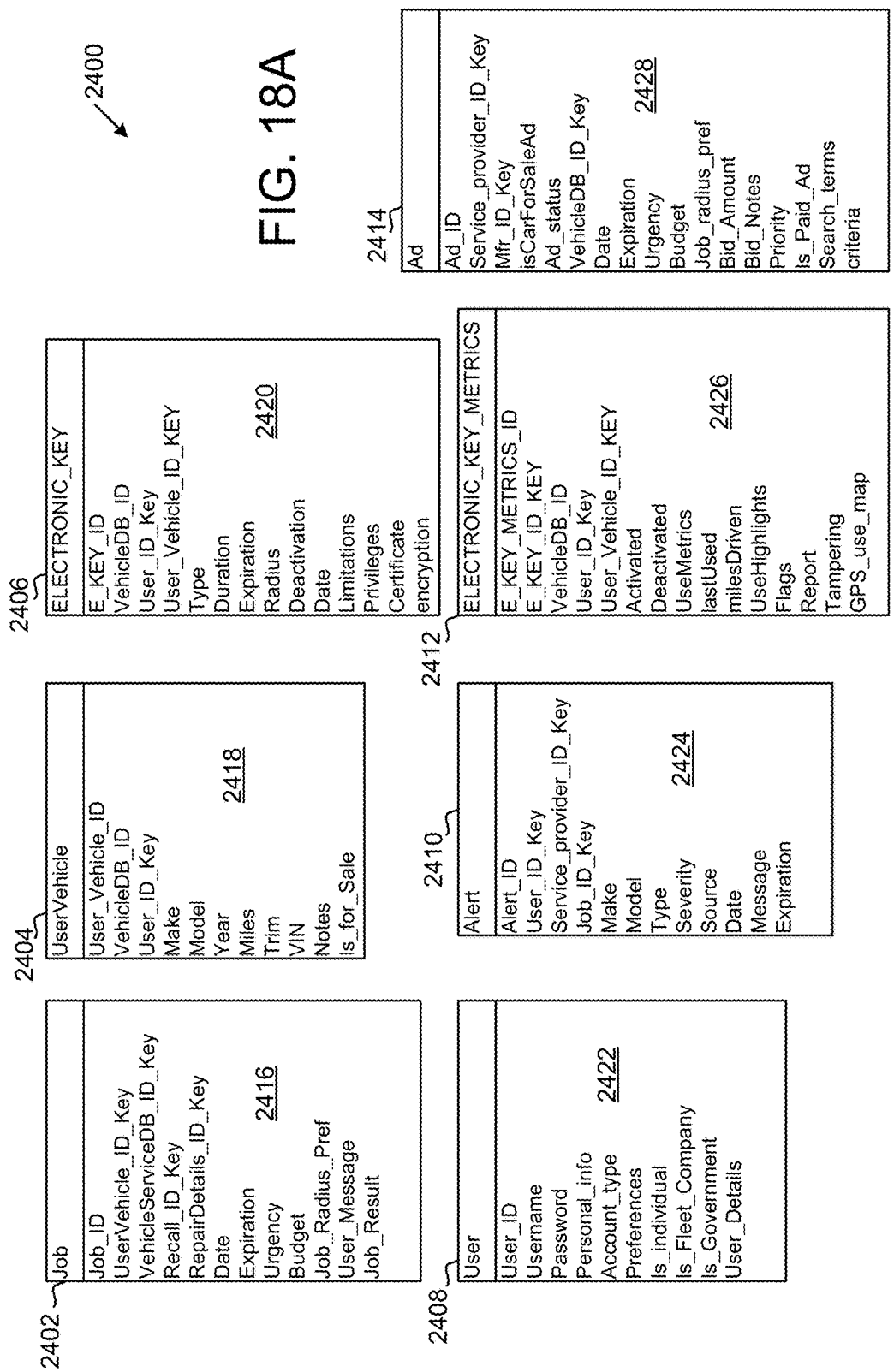

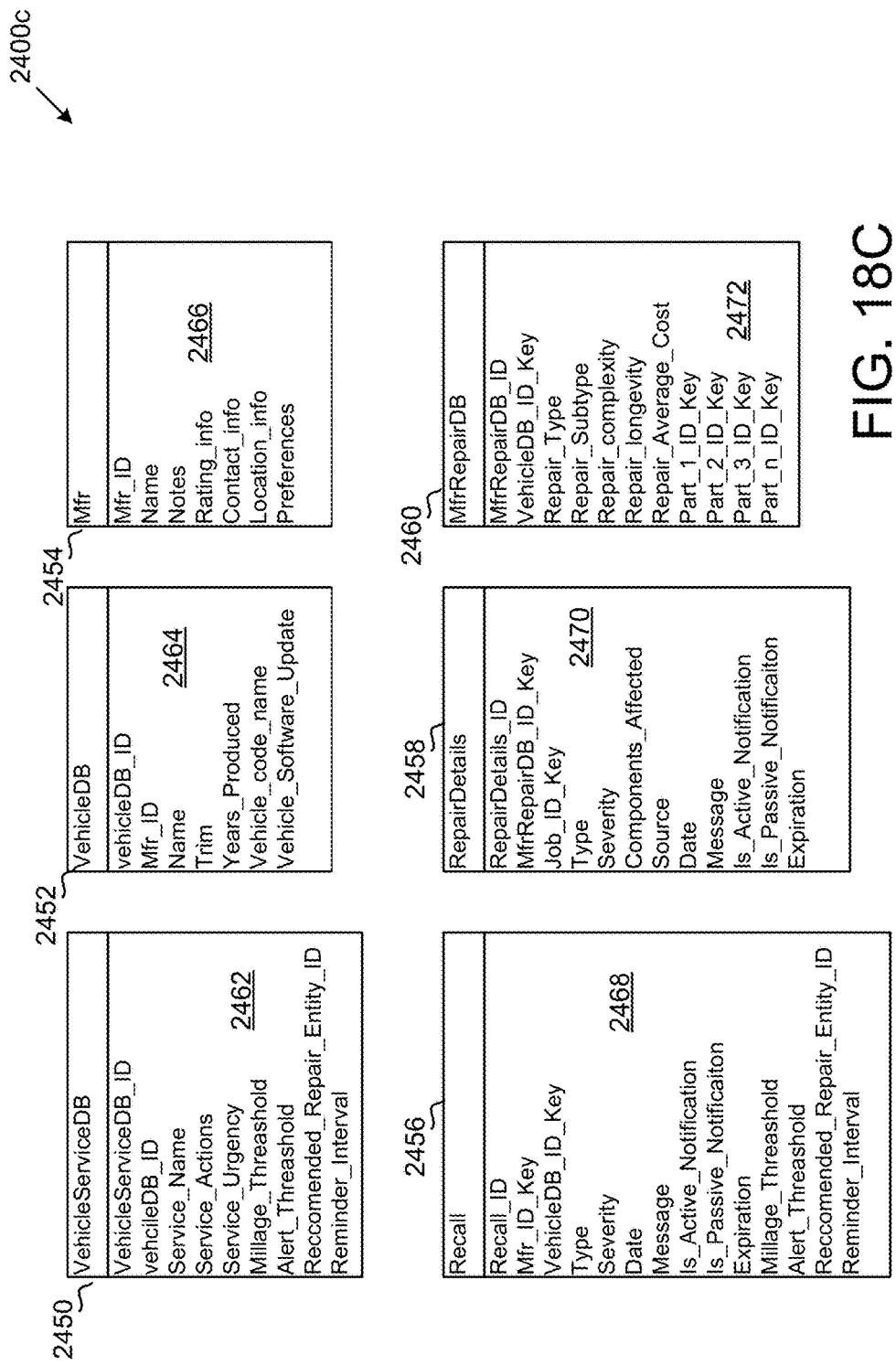

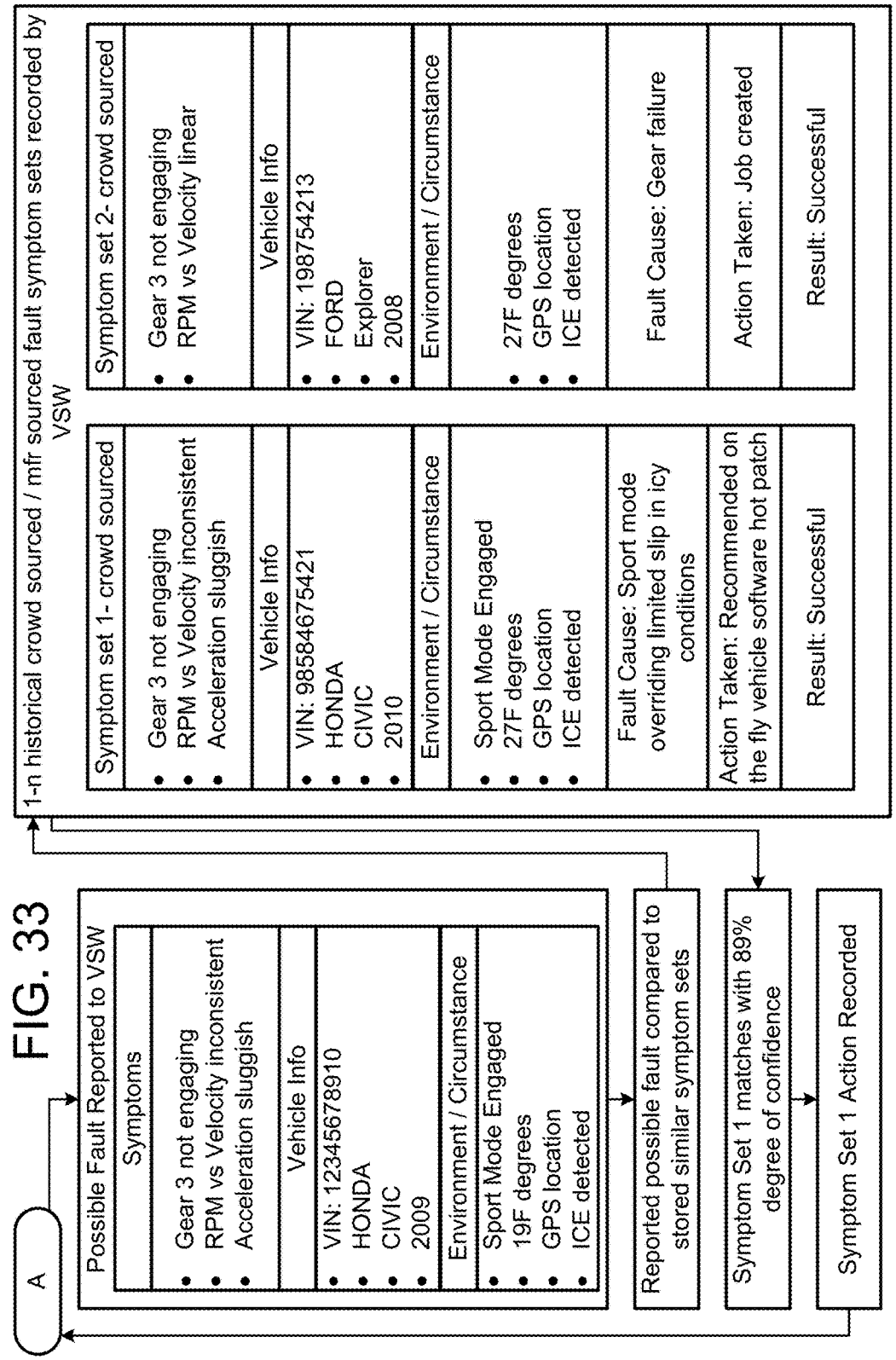

SYSTEMS FOR INTERFACING VEHICLES AND CLOUD SYSTEMS FOR PROVIDING REMOTE DIAGNOSTICS INFORMATION

CLAIM OF PRIORITY

This application is a continuation of U.S. patent application Ser. No. 15/615,812, filed on Jun. 6, 2017, entitled "Vehicles and Cloud Systems for Providing Recommendations to Vehicle users to Handle Alerts Associated with the Vehicle," which is a continuation of U.S. patent application Ser. No. 14/176,138, filed on Feb. 9, 2014 (now U.S. Pat. No. 9,697,503, issued on Jul. 4, 2017) entitled "Methods and Systems for Providing Recommendations to Vehicle users to Handle Alerts Associated with the Vehicle and A Bidding Market Place for Handling Alerts/Service of the Vehicle," which claims priority of U.S. Provisional Patent Application No. 61/896,007, filed on Oct. 25, 2013, entitled "Methods and Systems for Intelligent Software, Data, Job, Bid and Offer Transfer between Entities though a Vehicle Service Marketplace," which are herein incorporated by reference.

U.S. patent application Ser. No. 14/176,138 is a continuation-in-part of U.S. patent application Ser. No. 14/063,837, filed on Oct. 25, 2013, (now U.S. Pat. No. 9,139,091, issued on Sep. 22, 2015) entitled "Methods and Systems for Setting and/or Assigning Advisor Accounts to Entities for Specific Vehicle Aspects and Cloud Management of Advisor Accounts," which claims priority, as a continuation-in-part of U.S. application Ser. No. 13/842,158, filed on Mar. 15, 2013, (now U.S. Pat. No. 9,229,905, issued on Jan. 5, 2016) entitled "Methods and Systems for Defining Vehicle User Profiles and Managing User Profiles via Cloud Systems and Applying Learned Settings to User Profiles", which claimed priority of U.S. Provisional Patent Application No. 61/745,729, filed on Dec. 24, 2012, and entitled "Methods And Systems For Electric Vehicle (EV) Charging, Charging Systems, Internet Applications And User Notifications", all of which are herein incorporated by reference.

U.S. patent application Ser. No. 14/176,138 is a continuation-in-part of U.S. application Ser. No. 13/452,882, filed Apr. 22, 2012, (now U.S. Pat. No. 9,123,035, issued on Sep. 1, 2015) and entitled "Electric Vehicle (EV) Range Extending Charge Systems, Distributed Networks Of Charge Kiosks, And Charge Locating Mobile Apps", which claims priority to U.S. Provisional Application No. 61/478,436, filed on Apr. 22, 2011, all of which are incorporated herein by reference.

FIELD OF THE EMBODIMENTS

The present invention relates to systems and methods for managing user profiles for vehicles and exchange of information with cloud-based processing systems, and diagnosing vehicle conditions, and providing recommendations.

BACKGROUND

Vehicles, such as motorized vehicles and electric vehicles have been around for some time. Vehicles provide a means that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles.

It is in this context that embodiments of the invention arise.

SUMMARY

The methods, systems and apparatus include electronics of vehicles that drive display devices in vehicles and communicate wirelessly with Internet services.

In one embodiment, a system of a vehicle is provided. The system includes a wireless communication device for providing the vehicle with access to a network for exchanging vehicle condition information with a server. An on-board computer of the vehicle is configured for interfacing with vehicle systems and said wireless communication device. The on-board computer is configured to process input received from at least one vehicle interface of the vehicle and processing output via at least one vehicle output of the vehicle. The on-board computer is programmable to access a user account that is used to interface with said server. The wireless communication device is configured to send vehicle data, based on settings in the user account, to the server over the network for vehicle status information. The vehicle status information is for one or more vehicle systems of the vehicle. The server is configured to access at least one database that include diagnostics data for a vehicle type of the vehicle and crowd sourced data for the vehicle type. The crowd sourced data includes comments received from one or more users of vehicles of the vehicle type that relate to the vehicle status information and related to one or more vehicle systems of the vehicle. The server is configured to process the comments to identify a condition derived from the comments related to substantially similar circumstances associated with a condition of the vehicle. The server is configured to automatically process the vehicle data that is received against the diagnostics data and the crowd sourced data. The processing is configured to select an alert from among a plurality of possible alerts, and the alert is selected for the condition of a vehicle system of the one or more vehicle systems of the vehicle. The on-board computer is configured to output data using the at least one vehicle output regarding the alert selected for the condition of the vehicle.

In one embodiment, a vehicle having communications circuitry for connecting over a wireless network to a server for exchanging vehicle condition information is provided. The vehicle includes an on-board computer for interfacing with vehicle systems and the communications circuitry. The on-board computer is further configured to process input received from at least one vehicle interface of the vehicle and processing output via at least one vehicle output of the vehicle. The communications circuitry is configured to send to the server over the wireless network vehicle data for vehicle status information, the vehicle status information is for one or more vehicle systems of the vehicle. The server accesses at least one database that include diagnostics data for a vehicle type of the vehicle and crowd sourced data for the vehicle type, the crowd sourced data includes comments received from one or more users of vehicles of the vehicle type that relate to the vehicle status information of one or more vehicle systems of the vehicle. The server is configured to process the comments to identify a condition derived from the comments and reasoned from description in the comments of substantially similar circumstances associated with a condition of the vehicle. The server is configured to automatically process the vehicle data that is received against the diagnostics data and the crowd sourced data, and the processing is configured to select an alert from among a plurality of possible alerts.

In another embodiment, a method includes establishing a connection with a vehicle over a wireless network, and associating the vehicle to a user account of an online service, wherein a vehicle type for the vehicle is identified in the user account. The method further includes receiving vehicle data for vehicle status information. The vehicle status information is for one or more vehicle systems of the vehicle. The method includes accessing one or more databases that include diagnostics data for the vehicle type and crowd sourced data for the vehicle type. The method includes processing the vehicle data that is received against the diagnostics data and the crowed sourced data. The processing is configured to select an alert from among a plurality of possible alerts. The crowd sourced data is configured to influence a confidence level for selecting the alert. The method includes sending a notification of the alert to the user account. The notification includes a recommended solution for handling the alert.

In some embodiments, the notification includes one or more links to a page or pages that identify a service provider located proximate to a geo-location of the vehicle, the service provider being predefined to handle alerts that are at least similar to the alert.

In some embodiments, the processing is further configured to examine a vehicle history database, a manufacturer's database for the vehicle type, the examining further influencing the confidence level for selecting the alert.

In some embodiments, the processing further ranks the plurality of possible alerts, such that the alert is a top ranked alert among other alerts that are ranked are presented as alternate recommendations for the notification that is sent to the user account.

In some embodiments, the notification includes text or data of at least some of the crowd sourced data, the crowd sourced data including comments regarding the alert as experienced on another vehicle other than the vehicle.

In some embodiments, the page or pages provide access to one or more user reviews of the service provider.

In some embodiments, the service provider is identified along with associated scheduling openings for accepting the vehicle to address the alert.

In some embodiments, electronic keys are transferrable to the service provider for enabling the service provider to access the vehicle to handle the alert, the electronic keys are accessible by a device of the service provider with privileges for access of the vehicle.

In some embodiments, actions of the vehicle are recorded when the electronic keys are active, the actions being made viewable by an owner of the vehicle.

In some embodiments, the notification includes a recommendation of an action to take to handle the service alert.

In some embodiments, the recommendation includes one or more options for handling the alert, the options include identification of a vehicle service provider for handling the alert, or identification of local service providers for handling the alert, or identification of customer ratings for service providers for handling the alert, or scheduling information for service providers for handling the alert, or an estimated range of cost charged by service providers for handling the alert, or social media comments associated with handling the alert, or adding the alert for the vehicle to a post to enable bidding for the alert by service providers, or accessing a link to a website that provides historical information regarding the alert on other vehicles.

In some embodiments, the notification includes a link to a webpage that provides additional information regarding the alert and options for handling the alert, wherein one option includes, posting the alert to an online bidding service, and in response to receiving the posting, enabling service providers access a website of the online service to view the posting for the alert, the access enabling service providers to bid for handling the alert.

In some embodiments, methods further include analyzing one or more bids received for handling the alert from one or more service providers; and awarding one of the service providers with a job to handle the alert; and providing electronics keys to the awarded service provider for the job.

In some embodiments, the awarding of the job is at least in part determined based on conditions for awarding the job as defined in the posting by a user of the user account, wherein one of the conditions is a price the user is willing to pay for handling the alert.

In some embodiments, one of the conditions is that the service provider have a predefined service rating, or that the service provider is located within a predefined distance of an address.

In some embodiments, the alert is one of a vehicle repair, or a software update, or a recall repair, or a regular service, or a system failure, or a preventative repair, or a combination of two or more thereof.

In some embodiments, the notification includes a recommendation for handling the alert, the recommendation being customized for the user based on a learned pattern of inputs made by the user.

In some embodiments, the notification is sent to one or more of a mobile device, a computing system of the vehicle, a user interface of a website that is accessible for the user account.

In some embodiments, a client application is executed on a computer of the vehicle, the client application is configured to process a plurality of routines that are configured to capture the vehicle data for the vehicle condition information, the capturing occurring periodically by the client application, the client application configured to communicate with a server application of a vehicle service website (VSW) at predefined times or when particular vehicle conditions trigger the communication, or in response to a user input.

In some embodiments, the VSW receives the vehicle data as raw metrics, the raw metrics being processed by the server application by accessing data from the diagnostics information from database, the database including one or more databases identified depending on characteristics of the raw metrics.

In some embodiments, the database includes one of service history, recall fix history, repairs required, repairs performed, vehicle software version, software updates, data regarding the vehicle being identified for sale.

Methods and systems provide access to cloud services over the Internet for managing a user profile of a vehicle on a cloud processing system connected to the Internet. One example method includes receiving requests to access the user profile to define settings for one or more vehicles. The method includes receiving input for user settings at the vehicle using the cloud processing system. The method includes processing the input over time to learn behavior associated with the input to the use settings. The method includes transmitting settings to the vehicle to be automatically implemented based on the learned behavior. In one example, the profile is associated with a plurality of vehicle types and the method includes detecting a violation of a setting or an incompatible setting in the profile that is user defined via the user account. The method can then automatically send a notification to a predefined administrator of the profile. The method being executed by a processor.

The profile can be transferred to one or more vehicles, can be set for a temporary period of time, can be set with wireless payment systems, and is accessible over the Internet to accept changes or updates.

The methods and systems allow any vehicle with the ability to establish a communications link whether wired or wireless though any given network to install an APP on the vehicle's on board memory and or computer system. One such APP with system level access can mine, collect and communicate/transmit raw metrics and data relating to the vehicle's state, performance, service history, recall fix history, repairs required, repairs performed, vehicle software version and updates as well as whether or not the vehicle has been identified to be for sale by the vehicle's owner among other data. APP can use this mined data to transmit to a central or distributed computing or cloud services hosted marketplace website that serves as the hub where information from a plurality of vehicles is collected, transformed, and distributed in a hub and spoke system, spokes being vehicles with the ability to communicate with the hub which can be any rendition of a Vehicle Service Website (VSW).

BRIEF DESCRIPTION OF DRAWINGS

FIG. 2 shows additional role settings for different users, in accordance with one embodiment.

FIGS. 3-5 show additional vehicle profile settings, in accordance with one embodiment.

FIG. 13B illustrates one example of how stored data and function declarations may be compiled to provide intermediary access to a vehicle's computer controlling vehicle systems, in accordance with one embodiment.

FIG. 13C illustrates a set of computer readable and executable code that can be compiled together by a third party APP developer in the form of an APP, in accordance with one embodiment.

FIG. 16B illustrates how one of many types of inputs into an assumption and reasoning logic module can be compiled over time, in accordance with one embodiment.

FIG. 16C illustrates one example of what an assumption and reasoning logic module may produce using the data points collected on an ongoing basis in FIG. 16B, in accordance with one embodiment.

FIG. 16D illustrates an example list of decision the decision and action engine may take based on information provided by the assumption and reasoning logic module and sets of assumptions created, in accordance with one embodiment.

FIG. 18A illustrates a partial expanded view of the participants in an entity relationship diagram. Example data constructs related to each table are shown to show the types data a specific table could manage as well as how the data relates to other data in other tables in the construct.

FIG. 18C illustrates a partial expanded view of the participants in an entity relationship diagram. Example data constructs related to each table are shown to show the types data a specific table could manage as well as how the data relates to other data in other tables in the construct.

FIG. 33 illustrates how a VSW can take raw information and data points from a vehicle described in FIG. 32 to make logical and systematic comparisons with existing, past, and historical data. The VSW can condense a fault to a set of faults and symptoms along with accompanying circumstantial data to search for, rank, and list possible failure causes and associated successful remediation(s) associated with the fault in past occurrences.

DETAILED EMBODIMENTS

Figure 1:
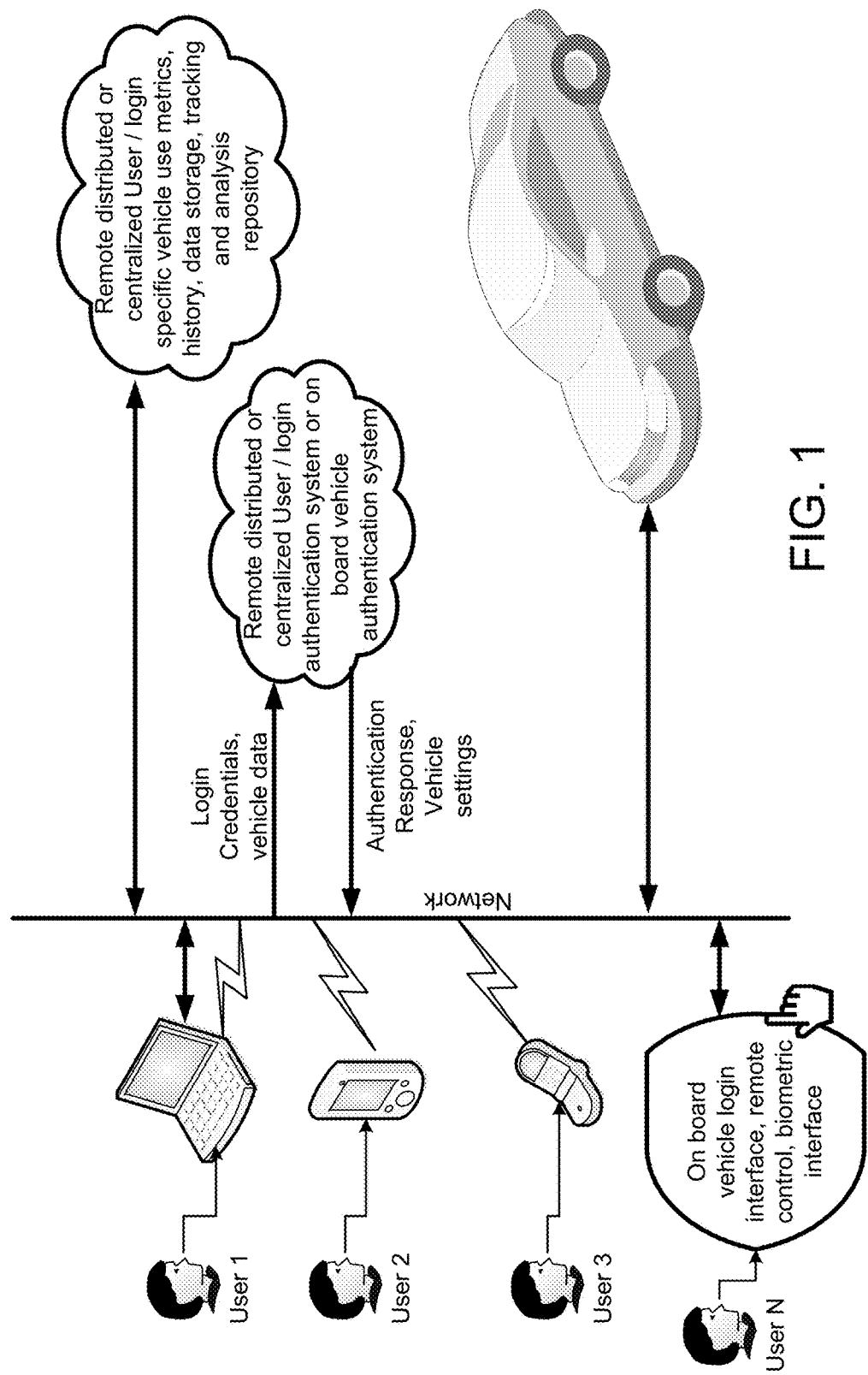
FIG. 1 shows example profiles settings for a vehicle, and association to roles, in accordance with one embodiment.

Embodiments of the present invention define methods, systems and apparatus for use in vehicles. The methods, systems and apparatus include electronics of vehicles that drive display devices in vehicles and communicate wirelessly with Internet services.

The Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use behavior by the user or patterns of behavior of multiple users, and automatically implements settings or programming to aspects of the user interface, or provides recommendations or notifications with recommendations. The programming can include automatic programming at certain times, days, months, years, etc., and can be updated or molded over time as the user continues to use the vehicle UI.

In some embodiments, methods and systems allow any vehicle with the ability to establish a communications link whether wired or wireless though any given network to install an APP on the vehicle's on board memory and or computer system. One such APP with system level access can mine, collect and communicate/transmit raw metrics and data relating to the vehicle's state, performance, service history, recall fix history, repairs required, repairs performed, vehicle software version and updates as well as whether or not the vehicle has been identified to be for sale by the vehicle's owner among other data. APP can use this mined data to transmit to a central or distributed computing or cloud services hosted marketplace website that serves as the hub where information from a plurality of vehicles is collected, transformed, and distributed in a hub and spoke system, spokes being vehicles with the ability to communicate with the hub which can be any rendition of a Vehicle Service Website (VSW).

In other embodiments, methods, systems and computer readable media are provided. One example method includes establishing a connection with a vehicle over a wireless network, and associating the vehicle to a user account of an online service, wherein a vehicle type for the vehicle is identified in the user account. The method further includes receiving vehicle data for vehicle status information. The vehicle status information is for one or more vehicle systems of the vehicle. The method includes accessing one or more databases that include diagnostics data for the vehicle type and crowd sourced data for the vehicle type. The method includes processing the vehicle data that is received against the diagnostics data and the crowed sourced data. The processing is configured to select an alert from among a plurality of possible alerts. The crowd sourced data is configured to influence a confidence level for selecting the alert. The method includes sending a notification of the alert to the user account. The notification includes a recommended solution for handling the alert.

In one embodiment, a user can access cloud services for a vehicle manufacturer and identify the particular vehicle from selected choices. The user can then identify a customization profile for the vehicle by defining the look and feel of a UI display, arrangement of vehicle controls on displays, add and associate third party APPS to the vehicle display, and save the configuration.

The configuration, in one embodiment, is saved to the profile of the user. In one embodiment, the profile is saved on a database of a specific vehicle manufacturer that offers the customization option. In still other embodiments, once a configuration is saved to the profile account of a user, that configuration can be shared to other vehicles of the user. In still other embodiments, when a user buys a new car, the custom configuration can be transferred either entirely or partially to the new vehicle. In some embodiments, if the vehicle has more or less system functions, the customization can be adjusted automatically or the user can be provided with options to update the customization to add or delete features. In one embodiment, the customization will be facilitated via a website. In one embodiment, the website may be of the vehicle manufacturer. In one embodiment, the website of the vehicle manufacturer can allow the user to add APPS that are created by third parties. The third parties can create APPS that communicate with APIs of the system components of specific vehicles of the manufacturer. Once APPS are selected, the user can add them to the custom user interface (UI) display.

The user can also be allowed to arrange the APPS or icons of APPS in a specific custom arrangement that is saved to the user's profile. In one embodiment, the user's profile can also be run on various vehicles, other than those owned by the user. For instance, if the user is renting a vehicle and the vehicle has access to cloud services, the user can enter his user name and password (or other identifiers), which log the user into the cloud services and saved profiles. The saved profiles will then enable logic to build a custom UI for the user based on the vehicle being driven. In one embodiment, the system components and APIs of the system components of the rented vehicle can be paired or linked to the user's saved APP selections.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile.

The data can then be used by algorithms that build assumptions based on historical inputs by a user as well as environmental inputs, location inputs, vehicle diagnostic inputs; internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.).

The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

Still further, certain applications can increase in size when being used or decrease in size to enable selection at a later time. For example, selecting the temperature system component may expand the system component to a larger space, thus temporarily removing other displayed components. The user can also select other buttons to access other system controls, other apps, or modify or add applications or system controls. When modifications are made, the modifications are saved to a user database and profile of the user, as managed by cloud services.

Cloud services will therefore allow any future modifications to be made to the custom configuration at any time and from any computer connected to the Internet. Still further, the custom configuration can be transferred to a second vehicle. If the custom configuration is transferred to a second vehicle, the system can select the system components for the second vehicle and attempted do a best match of applications available for the second vehicle that resemble or match the ones used in a first vehicle. Specific settings, arrangements and other features may also be transferred to a second vehicle, by simply transferring the custom configuration to a second vehicle.

In one embodiment, the functions of the specific applications illustrated in the display will be monitored and restricted depending on safety considerations while driving. For example, if the interfacing functionality requires more interactivity with the display, or requires a reading of text or inputting text, those functions will be disabled during operation of the vehicle. Once the vehicle comes to a stop, or is placed in Park, certain of these functions will be activated. In other embodiments, other safety considerations will allow for applications to shift from outputting text to outputting audio or voice. The input can also be changed from touchscreen, button touches, selections, and/or voice input. In still other embodiments, safety considerations can allow certain user interface components to move about the display to provide easier reading while driving or automatic conversion of text to audio.

For example, content being displayed in the center panel display of the vehicle, can be automatically shown in the dashboard display region of the vehicle, such as in front of the steering wheel. In still other embodiments, some content or display data can be moved from the center console or the display in front of the steering wheel to the windshield of the vehicle in a heads-up display area. Accordingly, algorithms executed by the applications and applications of the manufacturer, can cooperate to provide functionality to the application features and interfaces, while maintaining safety parameters defined by rules. The safety parameters will therefore allow content of the user interface to be shifted around to various displays of the vehicle, or translated to voice or audio at certain points in time.

These settings and customizations can be made through the web/cloud services and tools provided by the website of, for example the manufacturer of the vehicle. In one embodiment, the cloud services provided by the manufacturer can be provided by a partner of the manufacturer. The partners of the manufacturer can include software companies that develop, host, or manage certain functionality provided by the vehicle manufacturer. In other embodiments, the partner software companies can integrate tools or components with tools and components of the vehicle manufacturer. This provides for integration with one or more cloud services, software services, Internet services, and services provided by systems of vehicles or systems of the vehicle manufacture. In either case, whether the software and logic is designed and constructed by one or more entities, the cloud services provided by the vehicle manufacturer or the website that provides the tools for customization will appear as a unified simple to use interface for the user. As mentioned above, the cloud services can provide databases for saving the user profile and data associated with the user account.

The user profile can include settings made by the user, customizations made by the user, identification of applications purchased or added to the vehicle customizations, etc. Still further, the user profile data can be part or be associated with the user account. In this manner, the user that customized a user interface can access the Internet at any time, whether through the vehicle or through any other computing device having access to the Internet and make changes, modifications, or access control features of the vehicle remotely. In one embodiment, the profile of the user can be accessed from any vehicle, such as rented vehicles or shared vehicles. Settings and profile data can then be shared for a period of time on any vehicle and use data on that vehicle can be stored.

When the user is not using the vehicle, the custom configuration can be turned off or locked out for another session. Once the user wants to start a new session, the user can log back in and the custom configuration returns. In other embodiments, the custom configuration will automatically turn off when the user is not driving the vehicle or has not logged into the vehicle. In other embodiments, the custom configuration can be automatically turned on when the user is detected. The user can be detected using biometrics, login credentials, image detection of the face, fingerprint detection, retina scans, etc. In some embodiments, biometrics can include data used to identify the user, such as face recognition, fingerprint reading, retina scans, voice detection, or combinations thereof. Still further, the custom configuration can be transferred to other vehicles.

If the user wishes to use his or her custom configuration in another vehicle, the user can login to the custom configuration or user account from another vehicle. If the other vehicle does not have all the system components needed to define the custom configuration, the custom configuration can be supplemented with other similar components automatically. In other embodiments, the custom configuration can be transferred from one vehicle to another, or when the user buys a new vehicle. In another embodiment, the custom configuration can be adjusted based on the driver. The custom configuration can also be preset remotely from the Internet, using the cloud services. The custom configuration can also be configured to provide limited use of certain systems or the vehicle, such as when a guest is driving the vehicle. In other embodiments, restrictions can be placed on the vehicle speed, location of driving, and automatic notifications for the user or the master user of the vehicle. The master user of the vehicle can have a master account with administrator credentials.

In still another embodiment, the vehicle can be loaned to a child of driving age (under 21/18 years of age), and the child can be provided with restricted use of the vehicle. When the child exceeds or does not follow the restrictions of the vehicle, automatic notifications can be provided to the user that is the administrator of the vehicle. The notifications can be by cell phone, smartphone, tablet computer, mobile device, text messages, phone calls, commendations of phone calls and text, audio messages, audible sounds, vibrations, and commendations thereof. History use of the vehicle can also be maintained in cloud services. The history use can provide the user with information as to where the vehicle has been, the speed or events, violations that occurred when use of the vehicle etc. The configuration can also provide messages to the driver warning the driver of when the vehicle has exceeded a restriction, or is approaching a restriction in use, driving area, speed, etc.

The screen displays can have various configurations, placements, sizes, number of pages, tabs, etc., and the user can provide controls for some or all of the interfaces and controls in certain locations. The selection can be enabled for third-party applications. The third-party applications can be selected from the vehicle site, or by providing links to third-party sites. The third-party applications can be pre-identified by the site and displayed to the user if they are compatible with the particular vehicle selected. In another embodiment, the third-party applications can all be shown to the user whether or not they are compatible with the vehicle. Upon binding/pairing or attempting to find application for the vehicle, compliance as to whether the applications operate or comply with the particular vehicle can be made.

In one embodiment, certain third-party applications can be reviewed by the vehicle site administrators before they are made available to users for selection. In other embodiments, the third-party applications can be approved or disapproved. In still other embodiments, the third-party applications can be augmented with restrictions made by the vehicle manufacturer, or dictated by law. The restrictions can be applied, based on the anticipated interfacing with the vehicle interfaces, to ensure safety during driving. For instance, if a particular application requires entry of text, navigation of controls, or other activities that would distract the driver during operation of the vehicle, such vehicle controls or application controls for application interfaces can be temporarily disabled, or can be automatically transferred to a heads up display, or can switch to take audio vocal input from the user. In some embodiments, when the vehicle has come to a stop or is place to park, certain controls or interfaces can be re-enabled, or moved back to original display location or converted back from voice input to touch input. In one embodiment, tools provided by the vehicle site or third-party site can provide for customization of the layout of the display screens of the user interface.

The customization can include organizing or laying out system interfaces as well as application interfaces, such as those interfaces provided by 3rd parties. In one embodiment, interface rules are applied to determine if the system interfaces can be replaced with third-party application interfaces, while providing access to the control interfaces via the APIs of the systems. For example, if the user wants to provide a custom speed indicator, the speed indicator must be compliant (via APIs and/or mapping) with the system interfaces so that the speed readings can be populated to the third-party application. In one embodiment, rules can be integrated with or applied to the applications and system user interfaces for when the vehicle is moving. As mentioned above, such rules can limit interactivity with certain user interfaces while the vehicle is moving to prevent unsafe driving. In one embodiment, the custom user interface is saved to the user profile.

The user profile may contain settings, such as selections of the user interface components associated with the system of the vehicle, as well as user interface is provided by third-party applications. In addition, the user profile can contain and store settings provided by the user. The settings provided by the user, as mentioned is this disclosure can also be learned settings based on use. The settings can further include remote access settings, as well as settings allow the user to control vehicle components from a remote location or a remote computer. The setting can also include providing access to the user account to view historical driving patterns, recent driving activities, the performance of the vehicle during specific driving sessions, the performance of specific vehicle components, etc.

In one embodiment, the custom user interface configuration can be transferred to the vehicle. The custom configuration, as mentioned above is stored in the database of the vehicle manufacturer, or a database held by a 3rd party that cooperates with the vehicle manufacturer to provide cloud services. The database, in one embodiment, is a network accessible storage which allows access to the user to program and modify the user interface using any computer or device having access to the Internet, including the vehicle itself or a third-party vehicle. The method then proceeds to operation where the custom user interface can be activated in managed for Internet connectivity for components of the custom interface. For example, the vehicle's Internet access protocols can be set, or registered with an Internet provider or service provider for the cloud services. The service provider for the cloud services can be the vehicle manufacturer, a company cooperating with the vehicle manufacturer, a third-party company, or combinations thereof.

In one embodiment, the method/logic can also enable local communication with mobile devices that may be in the vehicle. The enablement may be provided by allowing synchronization with the computing system of the vehicle, or with the computing communications of the portable device. For example, the local communication can be paired automatically, based on a preset pairing process where pairing keys are entered. This provides for automatic settings and synchronization when the user enters the vehicle with the portal device. As mentioned above, user interfaces associated with applications loaded on the user's portal device can also synchronize to the display screens of the vehicle, as predefined by the user.

In one embodiment, vehicle settings are saved to either a memory number button on the vehicle or synced to a key fob, or accessible via an interface or voice activation. In one example, a vehicle operator profile is provided to allow users to maintain their individualized profiles, settings and accounts for vehicles from any internet connected device or be able to login to their vehicle physically in or near the vehicle by the use of a fob, thumb print, eye scan and or manual login using an input device that interacts with the vehicle's login system.

In one embodiment, the profile can be managed at a user account saved to a central or cloud distributed system, to manage access. Any vehicle can be abstracted so that any user can log into any vehicle if they have an account that allows access to that vehicle. For instance, a vehicle owner with the role of "administrator" (e.g., an administrator of a user account that has a profile associated therewith or multiple/sub profiles) can create logins for his or her vehicle(s) for additional users such as his or her children, spouse, mechanic, and valet driver among other applications. Logins can be created for individuals or for roles such as the role of "child" where all users with the role "child" would have the same vehicle specifications applied to the vehicle they will be logging into. Similarly, the role of valet can be given and shared by any valet driver.

The purpose of abstracting vehicle operators from the vehicle itself is a shift from the current state of the art in which settings are vehicle specific—each vehicle typically only having the ability to store 1-3 sets of settings, to where vehicle settings are user specific and 1-n logins can be managed through an access management system. The embodiments defined herein allow each user to apply his or her settings to any vehicle based on their login information in which they provide their login and password. When a user logs into a vehicle, the vehicle will determine locally on board and/or communicate remotely with a central or distributed access management system to determine the validity of the login presented to the system. If the user's login is recognized, the system will apply settings and use privileges to the vehicle prescribed by the login.

Logins can have "role" specific settings and privileges or settings and privileges set only by the administrator that cannot be overridden by the user of the login. For instance, an administrator may create a login for "John" their 16-year-old son. The administrator can apply settings to John's login that John cannot override such as the maximum speed the vehicle can travel. For instance, Although the vehicle may have the ability to travel at a speed of 130 mph, John's login will only allow the vehicle to travel at a speed up to 90 mph. Additionally, every login may have settings that the user of the login can toggle to their liking such as the list of radio stations they would like pre-programmed every time they log in to any vehicle that accepts their login.

Logins can control all aspects of a vehicle's behavior and can be attributed to individuals or roles. These settings can be toggled via a network connected device such as a computer, web application, smart-phone or directly on the vehicle. Administrators can decide which settings are locked for specific logins or roles, which are open for the login user to toggle and which settings are to be enforced depending on the time of year, or time or day etc., or when a condition or event is detected.

Login settings that can be set and remotely administered include but are not limited to, driving characteristics (rate of speed, fuel consumption guidelines) location based settings (GPS aided travel restrictions, travel radius boundaries, dynamically loading maps, dynamically loading directions, dynamically loading fuel, charge and battery service and purchase locations etc.), time of day based use restrictions (day driving only for example), automatic purchase settings (financial institution linking for automatic purchasing of fuel, charge time, batteries, car washes, etc.), fuel settings (Electric only, fuel only, hybrid only etc.), refueling routing and purchase (incentive based re-fueling maps, incentive based refueling offers etc.) driving characteristic settings (sport, comfortable, soft, off-road, high performance, economy mode), entertainment system settings (radio memory settings, internet access or restriction, streaming services settings), comfort & HVAC settings (climate control, seat positions, seat heater/cooler, suspension/ride settings, entry lighting, remote start, remote stop etc.) tracking/metric settings (camera/video recording guidelines, mileage, top speed, average speed, MPG, wear and tear settings and notifications, historical travel maps).

Automatic purchase settings can be processed in response to requests from the vehicle. The request can be, for example, to transact a payment is for one of a car wash service, a fast food service, a toll road service, a goods purchase service, a rental service, a lease service, or combinations thereof.

Additionally, combinations of settings or setting profiles (such as "sport" where your seat moves to sport position for additional support, suspension stiffens, throttle response becomes aggressive etc.) can be set as well instead of individually setting use characteristics. In one embodiment, logins are user specific, not vehicle specific, so any family member can use their login on any family vehicle and the vehicle will perform based on the metrics and restrictions dictated by the login used to operate the vehicle.

Companies or entities can create and manage logins to company vehicles for delivery drivers, car washers, and mechanics among other applications. Each login can be configured to provide or restrict access based on the user logged into the vehicle. A company may only allow a delivery vehicle to travel at a maximum speed of 80 mph to limit reckless driving. A company may create a role of "local delivery only" where a driver with that login can only drive the vehicle within their territory. Breaches in territory travel will result in a recorded event and notification to the vehicle administrator as well as the vehicle operator. A grace period will be given to re-route back into the driver's territory before more aggressive vehicle disabling mechanisms are deployed. The driver will be given visual and audio cues as to how to avoid vehicle disabling.

A dealership can grant "test drive" logins to potential customers, which allows them to operate less than 100 mph and only within a 5-mile radius. In one embodiment, alerts or notifications can be automatically triggered if violations in the restrictions are detected. A dealership may also grant a "demo" login for instance which showcases the vehicle's capabilities, available APPS, features and benefits. Variations of the "demo" login can be used on variations of potential buyers. A "18-24 year old demo" may be useful for enticing that demographic and showcases the vehicle's features 18-24 year olds are most receptive to.

A valet can be given a password to login only as "Valet" which will impose restrictions on trunk operation, vehicle speed operation, vehicle location notification settings etc. A recording option can be provided, which can set a recording within and around the vehicle when in the valet mode. This way, the user can login to see what the valet driver did while in possession the car, in case the owner feels that something is not correct when the vehicle is returned to the owner. Additionally, while the valet is driving the car, a notification can be provided to the valet that will alert the valet that recording is in progress, and their face can be shown on the display while the valet parks the car.

A user may set the valet login to alert the user that left the vehicle with a valet that the car has traveled beyond the allowed radius or has reached a speed greater than 100 mph, for example. This alert can be sent wirelessly to an email address, texted via mobile phone number or sent to a mobile device having a login-profile mobile application capable of sharing current vehicle location, speed, fuel status among other metrics. The last logged in user of the vehicle or vehicle administrator can send visual, audio or auto override notifications to the valet letting them know they need their car back, they are traveling too fast or even auto shut down to prevent theft.

A parent can set up a login to the family vehicle for their child that only allows the child to drive within a certain radius. For example the vehicle may only be used to drive between home and school. A map can be outlined on the account management interface by a parent when setting up the child's login to support the home to school restriction intended.

In one embodiment, a parent or company may give a child or company driver a login that also carries a financial allowance connected to one or more financial institutions administered through the access management and/or login management system by administrators. For instance, a child may have the need to re-fuel the vehicle by purchasing either traditional fuel, battery units, and or charging time but a parent does not want to give a general credit card to the child. The parent will set a budget for fuel purchase for the given login and the login will then allow the vehicle will communicate with the fuel, battery, and or charge-dispensing unit automatically using a wired or wireless communication systems funding the purchase automatically up to the allotted budget set in the login of the vehicle.

In one embodiment, these features are useful for fleet vehicles where company vehicle users currently use a corporate credit card to purchase fuel where fraud may exist in the form of using company credit cards, or company fuel accounts to fuel personal vehicles. The new system ensures only the company owned vehicle is approved to purchase the traditional fuel, battery, charging time and also maintains metrics on which logged in user consumed fuel and re-fueled which vehicle.

In one embodiment, a process is created so that some or all manufacturers use the same type of login/access management system. By way of example, any user can log into any vehicle from any brand in so far as they have account creation access or a recognized login. Once logged in, each vehicle will receive and impose the login-based settings as long as the manufacturer supports the login/access system.

FIG. 1 shows various methods a user can interact with a vehicle login system, in accordance with one embodiment. The user may use any network-connected device ranging from a mobile computer, mobile phone, mobile network device all connecting to a remote converged or distributed network cloud system. The user may also interact with the vehicle login system directly on or near the vehicle. The user supplies login credentials to a vehicle login interface which are sent to the remote distributed or centralized user login authentication system or onboard vehicle authentication system. The processing logic receiving the login credentials processes the data and returns an authentication response to the user attempting to log in. If the authentication is a success, the vehicle the user attempted to log into has vehicle settings applied to it and the user is allowed to operate the vehicle. If the authentication is a failure, the user is presented with a failed access notification on the login interface.

FIG. 2 shows two different types of users and an example of how the user is organized, in accordance with one embodiment. In this example, User 1 is an administrator of a vehicle login system over vehicles he or she owns. User 1 has the ability to add or remove logins, roles and vehicles to his login system. Since User 1 is an administrator, he or she can add more logins and or roles to the system to allow a family member to have access to the family vehicles for instance. In this case, a family member "User 2" is shown. The administrator has given this family member a login named User 2 and has granted two roles to User 2. User 1 may only want User 2 to have access to a certain vehicle and to certain roles only. User 1 may only want User 2 to have access to the vehicle for the purposes of traveling between school and home. In this case User 1 has created a role that is applied to User 2, which only allows the vehicle to travel within certain restrictions and geographical locations.

In this example, User 2 does not have the ability to alter his or her login, role or vehicle since they do not have administrator access. However, User 1 can make changes on behalf of User 2. The full range of settings over a vehicle that applies to a given role or login is a super set of settings. User 2 may have access to a subset of settings that User 1 allows changes to by User 2.

Figure 3:
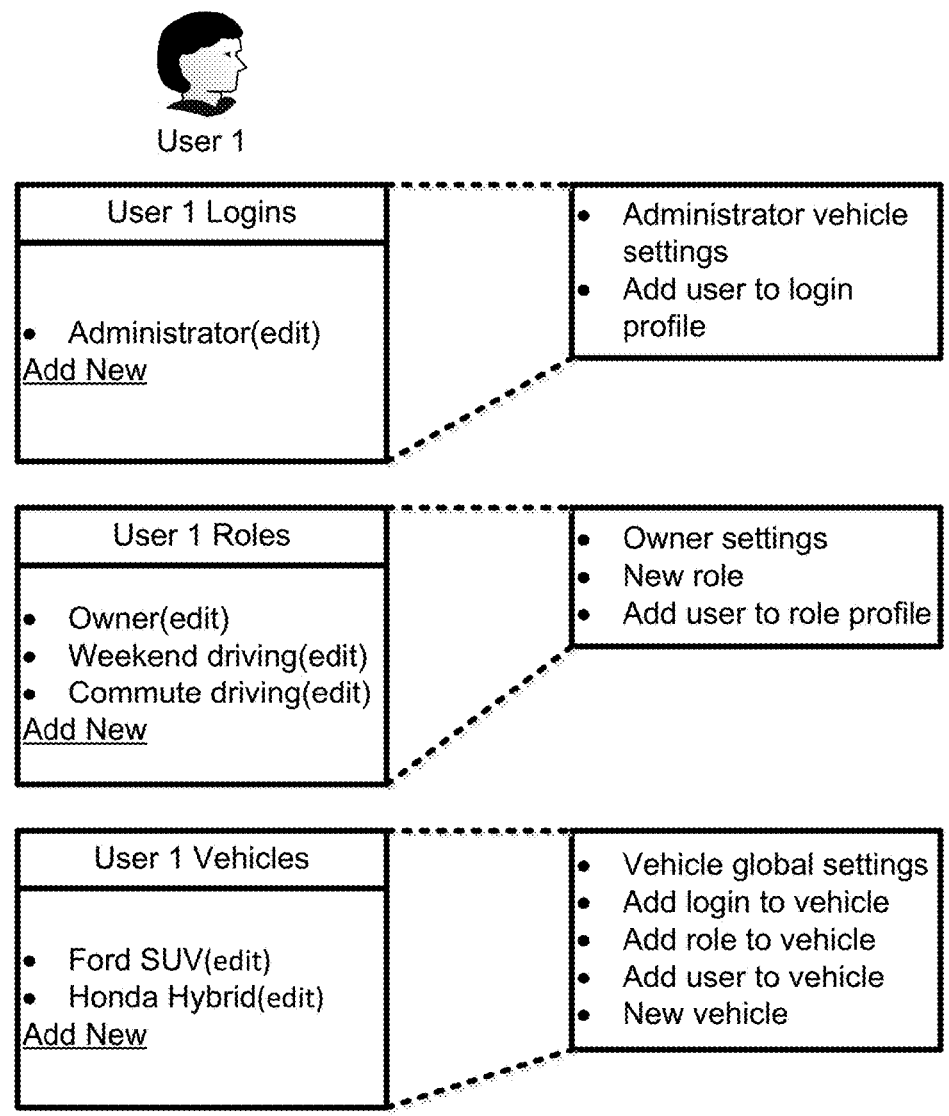

FIG. 3 shows a graphical representation of an example set of settings an administrator such as User 1 may have to administer logins, roles, and vehicles. FIG. 3 further expands the depth of settings, including but not limited to, vehicle administration, adding or deleting users and roles, vehicle global settings that apply to all roles and logins, adding or deleting vehicles among other settings.

FIG. 4 shows one sample of many potential configuration settings for a given vehicle. In this case, User 2 has a login created for him or her named "CHILD". This login contains a set of settings that may or may not be configurable by User 2 since User 2 is not an administrator, only a subset of settings are open to him or her to alter. The drawing illustrates the settings that are user editable and admin only or restricted. The left column lists the type of settings corresponding on the same row on the right column. These settings are examples and may be altered, added to, or subtracted from in different embodiments. For instance, fuel use settings allow an admin in this case to choose what type of fuel the user login CHILD is allowed to use while logged into the vehicle. Similarly, location based settings allows an administrator to draw out a map of the area the user login CHILD is allowed to travel within while logged into the vehicle.

FIG. 5 describes extended settings from FIG. 4. This figure describes additional vehicle settings that are configurable by the user with the login "CHILD" and those that are only configurable by User one being the Administrator. FIG. 5 also describes a subset of settings a user login CHILD in this case is allowed to change. For example, the user login CHILD is allowed to select his or her radio stations, streaming services, and Internet access settings for a unified experience in any vehicle they log into using this log in. Similarly, the user login CHILD can access driving modes and set the vehicle mode to sport for instance. It should be understood that the example "CHILD" profile is just that, an example, and any type of user profile may be set with the defined privileges and/or restrictions.

Figure 6:
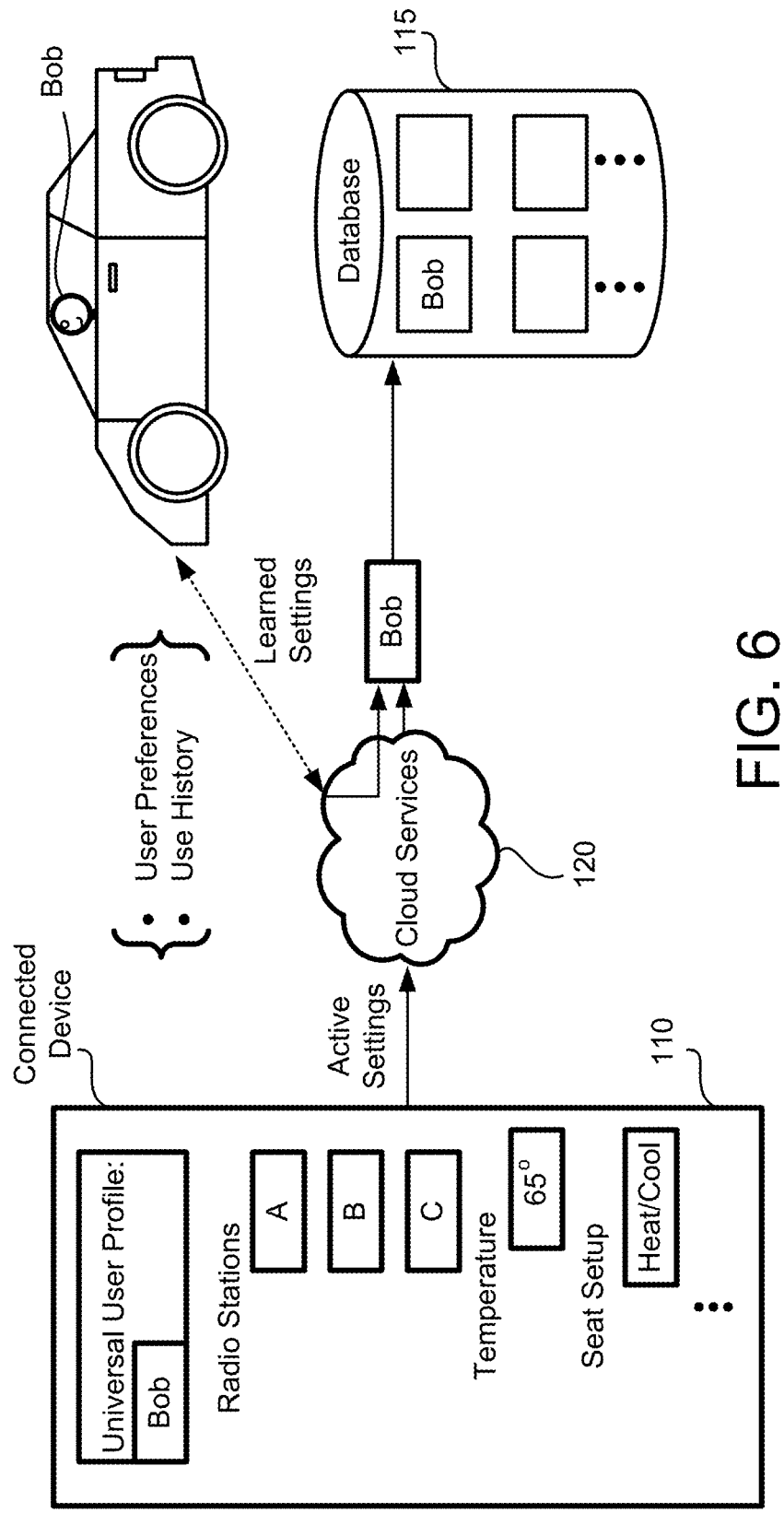
FIGS. 6-9B show example pairing of a vehicle to a user profile, and examples of a shared vehicle transfers of profiles for limited use of the profiles on the shared vehicles, in accordance with one embodiment.

FIG. 6 illustrates an example of utilizing a profile of the user, to access cloud services 120, and a database 115, in accordance with one embodiment of the present invention. In this example, a user may utilize a connected device 110 to access cloud services 120. Using the connected device 110, the user, in this case Bob, is accessing his universal profile settings. His profile settings may include settings that have been selected before in earlier sessions, or default settings implemented by a vehicle manufacturer, or another user such as an administrator. In the example, the user may access particular active settings managed by cloud services 120 which can cause Bob's profile in database 115 to be updated.

In one embodiment, Bob's profile can include specific settings, preferences, use history, and learned settings from earlier uses of one or more vehicles. The profile settings defined by Bob, are then transferred by cloud services 122 one or more vehicles utilized by Bob. For example, if the user wishes to utilize his regular everyday car, the profile settings may already be stored on the vehicle. If the user wishes to utilize a different vehicle, such as a friend's vehicle, a rented vehicle, a shared vehicle, a temporary vehicle, a loaner vehicle, a test drive vehicle, a company vehicle, etc., the user's profiles can also be transferred to that vehicle.

The user profiles can include standard settings that may be set at the various vehicles, or custom settings that can be selected for the user based on learned settings over time by use of various vehicles. In one embodiment, the user profiles are continuously updated and store to a database 115, which is accessible by cloud services 120. Database 115 may include data storage, such as cloud storage, data center databases, distributed databases, local storage on vehicles, network storage, and the like.

Figure 7:
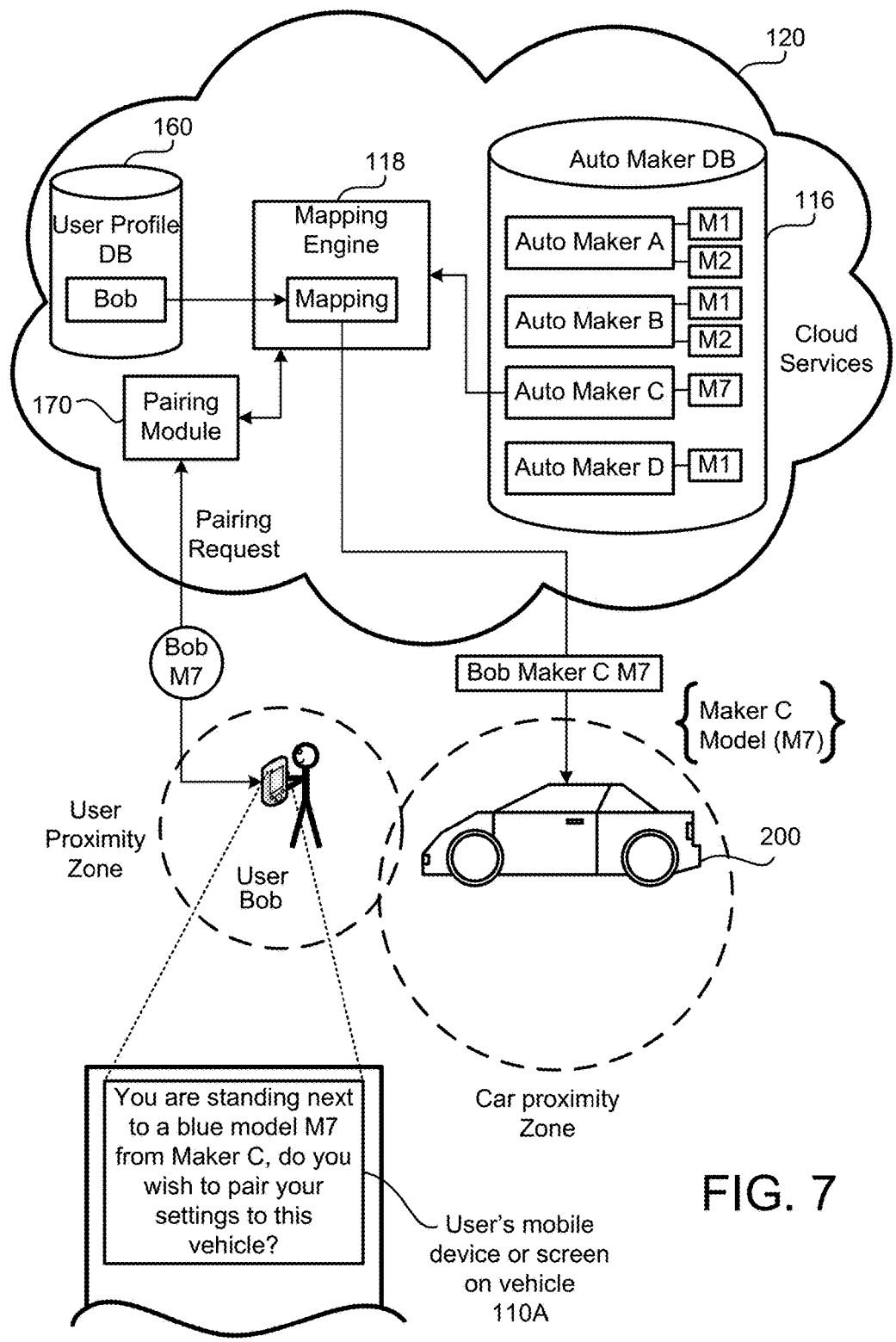

FIG. 7 illustrates an example of a user (Bob) that may wish to utilize a car 200, in accordance with one embodiment of the present invention. For example, the car 200 may be a shared vehicle, such as those commonly shared in urban cities. Shared vehicles are those that belong to a company and where the company provides accounts to users to access the vehicles for specific trips, specific times, periods of time, etc. Users that share those vehicles typically park the vehicles at different locations throughout an urban city. Users wishing to find a vehicle to use can access an application or website having access to an Internet connected application to find the vehicle closest to the particular user.

Once the user has located a proximate vehicle, such as car 200, the user may approach the vehicle so as to utilize the vehicle 200. In one embodiment, when the user approaches the vehicle, and comes in close proximity to the vehicle as detected by the geo-location of the users mobile device, a pairing request can be detected. The pairing request may be triggered once the proximity zone of the car 200 and the proximity zone of the user substantially or partially overlap. The proximity zone's may overlap when the user comes in close proximity to the vehicle, such as within a few feet, within a mile, or the user has touched or bumped the vehicle.

The pairing request may be automatically sent by the users device to cloud services 120. The pairing request can include sending the model of the vehicle 200 that may have been obtained by the users mobile device from the vehicle 200 directly. In the illustrated example, the pairing request by the users mobile device can include identification of the vehicle that the user has come in close proximity to. A pairing module 170, can then communicate with a mapping engine 118 that determines information associated with car 200.

An automaker database 116 can include data regarding a plurality of vehicles, including standard user interfaces, configuration interfaces, and other information necessary to provide user Bob with a custom interface for vehicle 200.

The mapping engine 118, in this example includes a map or that communicates with the automakers database to identify the settings, applications, APIs, or modules that allow integration of Bob's user profile from the user profiles database 160 so that Bob's profile can be sent to car 200. In the illustrated example, the mapping engine, the of the mapper, will obtain Bob's profile 160 for cloud services and obtain vehicle information for the user interfaces of the vehicle desired for use by the user.

The mapping engine 118 will transfer Bob's profile to vehicle 200. At this point, the user, Bob, can be provided with an interface on a mobile device to allow access to the vehicle. The user interface can include a plurality of screens with instructions, check information, cost information, billing information, etc. As illustrated in FIG. 7, the users mobile device can provide various notifications, such as identifying to the user that the user standing next to a blue model M7 from maker C. The user interface can ask Bob if Bob wishes to pair settings to the specific vehicle 200. If Bob desires to actually utilize the shared vehicle 200, the pairing request may be initiated as mentioned above.

Figure 8:
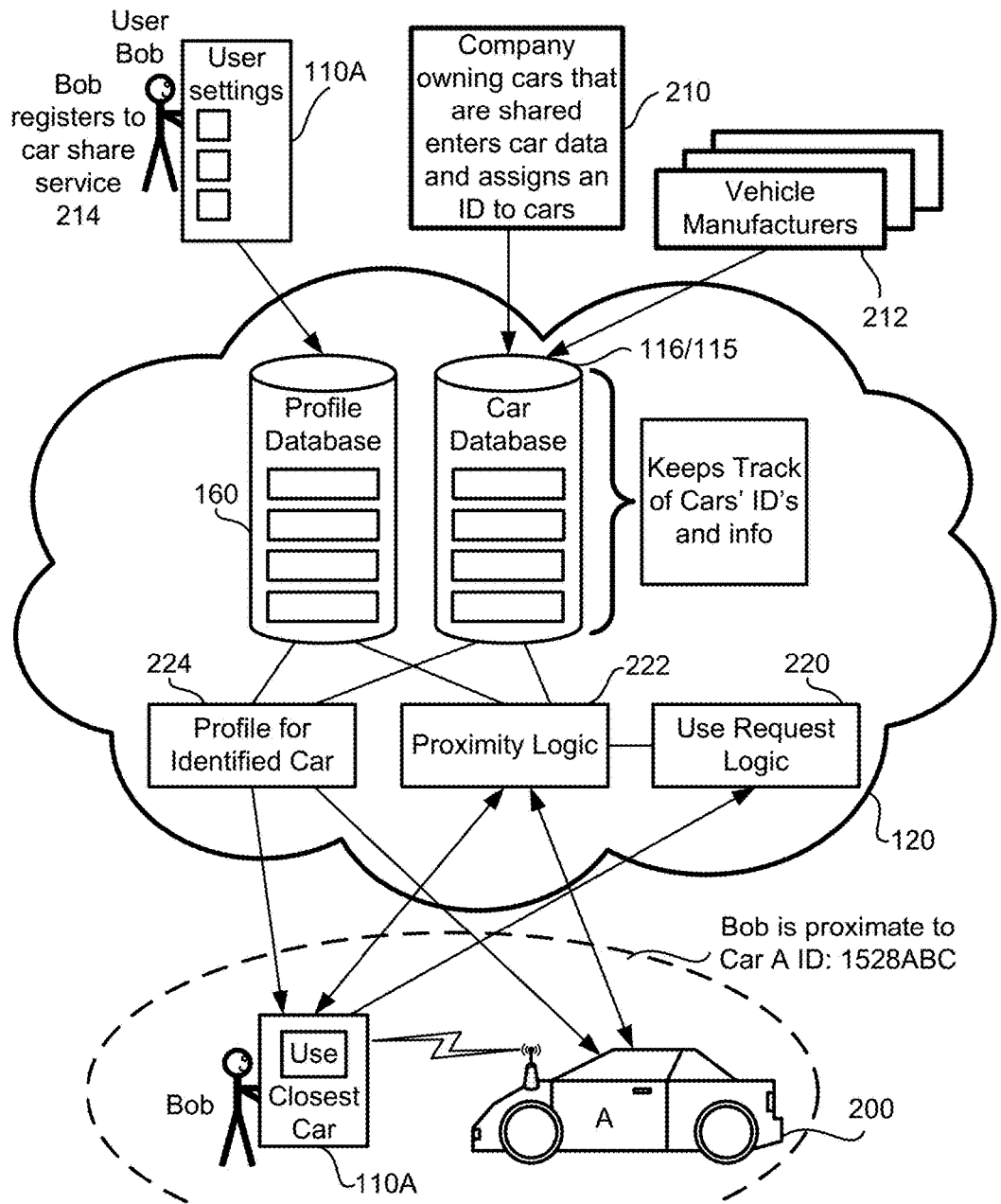

FIG. 8 illustrates another embodiment where the user Bob has utilized his mobile device 100a to define or access a plurality of settings. In one embodiment, the user may register 214 with a car sharing service, such as via a user interface or application having access to the Internet and the company providing the service. Cloud services 120 can then provide access to the profile database 160 where Bob's profile may be stored. The profile 160 may be accessible to 3rd parties, such as car sharing service.

Also shown in cloud services 120 is the car database 116/115. The car database can then be provided with information from the car sharing company 210 that identifies the cars that the company owns and that are shared with the service. The car data including assigned IDs to the vehicles and cars can be stored in the car database 116/115. Additional data can be supplemented from vehicle manufacturers 212. The cloud services 120, in accordance with one embodiment, can include logic for profile identification for vehicles 224, logic for proximity detection 222, user request logic 220, and other managing logic for receiving request from users, managing databases from a car sharing database, managing data from vehicle manufacturers, and receiving request to manage profiles an axis vehicles.

As illustrated, when the user Bob approaches the vehicle 200, the Bob's mobile device 110a can identify the closest car, which may be car A. In this example, Bob is identified to be proximate to the car having an ID 1528ABC. In one embodiment, when the user comes in proximity to the car 200, the car can beep or light up when enabled, it can open the doors to allow the user to access the vehicle when the logic has paired the user to the vehicle, the profile of the user can be transferred to the vehicle, the use of the vehicle is managed by the user's online account (storing historical use data and any billing information), automatic payment for use can be made from predefined payment arrangements stored in the profile, and use of the vehicle can be restricted to predefined rules, based on the profile. Accordingly, the profile database 160 can include both profiles of the user, such as user settings, as well as profile restrictions that may be set by the car sharing service.

Figure 9A:
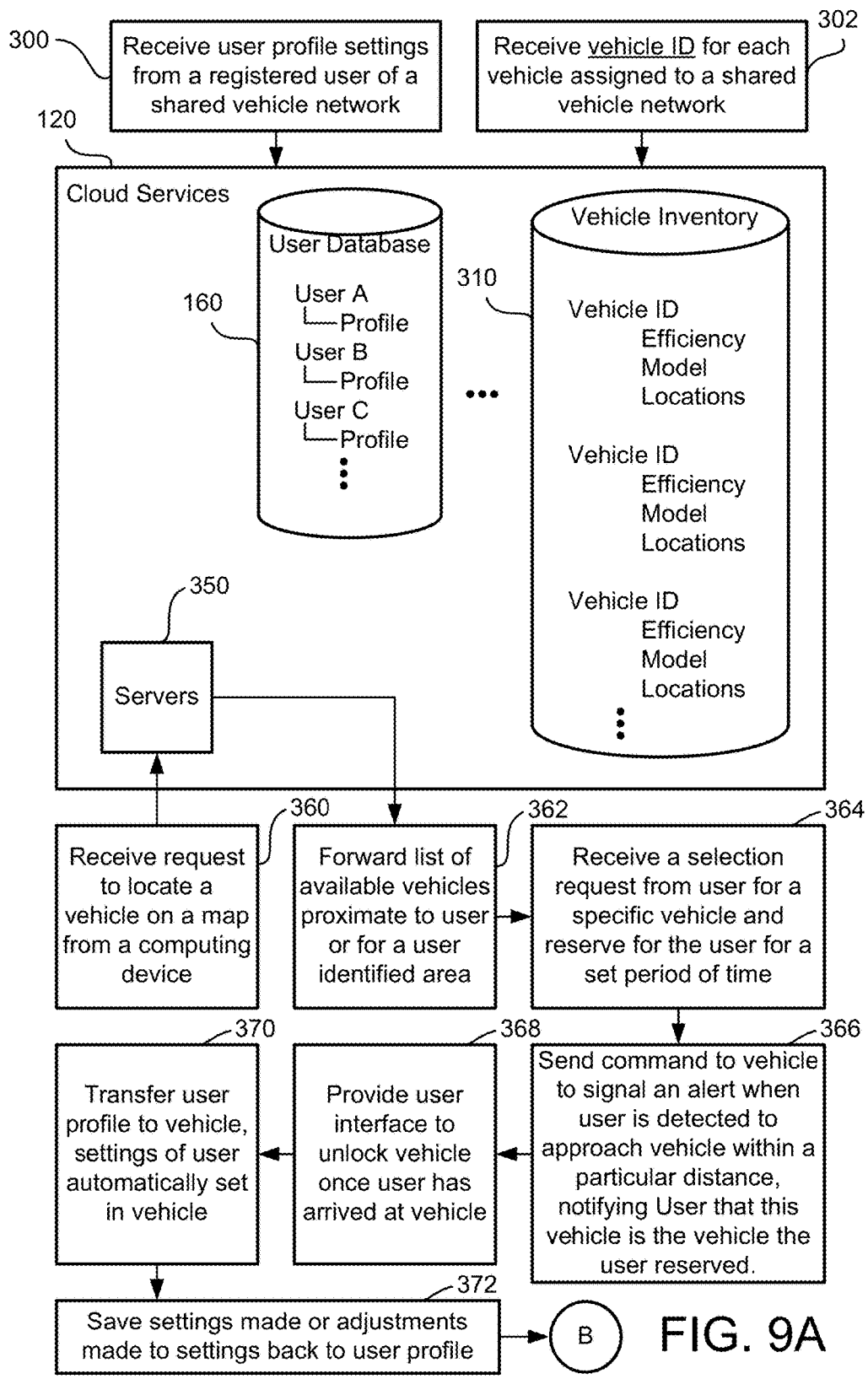

FIG. 9A shows one example process for utilizing user profile settings from a registered user and utilizing settings of a shared vehicle network, in accordance with one embodiment of the present invention. In this illustration, operation 300 receives the user profile settings from a registered user of a shared vehicle network. The registered users profile can be obtained from a cloud services profile, such as the profile used for a number of vehicles which may be in or outside of the shared vehicle network.

In another embodiment, the profile may be the profile set by the shared vehicle network, based on the service contract entered by the user. In operation 302, vehicle IDs for each vehicle assigned to a shared vehicle network are received by cloud services 120. Cloud services 120 will therefore maintain a user database 160 with a plurality of user profiles.

Cloud services can also maintain a vehicle inventory database 310 for the shared vehicle network. Servers 350, which operate cloud services 120, and therefore managing access database 160 and 310, as well as provide logic for providing access to vehicles, unlocking vehicles, and transferring user profiles to specific vehicles. In operation 360, the servers 350 may receive a request to locate a vehicle on a map from a computing device. The request may be provided with reference to the user's current location, using GPS or the like. The request is then processed by servers 350, and servers 350 communicate the forward a list of available vehicles proximate to the user or for the users identified area in operation 362. In operation 364, a selection request is received from the user for a specific vehicle and a reservation is made for the use of the vehicle for a set period of time.

In operation 366, a command is sent to the vehicle the signal alert when the user is detected to approach the vehicle within a particular distance, notifying the user that the vehicle is the vehicle that the user reserved. This provides for a method of allowing the user to easily identify the vehicle that the user reserved. For example, if the user is instructed to go to a specific parking lot to identify the vehicle that was reserved, the user would have a difficult time identifying which vehicle it is that the user reserved. However, by allowing cloud services to signal to the vehicle to sound the alarm, turn on a light, beep, for make any other identifying gesture, the user can easily identify the vehicle in the parking lot.

In operation 368, a user interface is provided to the user's mobile device that will provide a notification to the user indicating that the person/user has arrived at the vehicle. In operation 370, the users profile is transferred to the vehicle. The transfer of the profile will allow the settings of the user to automatically be set in the vehicle. The settings can include, for example, temperature, radio settings, seat settings, meter settings, air settings, etc.

Figure 9B:
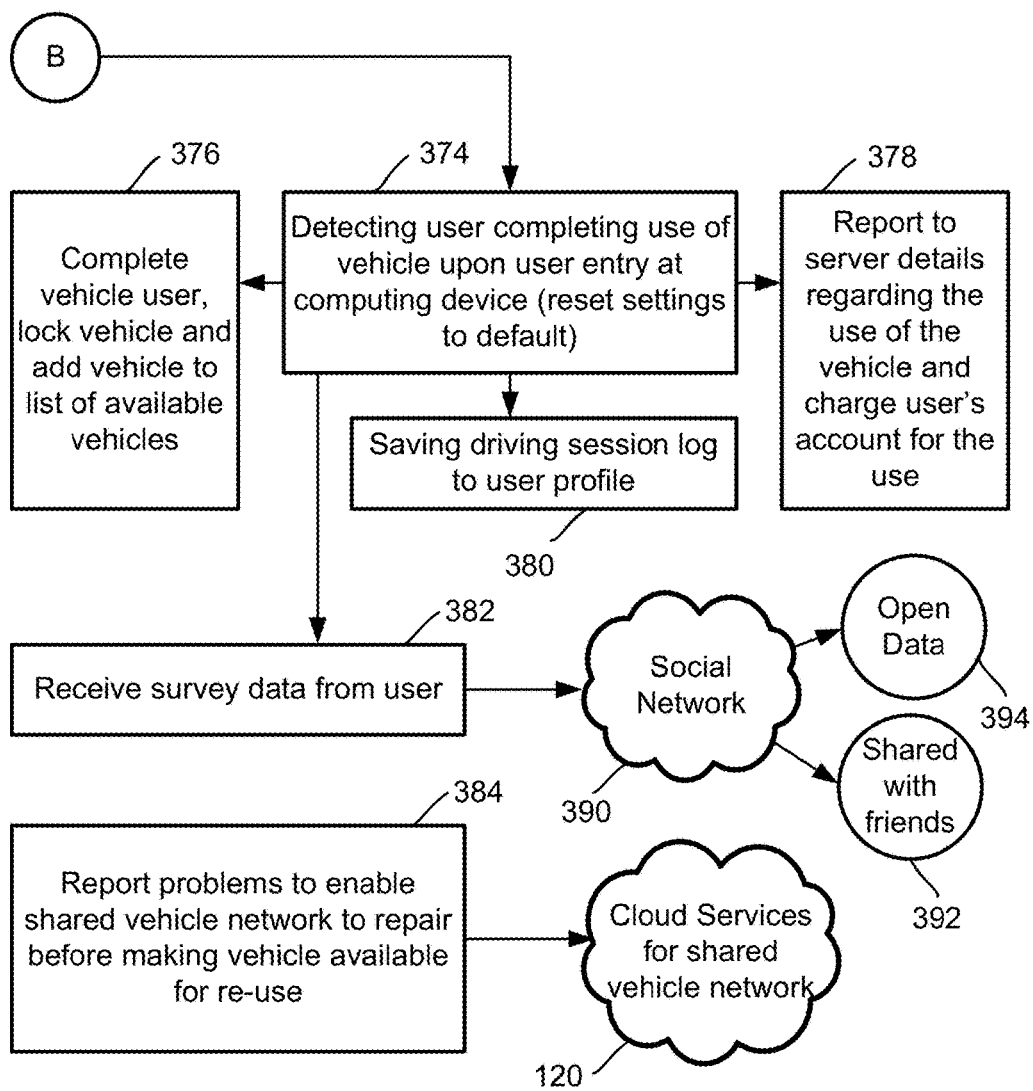

In operation 372, the settings that are made by the user when in the vehicle or adjustment settings can be sent back to the user profile. Thus, when the user offering the vehicle and making changes to his or her profile, those changes can also be communicated back to the profile database in cloud services 120. This provides for a continuous feedback loop over time, to allow the users profile settings to be managed and maintained current to the users best liked preferences. The operation then proceeds to B in FIG. 9B.

In operation 374, it is detected that the user has completed use of the vehicle upon some user entry at a computing device. The computing device may be computing device of the vehicle, or a mobile device. The entry can be, for example, the user logging out of the vehicle indicating that the user has terminated use of the vehicle. At logout, the vehicle's original profile settings will then be returned, and the users custom profile settings will be terminated.

In operation 378, a report sent back to the server regarding the use of the vehicle and the charges to the users account for the use. In one embodiment, the use reporting can occur continuously while the user is driving vehicle. In operation 380, the drivers session log can be saved user profile, keeping a history of the user's travels. In operation 382, survey data can be requested of the user regarding the vehicle use. Because the user was utilizing a shared vehicle, feedback from the user can be helpful to potential future users that may want to rent or utilize vehicles from the same company.

The user may be provided with options to publish likes and dislikes or commentary to a social network 390. Ratings can also be transferred to rating companies, such as those that allow internet users to view user comments, reviews, complaints, etc. The social network 390 can allow the data to be open data 394, or data that is shared with friends 392. In operation 384, problems with shared vehicle can be reported to the vehicle network to allow repairs before making the vehicle available for reuse. Cloud services for the shared vehicle network can then be updated in cloud services 120. For example, if the vehicle has been identified as having some mechanical malfunction, the cloud services can update that vehicle as being out of service, so that discovery of that vehicle does not cause users to access that specific vehicle that may be out of commission.

Figure 10:
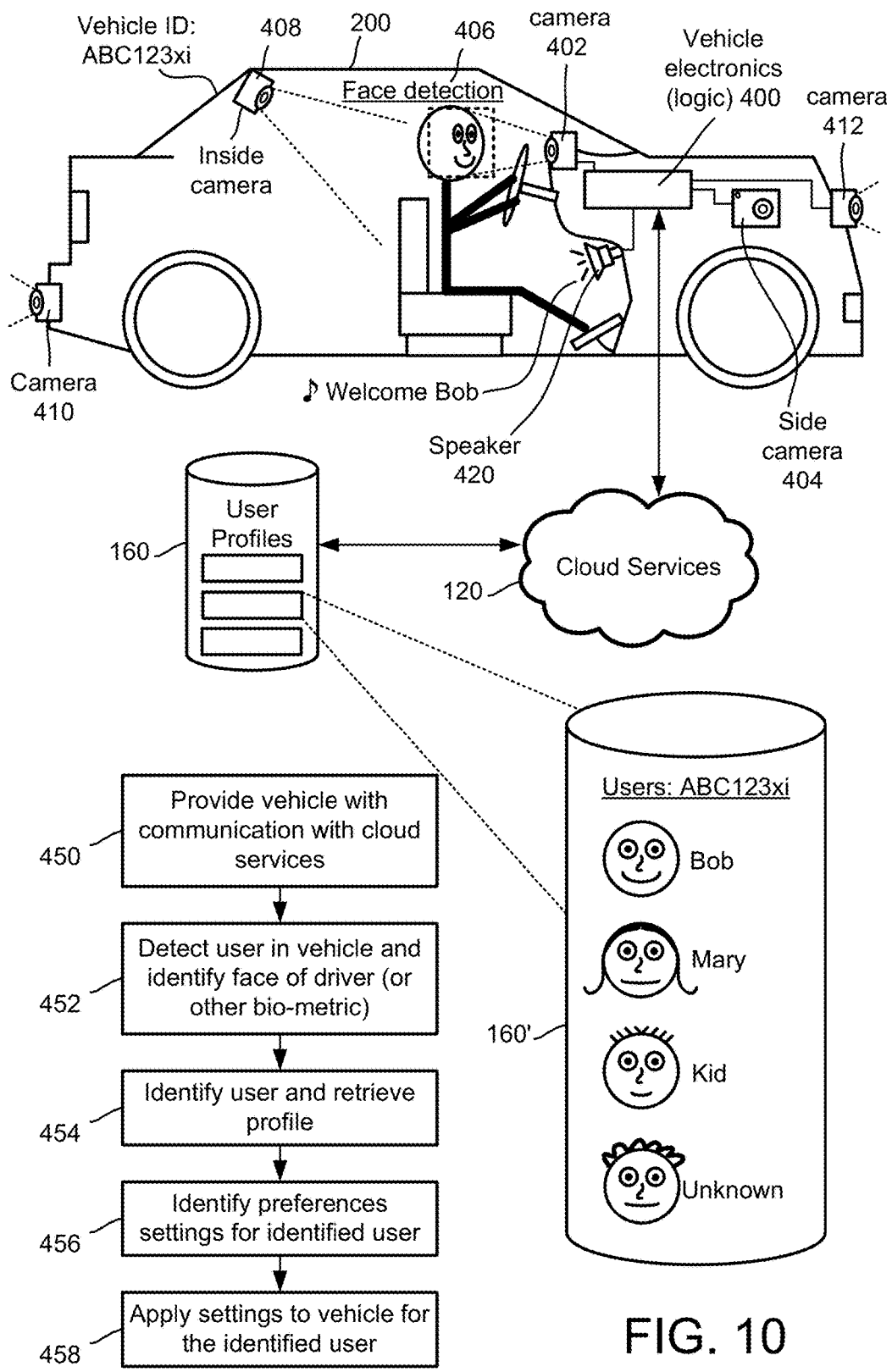
FIG. 10 illustrates validation method for enabling a profile on a vehicle and biometric validation, in accordance with one embodiment.

FIG. 10 illustrates a user (Bob) entering the vehicle, such as a shared vehicle 200, in accordance with one embodiment of the present invention. In this example, the user has been identified by the vehicle, such as using a camera 402. The camera 402 may use face detection 406 to automatically identify the user, and set the users preferences and settings for the vehicle automatically. In some embodiments, this allows verification that the user driving the vehicle 200, from the shared network, is the driver that unlocked the vehicle from a remote location (such as a mobile device). In this example, the vehicle 200 may also include a plurality of cameras, such as cameras 404, 408, 410, 412, 402, etc. Any one of these cameras can be accessed from a remote location, if the user's profile provides access, or the privacy setting allows such access.

These cameras can be used to detect and monitor the exterior portions of the vehicle as the vehicle drives around, as well as interior portions of the vehicle. These cameras can be used by the vehicle sharing company to monitor the status of the vehicle, and the location where the vehicle is parked. In one embodiment, the user who has rented the vehicle can set a privacy setting to disable certain cameras. In one embodiment, a speaker 420 can be activated to allow the vehicle to speak and communicate with the user. Vehicle electronics and logic 400 can be in communication with cloud services 120.

Cloud services 120 can also be in communication with user profiles 160. In one embodiment, the user profiles 160 can also include specific profiles for registered users. In one embodiment, the registered users can include a family of users. A specific family can have a number of drivers or users that have been registered with a service. For example, the database can include users ABC123xi (such code is only an example, and any form of ID/code can be used), and the users can include a particular family or group of people. The group of people can also be a group associate with a company, a sharing service, a group established for a particular event, or other types of groupings. The vehicles can therefore be monitored for use by the specific users in a particular family or group. In one embodiment, the particular family and groups can be associated with their own profile history settings, which include data from their previous uses.

In one embodiment, FIG. 10 illustrates a process utilize to communicate between vehicles, users, and cloud services. In operation 450, a vehicle with communications is provided with cloud services. The cloud services will be in account, software, or interface that allows communication with cloud services 120. In operation 452, the user in the vehicle may be detected, and the face of the driver or other biometric data can be used to identify the specific user sitting in the car. The detection of the user can, in one embodiment be enabled or restricted based on privacy settings desired by the user.

In operation 454, the user may be identified and the users profile can be automatically retrieved from cloud services and the user profile 160. The preferences settings for the user can be identified from the database in operation 456, and the settings can be applied in operation 458. The settings can be applied to the vehicle for the identified user. When the user terminates use of the vehicle, the settings can't be deactivated, or return to a neutral setting.

Figure 11:
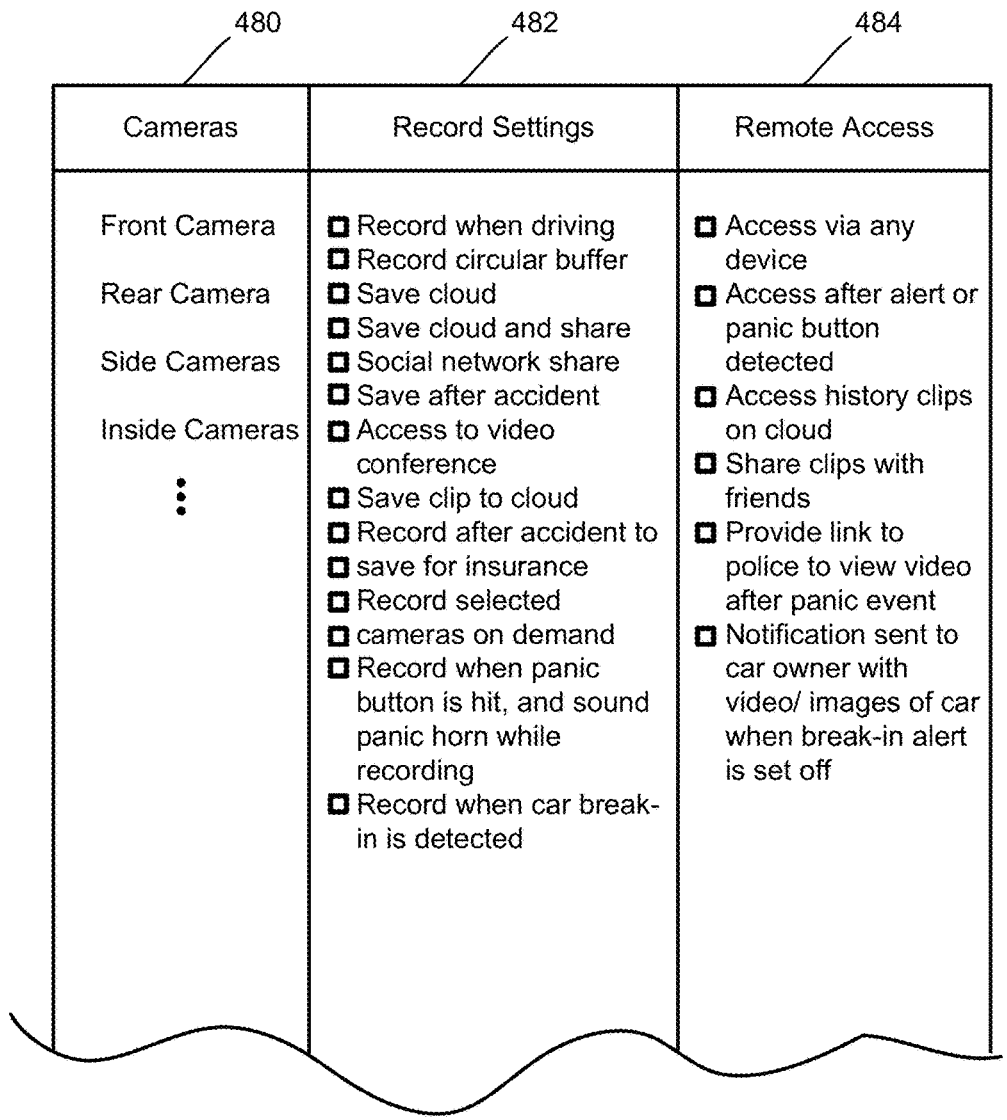
FIG. 11 illustrates various settings for a profile and adjustments that can be made over the Internet via a device, e.g., using a portable device or the vehicle electronics and displays, and remote controls and settings in accordance with one embodiment.

FIG. 11 illustrates an example of particular types of settings that can be set, or recorded, or accessed, in accordance one embodiment of the present invention. In one example, cameras 480 can be provided as options for access by the user. The cameras can be accessed to view historical uses by the user, or can be access to view current and live video of the vehicle. For example, if the user has rented a vehicle for a period of time, and parked it in a specific location, the user can monitor the vehicle from a remote device connected to the Internet.

Record settings 482 can also be set by the user, the vehicle provider, or cloud services. A plurality of recording options and access can be set or adjusted by the user from a remote location. Remote access 484 also provides the user with options to control specific features of the vehicle. The control the vehicle can be set for a period of time when the users profile is associated with the vehicle.

In a car sharing environment, the remote access of the vehicle can be enabled during the period of time when the user is assigned or the users account is assigned to that vehicle. In examples where the user owns the vehicle or is more tightly connected to the vehicle, the remote access can be provided by entering axis control information, credentials, passwords, usernames, and biometric data or combinations of one or more.

In still other embodiments, user interfaces are provided to provision customized data regarding available charge station locations. In one embodiment, users having other devices, such as smartphones or portable electronics can obtain data, which can be shared with other user interfaces. The sharing can be by way of a sync operation, that can be automatic when the user enters the vehicle or on demand by the user. In other embodiments, the application or program running on the user portable electronic device can continue to execute the processing, while allowing the display of the vehicle to show all activity on the display. For example, if the vehicle electronics are not capable for processing an application or access a cloud service, the portable device can act as the agent for the vehicle electronics. In one embodiment, the display and I/O of the EV simply acts as a passive interface, while the processing or accessing to cloud processing is done by the user's portable electronics (e.g., smartphone or the like).

In some embodiments, the user's portable device is already programmed with access codes, passwords, etc., so the user may wish to use the portable electronics instead of having to program the vehicle. This is important when users share a vehicle. If users share a vehicle, one user may have the electronics programmed to their likes or dislikes. By allowing programming, data settings, etc., to be shared or synced (e.g., temporarily or not), users can more easily share vehicles, while keeping the settings that the user is used to having.

In still another embodiment, allowing the user's smart phone or portable electronics to sync with an EV, users of rental cars can more easily step into cars with pre-programmed settings. Thus, users that temporarily use vehicles need not worry about programming the car's settings upon entering the car, but simply sync with the vehicle to allow the vehicle to run display, IO and services based on the custom settings of the user's portable device.

This processing that allows users to sync a vehicle with a user's custom settings stored in the user's portable device can also have application to car sharing environments. In big cities, companies allow users to locate vehicles in a proximity to their current location, and simply enter the vehicle using their membership code. In addition to providing users with access to the vehicle, the user/driver's settings can be synced to the vehicle. This can include settings of the seats, the mirrors, the temperature, the radio stations, and the Internet apps to display on the car's display, etc. Custom information, such as prior uses of the car, cost for driving, etc., can be displayed on the car's display, via the sync data from the user's portable device. The sync data can be obtained at any time, such as by using the user's portable Internet link, etc.

In one embodiment, a user's EV or non-EV vehicle can be in communication with cloud services, and the cloud services can be interfaced with data from various entities that provide power for the grid, provide charging units (CUs), provide discounts to charge at particular CUs, geo location services, mapping services, live traffic data, etc. The user of the EV can communicate with the vehicles electronics via a display unit and its associated electronics, can provide input via touch or voice, can request data regarding routs to local charge stations, cost estimates at the various charge locations, how crowded the charge stations are at the various locations, etc.

The cloud services 120 are also accessible via a computer that has access to the Internet, a smart device (e.g., smart phone, tablet, etc.), etc. Thus, data can be acquired from various sources and data can be consumed by various sources. The data that is acquired, shared or accessed can be launched on the user's device and then transferred to share in real-time with the display and/or electronics of the vehicle. Thus, a unified access display can be customized to the user, regardless of the vehicle that the user chooses to drive. This is in contrast to current models that customize settings for one vehicle owner or owners.

In one embodiment, the user's settings are seamlessly transferred to the vehicle the user chooses to drive. This is especially useful for cases where a user drives many cars, but wishes to keep his settings constant. Settings can include cloud services, or local settings such as seat positions for the size of the user, mirror positions, radio stations, weather stations, history of routs taken, favorite locations to visit, etc. The application that allows syncing of a user's settings on a portable device to the vehicle electronics is especially useful for car sharing applications, which is common in large cities and may expand in the future. As car sharing increases, it is most useful to allow a user to save his/her settings in their mobile device, instead of relying on the fixed settings of the vehicle. In another embodiment, it is also possible for a user to type in their universal login code (e.g., user name/password) into the car display, and all of the user's settings are transferred to the vehicle while the user is driving the EV. Once the user stops using the EV, the car can go back to the normal mode for another user to login. The data regarding the user's settings would, in this embodiment, be saved in the cloud.

In one embodiment, user interfaces of a mobile device can share data with the vehicle's display and native apps. App unification allows EV system to display APPS on the user's smartphone device in an opt-in PAIR mode. In one embodiment, this allows one person to enter another's EV, share apps on the EV display while in the EV, and when the person leaves the EV, the Apps de-pair. This auto-sync facilitates sharing of data and also allows users to unify their settings across any number of vehicles the user may drive.

In one embodiment, the synchronization will enable users to universally transfer settings from portable devices to electronics of a vehicle. In some embodiments, the vehicle that the user wishes to drive is not his vehicle. For instance, the vehicle may be a friend's vehicle, a rented vehicle or a shared vehicle. If the user has programmed settings in his or her device, the settings that are useful for the vehicle will be transferred to the vehicle. Settings can include travel speed restrictions, car seat settings, mirror settings, remote access to home controls (e.g., lighting, garage doors, etc.), radio settings, satellite radio settings, internet settings, etc. In some cases, only some settings are directly transferrable. In other embodiments, a database can be accessed to find a translation metric. The translation metric can include mapping tables that allow for settings to be transferred between functions of one vehicle to other vehicles. In one embodiment, vehicle makers can upload their translation metric for each model and the mapping tables can be used to provide the sync operation.

Figure 12:
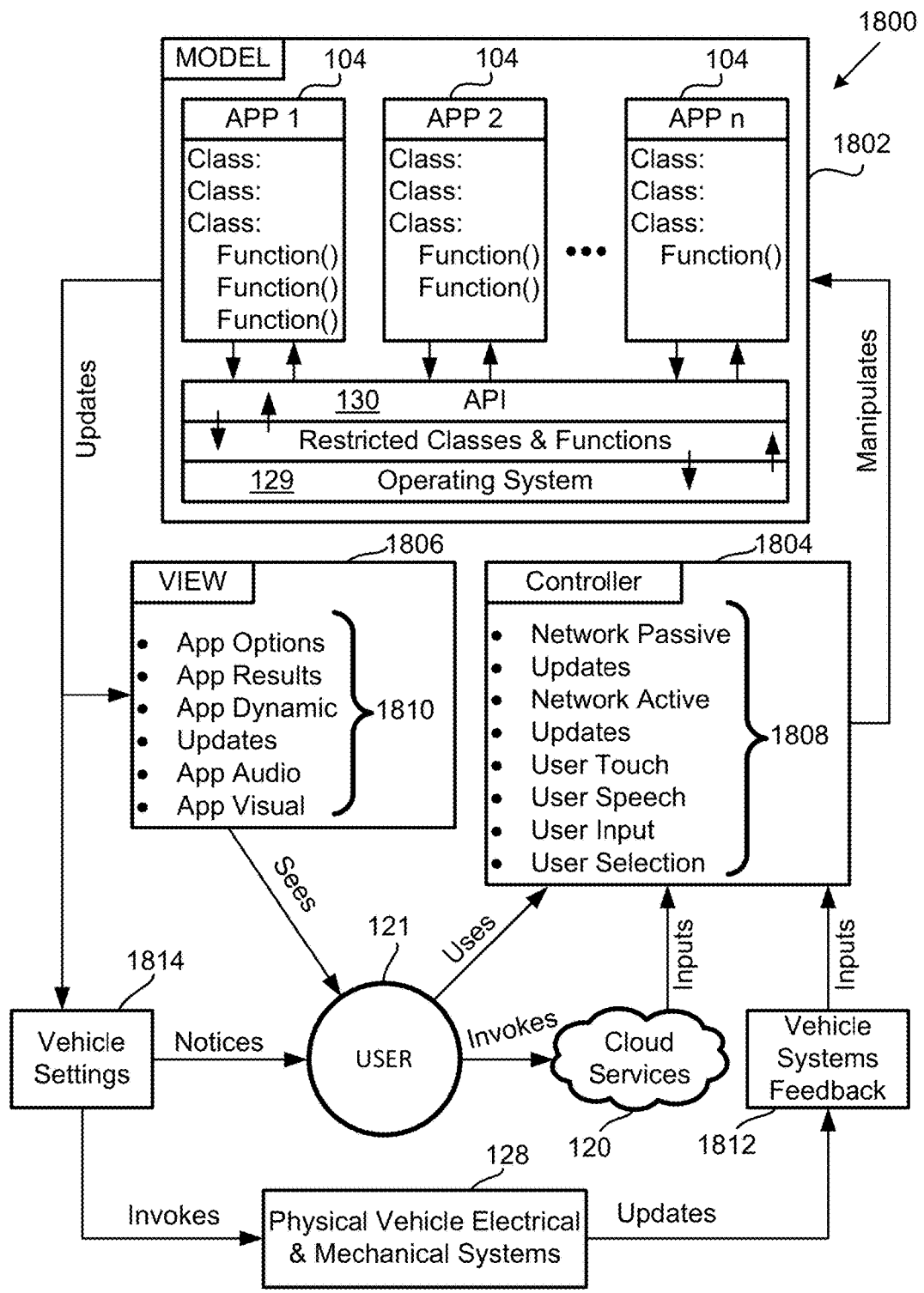
FIG. 12 illustrates a system in which a user interacts with a model view controller software environment useful for processing APPS using APIs on vehicles with vehicle operating systems capable of processing computer code, in accordance with one embodiment.

FIG. 12 describes a system in which a user interacts with a model view controller software environment 1800 useful for processing APPS using APIs 130 on vehicles with vehicle operating systems 129 capable of processing computer code. The APPS can execute profile retrieval, updates, and sync operations. The model view controller paradigm 1800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 1812 used by a controller 1804 that may constantly poll electrical, capacitive and physical sensors, and input streams to detect if interactions 1808 such as network passive updates, network active updates, user touch, user speech, user input, user selection among others has been triggered.

Each input 1804 will then trigger manipulation of the system's model 1802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, audio or visual graphical user interface changes 1810 on any of the user's connected display devices. The user will notice these results visually or audibly but may also feel or detect changes in the vehicle's mechanical systems. Updates from the model 1802 may also be used to toggle vehicle settings 1814 which in turn may invoke changes in the vehicle's physical, mechanical and electrical systems 128.

Finally, the system controller 1804 may receive additional updates from the vehicle systems affected or additional user 121, cloud services 120, vehicle systems feedback inputs 1812 to re-engage the user in a cyclical fashion. If no inputs are sensed, the system's controller will continue to poll its electrical and data I/O systems for input on a continuous basis.

The model view controller paradigm 1800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 13A:
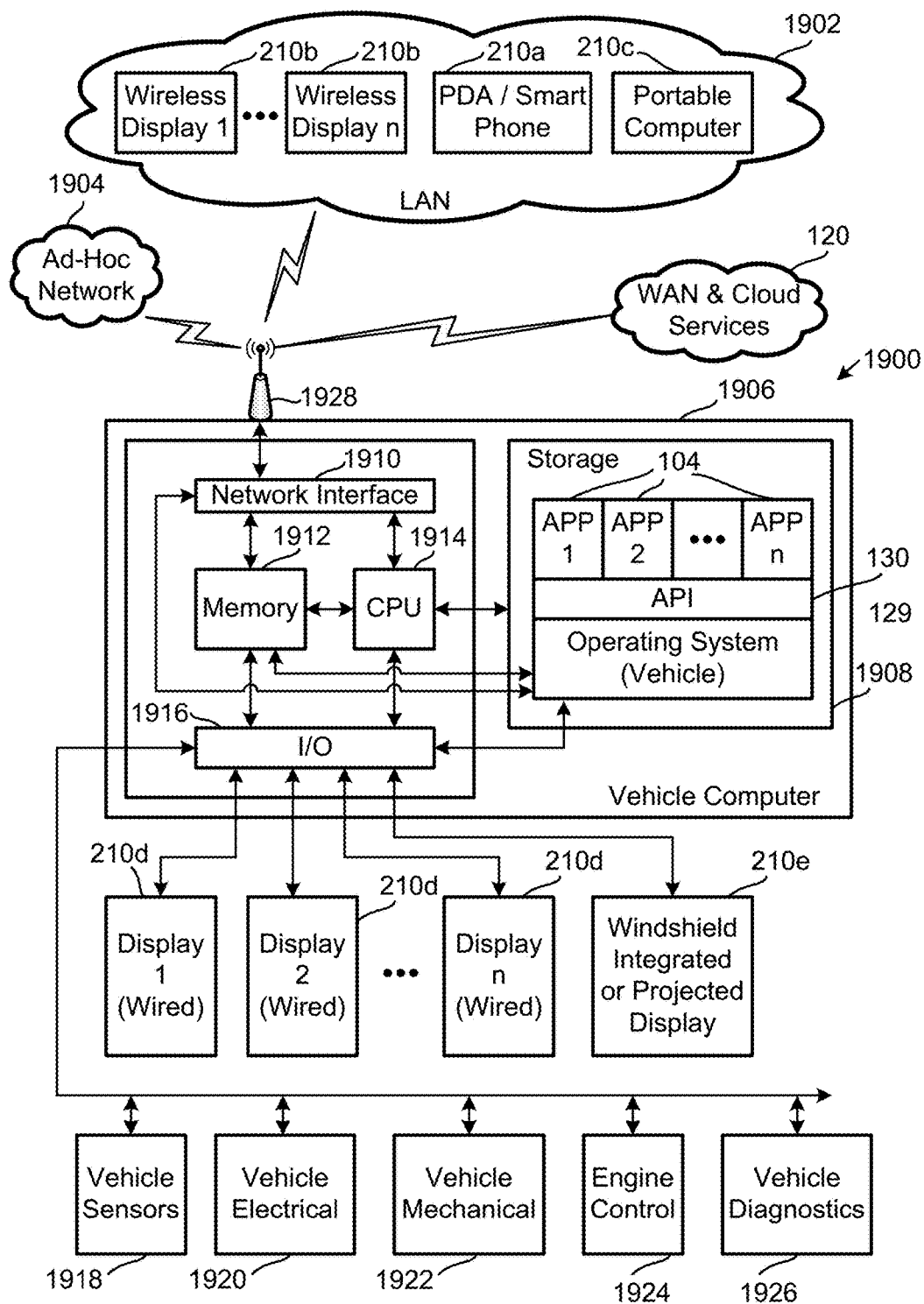
FIG. 13A illustrates how vehicle on board computer with input output system useful for accepting input, processing input and displaying results in conjunction with stored computer readable programs or functions in the forms of APPs may be structured, in accordance with one embodiment.

FIG. 13A describes how vehicle on board computer with input output system 1900 useful for accepting input, processing input and displaying results in conjunction with stored computer readable programs or functions in the forms of APPs 104 may be structured. Although system 1900 describes one way to provide vehicle on board computing power to run APPs 104, the arrangement of the vehicle computer 1906 may be altered or arranged in differing fashions with differing connection routing in order to achieve the same. In this example, vehicle on board computer 1906 may be comprised of components such as the network interface 1910, memory 1912, a central processing unit 1914, an input output buffer useful for streaming data 1916, storage 1908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 1906 has the ability to transmit, receive and process information using wired or wireless connections. One such wireless connection is provided by a wireless data sending and receiving antenna 1928 connected to a network interface 1910 useful for pairing with and communicating data with portable or stationary wireless devices which may or may not be part of a network 1902. Such wireless devices include but are not limited to wireless displays 210b, portable smart phones 210a, portable computers, 210c and even stationary objects, structures, buildings, toll bridges, other vehicles etc. The vehicle's network interface 1910 through antenna 1928 may also communicate with cloud services 120 to receive instructions from a remote location that invokes stored programs such as APPs 104 on the vehicle's computer.

The vehicle may also send and receive data wirelessly in order to establish a connection with a peer-to-peer ad-hoc network. Invocations may result in output data streams interpreted by wireless devices 210b, 210a, 210c as well as wired devices such as wired displays 210d or vehicle integrated display devices such as windshield heads up projected display or integrated glass displays 210e. All data streams generated by APPs 104 stored on the vehicle's computer may also be triggered by wired devices such as vehicle sensors 1918, vehicle electrical systems 1920, vehicle electrical systems 1922, engine control systems 1924, vehicle diagnostics systems 1926, user input as well as environmental input.

A user and or vehicle may find system 1900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 1906 that can process the input using the computer's wireless antenna 1928, network interface 1910, input output system, 1916 automatically responding to the toll bridge with payment information. Once the payment is received and processed, the APP 104 receives information from the stationary wireless toll taking device which is then stored either locally on the vehicle's storage 1908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 13B describes one example of how stored data and function declarations may be compiled to provide intermediary access to a vehicle's computer controlling vehicle systems 1950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 1954 describes an example set of data that may reference memory locations and their contents. The contents of these memory location may be modified by stored procedures 1956 or functions.

This HVAC API 130 has the ability to store data relating to the vehicle's temperature, status, target temperature, split zone temperate, data from electrical and mechanical sensors, calendar dates, error information among others. Invocable functions 1956 are the methods by which a third party APP 104 may manipulate data 1954 on board a computer. Free access is not given to the restricted data on a vehicle's computer, thus a structured method or methods are described for user by third party APP developers.

These functions 1956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 13C describes a set of computer readable and executable code 1970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees.

The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 14:
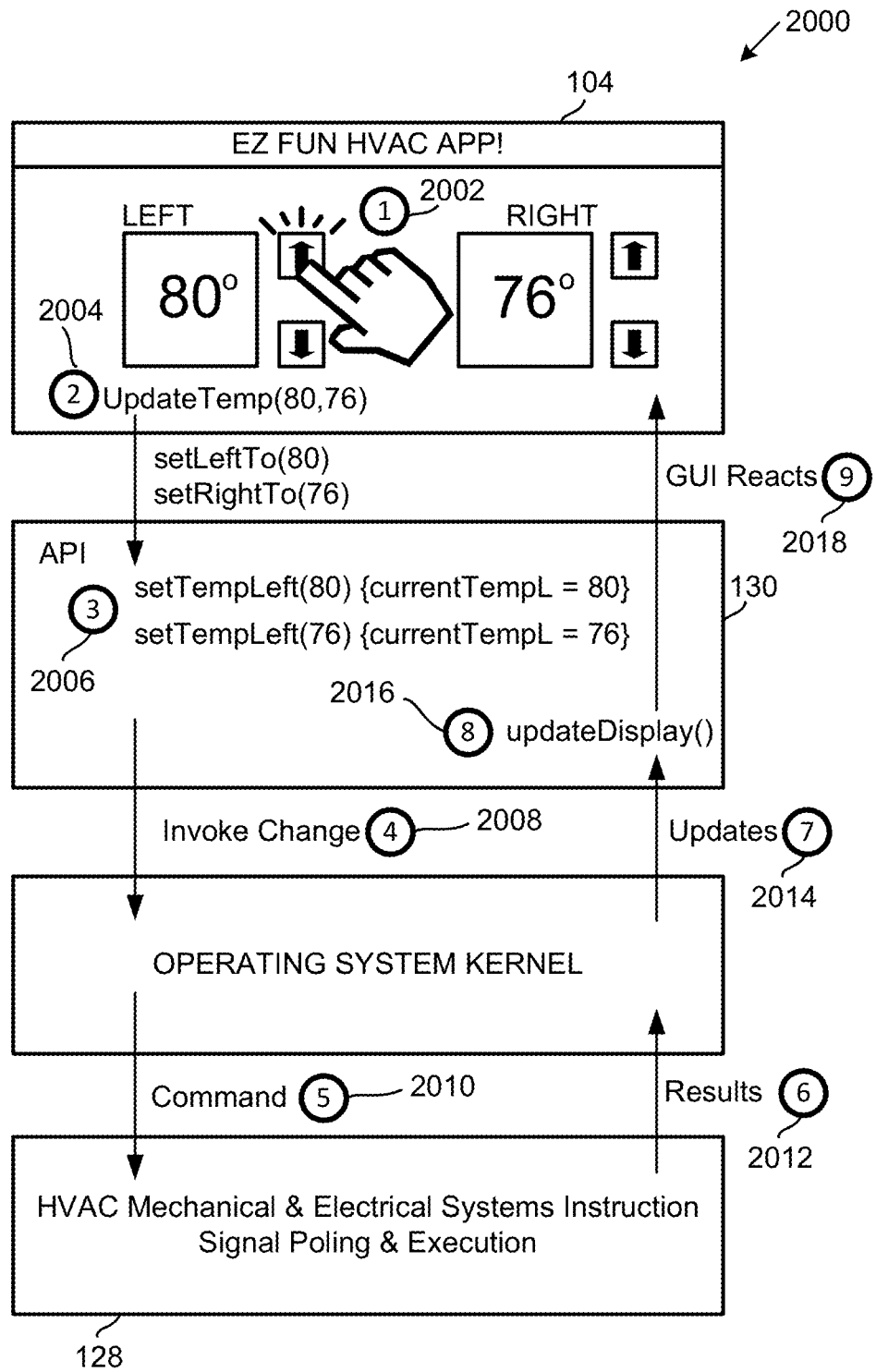
FIG. 14 illustrates the stepped flow of events as a user interacts with an APP, in this case, an HVAC APP, in accordance with one embodiment.

FIG. 14 describes the stepped flow of events 2000 as a user interacts with an APP 104, in this case, an HVAC APP 104. The GUI shown for APP 104 describes the first step 2002 where a user physically interacts with a sensor, screen, voice system etc. polling to see if an input has been received. The user's input in 2002 has been interpreted by the app to raise the temperature on the left hand side of the vehicle to 80 degrees and maintain the temperature on the right hand side of the vehicle at 76 degrees. This input invokes step 2004, which calls a stored function on the APP 104 that is API 130 allowable with arguments. The stored function may invoke other helper or associate functions within the API 130 in step 2006, which all in tern invokes restricted computer readable code at the operating system and or kernel level in step 2008. These invocations will then in turn command mechanical and or electrical systems in step 2005 in order to achieve the requested response in step 2002.

The results of the commands on the vehicles systems are based back to the vehicle's operating system or kernel level in step 2012 which then updates data on the API 130 in step 2014 that the APP 104 is polling, such as updating the display to show the resulting temperature in step 2016. The results of a function that is invoked at the API 130 level updating the display produces a data stream translatable and displayable by the vehicle's screen showing the APP 104's GUI in 2018.

Figure 15:
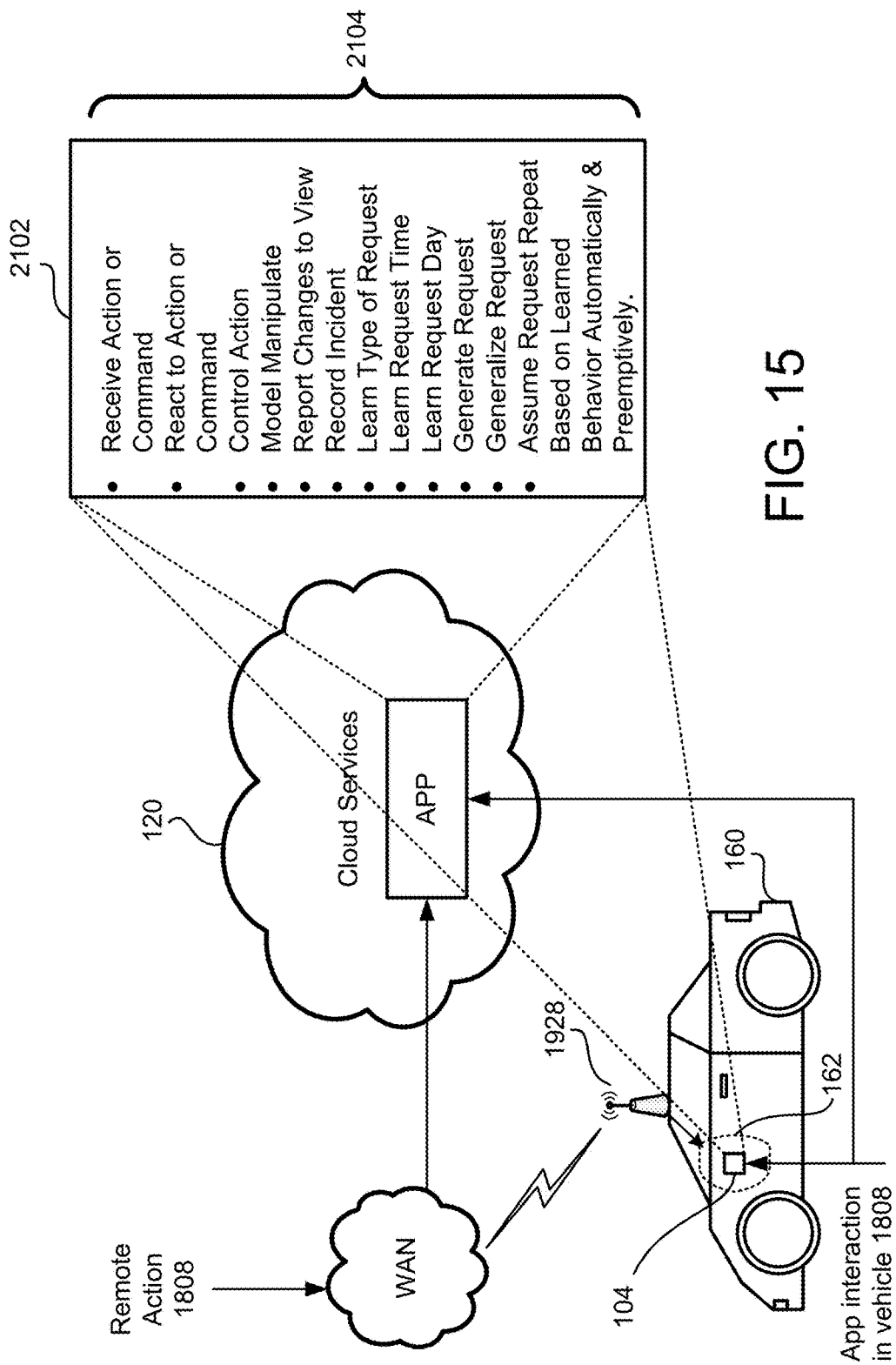
FIG. 15 Describes further ways an APP may take, process and produce results, in accordance with one embodiment.

FIG. 15 describes further example ways an APP 104 may take, process and produce results 2100. FIG. 14 shows a way to interact with an APP 104 locally but a vehicle computer system may relay data, inputs and information to the APP while connected to a wide area network, local area network, cloud process 120 or private cloud. A remote action to invoke change on an APP 1808 may be initiated via a network and pass to the APP running on the vehicle 160 using the vehicle's antenna 1928 or wired interface. An APP 104 running virtually on a network or cloud services 120 may also take input remotely and process the results accordingly.

Some of the inputs and results 2102 that an APP can take and produce locally or remotely include but are not limited to the set 2104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings.

The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some examples, notifications can be provided with a link or access to a user interface of an application. Via the application, the user can manage, set, control or view any aspect of the connected vehicle. In some cases, the settings can be manually adjusted by the user way from the auto settings. In such cases, the manual setting can be learned and can be provided more weighting since the user took the time to correct an auto setting. Thus, various levels of weighting or importance can be given to learned settings. In other embodiments, the learned settings can be compared against learned settings of other vehicle owners having access to cloud processing. Using data from these different user profiles, learned settings can be obtained or generated.

Generation or analysis can be by way of overlap processes, cluster analysis algorithms, Connectivity based clustering, centroid-based clustering, clustering model most closely related to statistics is based on distribution models, cluster validation, density-based clustering, KNN/profile similarity, collaborative filtering, content-based filtering, hybrid recommender systems, mobile recommender systems, cross-sectional analysis, similarities in particular data types or settings, concentration in similar settings by particular demographics, and other similarity analysis calculators and aggregators. These settings can then be recommended to the user or can be automatically added to the profile. Recommender systems can the user the analyzed data to generate the custom recommendations for settings to users' profiles.

Figure 16A:
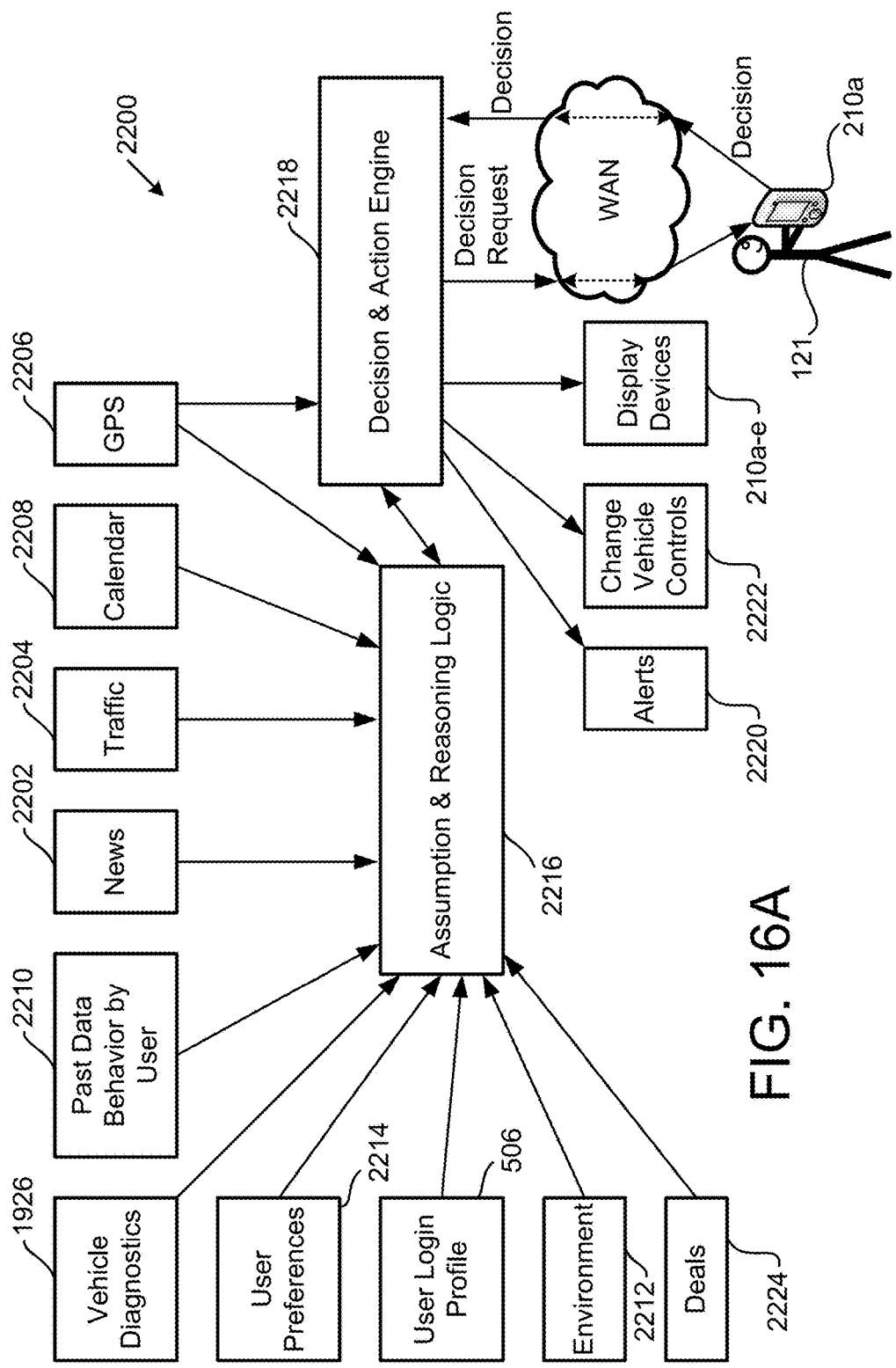
FIG. 16A illustrates an ecosystem where an APP in conjunction with a vehicle API may work together to make assumptions, make decisions and take actions, in accordance with one embodiment.

FIG. 16A describes an ecosystem where an APP 104 in conjunction with a vehicle API 130 may work together to make assumptions, make decisions and take actions 2200. API and APP code together can be arranged in such a fashion that creates an assumption and reasoning logic module 2216. This Assumption and reasoning logic module can take inputs from various systems and data streams including but not limited to GPS 2206, calendars 2208, traffic conditions 2204, local news 2202, past data of user behavior and interaction 2210, vehicle diagnostics 1926, user preferences 2214, user login profiles 506, environmental interpretations by sensors 2212, marketing deals 2224 among others. These inputs can be local and physical or remote and abstract via a network. The assumption and reasoning logic module 2216 compiles data from these sources to invoke decisions and actions on a decision and action engine 2218.

This decision and action engine 2218 has the ability to execute on what the assumption and reasoning logic module has determined needs to be done. The decision and action engine has the ability to produce alerts, both local, on screen, audibly, visually or remotely on a remote display device 210a-e using a data network. The decision and action engine 2218 also has the ability to change vehicle controls automatically on behalf of a user without user action based on assumptions made by the assumption and reasoning logic module 2216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides an decision remotely on their remote device 210a, the decision engine 2218 updates the assumption module 2216 so that it can augment its assumptions for an updated level of confidence on the next action trigger. These actions by the user automatically and continually update the assumption and reasoning logic module 2216 in order to fine tune the level of confidence on acting without user input and learn the user's behavior for future decisions.

FIG. 16B describes how one of many types of inputs into an assumption and reasoning logic module 2216 can be compiled over time. Although inputs can come from many sources, this particular example focuses on input into the assumption and reasoning logic module 2216 from past data originating and triggered by user behavior in order for module 2216 to learn. Past actions 2210 are logged into a database either locally on the vehicle computer or remotely which are fed into to module 2216. In this example, data about when the user's actions are stored, along with unique identifiers that will allow assumptions to be made in the future.

These identifiers include times, dates, rates, capacities, temperatures, frequency, degrees, distance, etc. In this example, the system has been keeping track of when the user has been starting his or her engine in the morning on weekday sand weekends. The system harvests all data points associated with given events. These data points 2210 are purely mined data points and no assumptions or reasoning occurs at this point. This data will be used by the assumption and reasoning logic 2216 to determine future actions.

FIG. 16C describes one example of what an assumption and reasoning logic module 2216 may produce using the data points collected on an ongoing basis in FIG. 16B. Over time, using inputs that are continually harvested by a user's action, assumptions are made and refined to aid in making decisions for a user in advance or behalf. Module 2216 has taken the inputs provided by 2210 past data and behavior to determine that before a decision can be made, the user's local or network-stored calendar should be polled to determine how the user's schedule might impact the system's pending actions. For instance, if the system had determined that the user typically starts his vehicle at 8 am but the user's calendar shows a meeting at 730 am located at a location that does not match the current location, the vehicle may assume that the car should be started at 725. They system will determine its level of confidence of the decision and may poll the user for a decision.

The system, by using prior data points has stored assumptions based on conditions, the day it is, the temperature of the environment and historical events, that the user will most likely start the vehicle's engine between 803 am and 805 am, and if the temperature is in the 30s inside the vehicle, the user will most likely set the interior temperature to between 70 and 80 degrees, it is not likely that the user will use the are conditioning unit, if there is ice on the windshield, the user will most likely defrost the windshield for 7 minutes before departure, the user usually drives between 15 and 18 miles at this time of day, the user typically starts the vehicle again in the afternoon between 505 pm and 510 pm, if the temperature is in the mid-70s, the user usually activates the AC and sets the temperature to 65 degrees, typical weekend behavior, the user typically makes frequents stops, does not have a set time the vehicle is started, uses certain APPs at certain times and has a history of certain destinations as recorded by GPS.

FIG. 16D describes an example list of decision the decision and action engine 2218 may take based on information provided by the assumption and reasoning logic module 2216 and sets of assumptions created. The decision and action engine 2218 will attempt, using a degree of confidence to anticipate what the user will want to do in terms of engine start and stop, location destinations, preferences of temperature, driving habits and poll vehicle capacities to ensure the intended path the user usually takes is attainable. For example, the user usually drives a distance in the morning at a certain time, however, the vehicle's fuel supply will not allow for that distance to be traveled. Thus, the decision and action engine polls the user as a reminder that the user should begin their intended travel sooner than usual to allow for refueling time.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user.

The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, vehicles can maintain information regarding where they are, where they are heading and their destination maintained which is maintained by GPS and navigation systems on board. The information collected and maintained by every vehicle may be mutually exclusive, meaning that only each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another.

This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

In one embodiment, application APPs can be purchased (or obtained or leased) and installed on any vehicle that has the ability to establish a network communications link either wired or wireless. Once the APP is downloaded and installed on a vehicle, the APP can communicate and mine the vehicle for raw data related to metrics, performance, history, service history, recall history, repair history, repair required and other alerts that can be useful for alerting the vehicle's owners on actions that need to be taken to remediate. The raw data, in one embodiment, can be filtered based on user privileges to avoid transfer or exposing data that may be private to the user.

In some embodiments, the APP can also be used to communicate with hosted websites that are either centralized, distributed, locally hosted or remotely hosted in order to provide data transmission, data translate, data transformation though stored procedures, algorithms, scripted code and or mini programs. In some implementations, the preceding can be used in conjunction with one another to create a service marketplace for a variety of participates such as vehicles, vehicle owners, service provides, advisors, manufactures, parts stores, parts manufacturers, generation, transmission and administration of electronic keys.

Using some or all of the features describe above, embodiments can be useful for the administration, execution and completion of various ordinary but frequently required tasks associated with vehicles. For instance, frequent tasks can be processed to simplify and automate vehicle software updates, vehicle recalls, vehicle repairs, vehicle regular services, vehicle repairs required, vehicles being put up for sale, vehicles receiving and administering offers for purchase, bid and auctioning of services by services providers and advisors for jobs related to recalls, repairs, regular services etc. In some embodiments, analysis of the data and recommendations can also be processed using crowd source data, historical data of a user's actions or actions taken be other users having the same or similar issues and results from any repair, adjustment, or change.

In one embodiment, the Vehicle Service Website (VSW) creates a virtual environment where a user can administer all or some of the preceding using intelligent data transfer between the vehicle and the VSW, the user and the vehicle, manufacturers and the VSW, service providers and or advisers and the VSW, parts stores and the VSW, parts manufacturers and the VSW. Users can also have the option to simplify the transfer of the physical vehicle to the service provider and/or advisor upon accepting a bid for a job that the user has created to remediate a service, recall, repair or other item. In one embodiment, the VSW has the ability to generate, administer, trigger, disable and transmit electronic keys for this purpose. In one embodiment, examples of electronic keys and sharing of electronic keys is described in U.S. patent application Ser. No. 14/063,638, filed on Oct. 25, 2013, entitled "Methods and Systems for Assigning e-Keys to Users to Access and Drive Vehicles", which is incorporated herein by reference.

Figure 17:
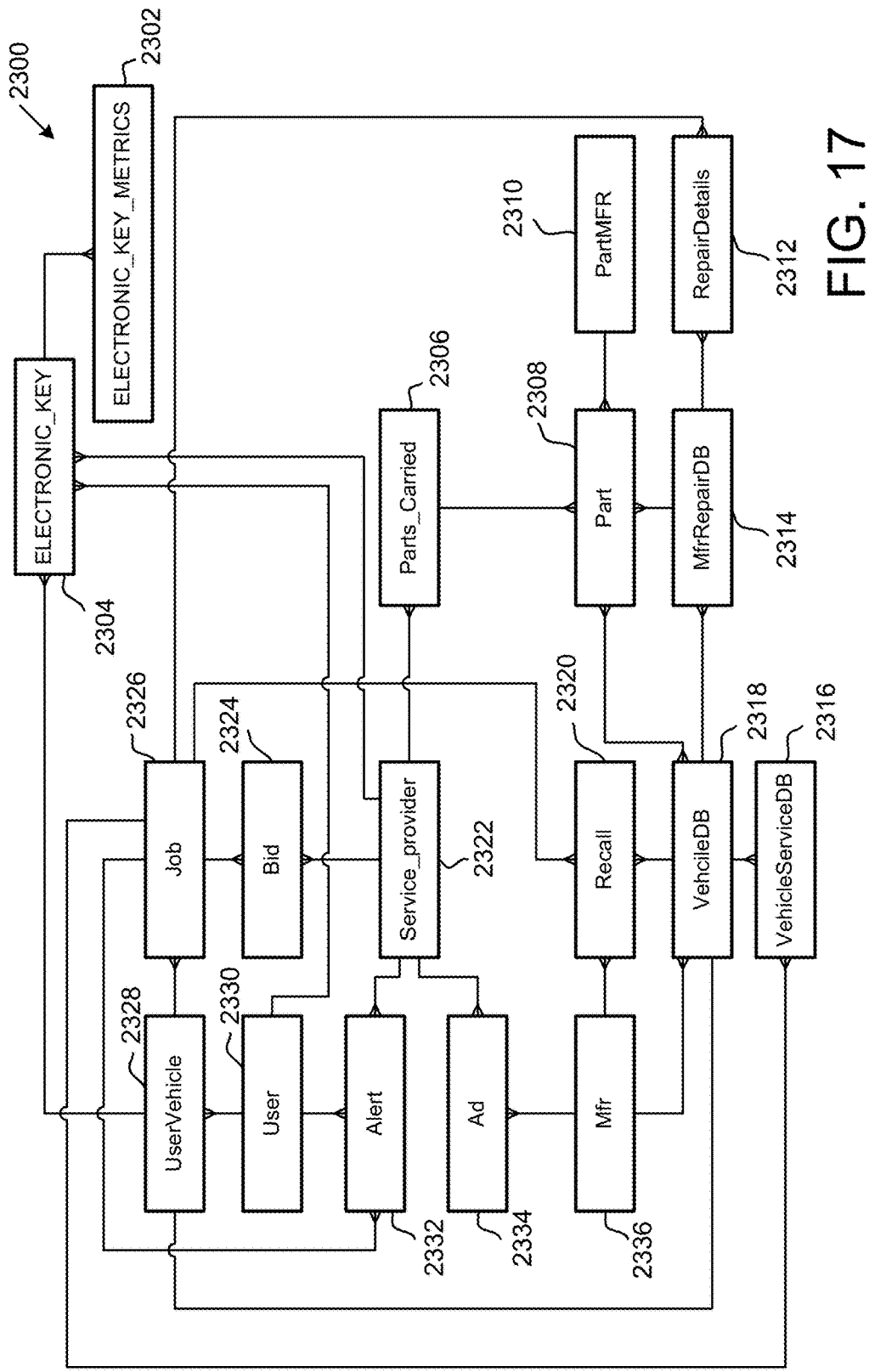
FIG. 17 illustrates a sample entity relationship diagram of data constructs intelligently used to store, update, process and maintain relationships of datapoints provided by participating objects or data sources.

FIG. 17 shows one example of an entity relationship diagram 2300 where various entities are related to each other as stored in a data base system(s). Although the entities can be arranged in differing fashions for differing system syntax, this example shows how actors using a VSW may participate on the transfer and processing of data on a hosted website, which can use one or various servers and data centers. The servers can be, for example, virtualized and the data centers can be geographically distributed.

For example, user data for a user on the VSW may be stored on the system as a user entity 2330, whereby the relationships to other pieces of data on the website are defined. In this case, the user may be related to a user vehicle 2328 and alerts 2332. Additionally, a user may be related to various electronic keys 2304 (e.g., e-keys). The definition of entities and their relationships in a database system is useful in handling data by allowing algorithms to determine search results, ownership, and updates among other actions. In this example, which is just one of many possible configurations, a user 2330 may have one or more vehicles 2328, which can then trigger a job 2326. Each job may have a list of related repair details 2312 that could have been generated by a manufacturer repair database 2314. This repair database can be associated with a vehicle database 2318 as well as have parts associated 2308 to both. This enables a vehicle manufacturer 2336 to maintain the most up to date data on vehicles it produces which match vehicle's owned by users on the VSW so that the correct information for each user is applied, displayed and correlated.

Figure 18B:
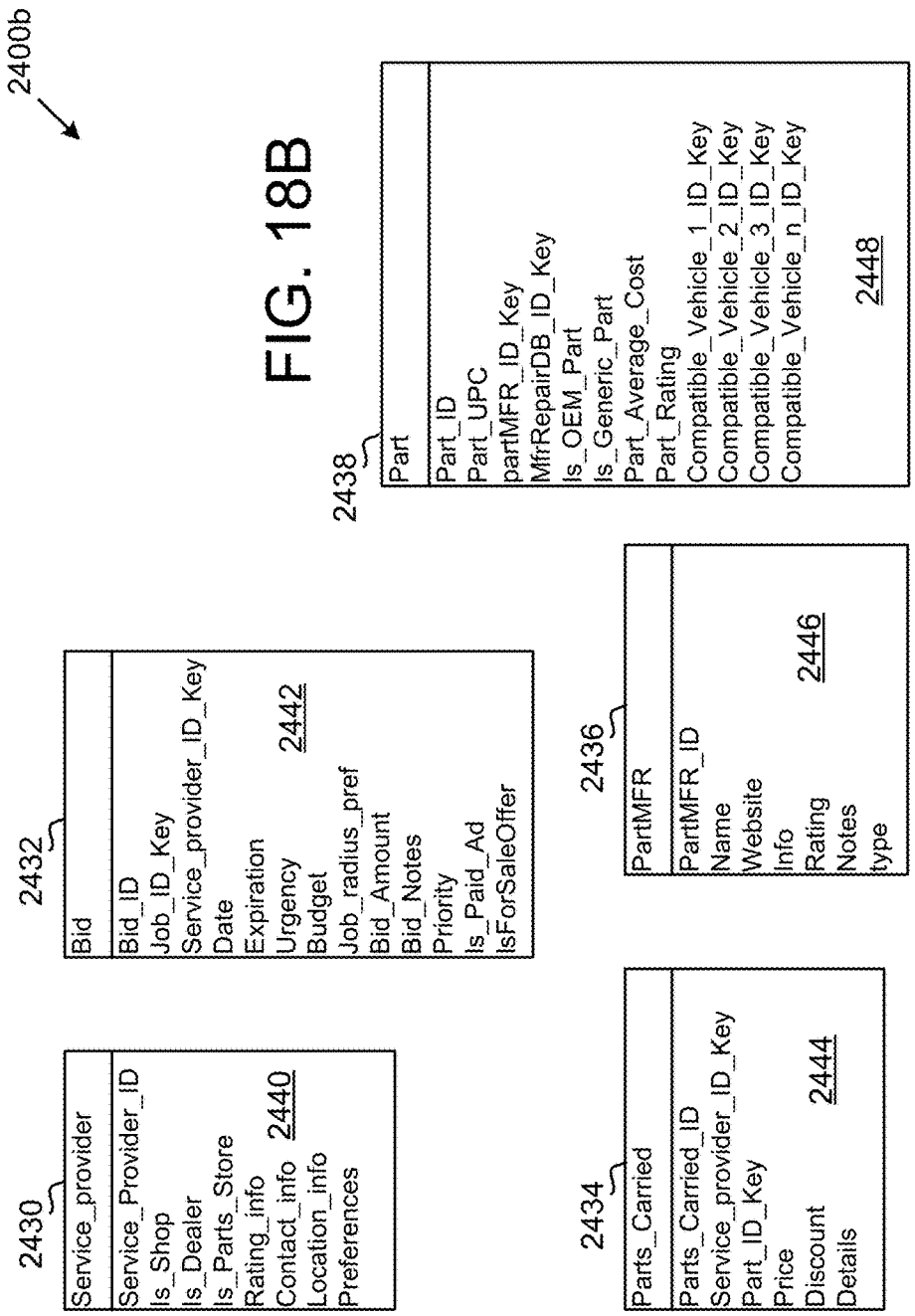
FIG. 18B illustrates a partial expanded view of the participants in an entity relationship diagram. Example data constructs related to each table are shown to show the types data a specific table could manage as well as how the data relates to other data in other tables in the construct.

FIGS. 18A-C describe examples of a subset of entities 2400, 2400b, 2400c, which are some of many possible implementations on a VSW. Each entity is named and contains a set of programmable data points. Each data point is useful for making a relationship with another entity. In this case, the ID of a certain entity is referenced in one or more different entities to make a logical connection. For example, a user's vehicle 2404 entity in a data construct useful for running a VSW may contain, but not limited to, data points describing that vehicle's ID, the official manufacturer's vehicle database ID used in relating a vehicle to an official vehicle from a manufacturer, the user ID to determine which user a vehicle belongs to, the make, model, year, miles on the vehicle, trim details of the vehicle, vehicle identification number VIN, additional notes and a flag for letting others know on a VSW that the vehicle is for sale. Additional data points may be present or absent from this list in aiding a VSW in managing data related to vehicles owned by users and made by manufactures each having unique characteristics.

Figure 19:
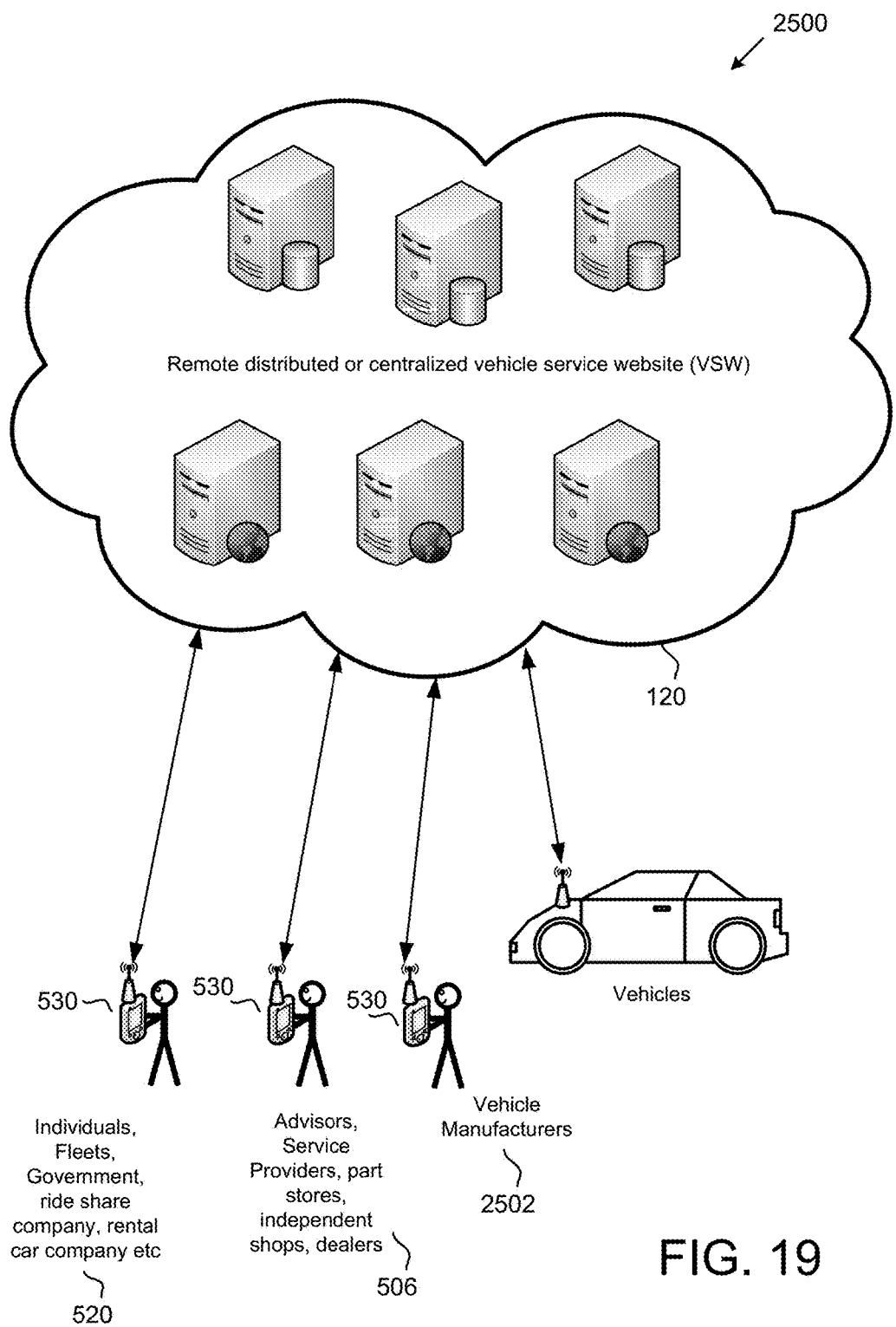
FIG. 19 illustrates the most common entities that would typically interact with not only the rendition of a Vehicle Service Website (VSW) but also each other in a hub and spoke fashion.

FIG. 19 describes where a VSW may be hosted, in this case, out of many possible scenarios, a VSW is hosted by a cloud distributed system 120 containing web services, databases and other data transmitting, receiving and processing logic and systems. Additionally, the possible entities that may associate, interact with, exchange data with and relate with using Internet connected devices 530 include individuals, fleets government, ride share companies, rental car companies among others 520. Other entities include advisors, service providers, vehicle part stores, independent vehicle repair shops, and vehicle dealerships 506. Vehicle manufacturers 2502 may also interact with a VSW. Vehicles themselves may also communicate, transmit, process and relay information and data with a VSW through an on board or proxy Internet connection. The VSW allows connection to any entity as long as that entity is using an Internet connected device.

Data is sent and received between the VSW and the entities, however data is processed through logic and algorithms on or at the direction of the VSW. In one embodiment, information displayed on internet connected devices are reading post processed data to interpret and display the resulting information from the VSW. In one embodiment, processing is done on remote computers having abundant processing power leaving data display and transfer devices less burdened with processing duties.

Figure 20:
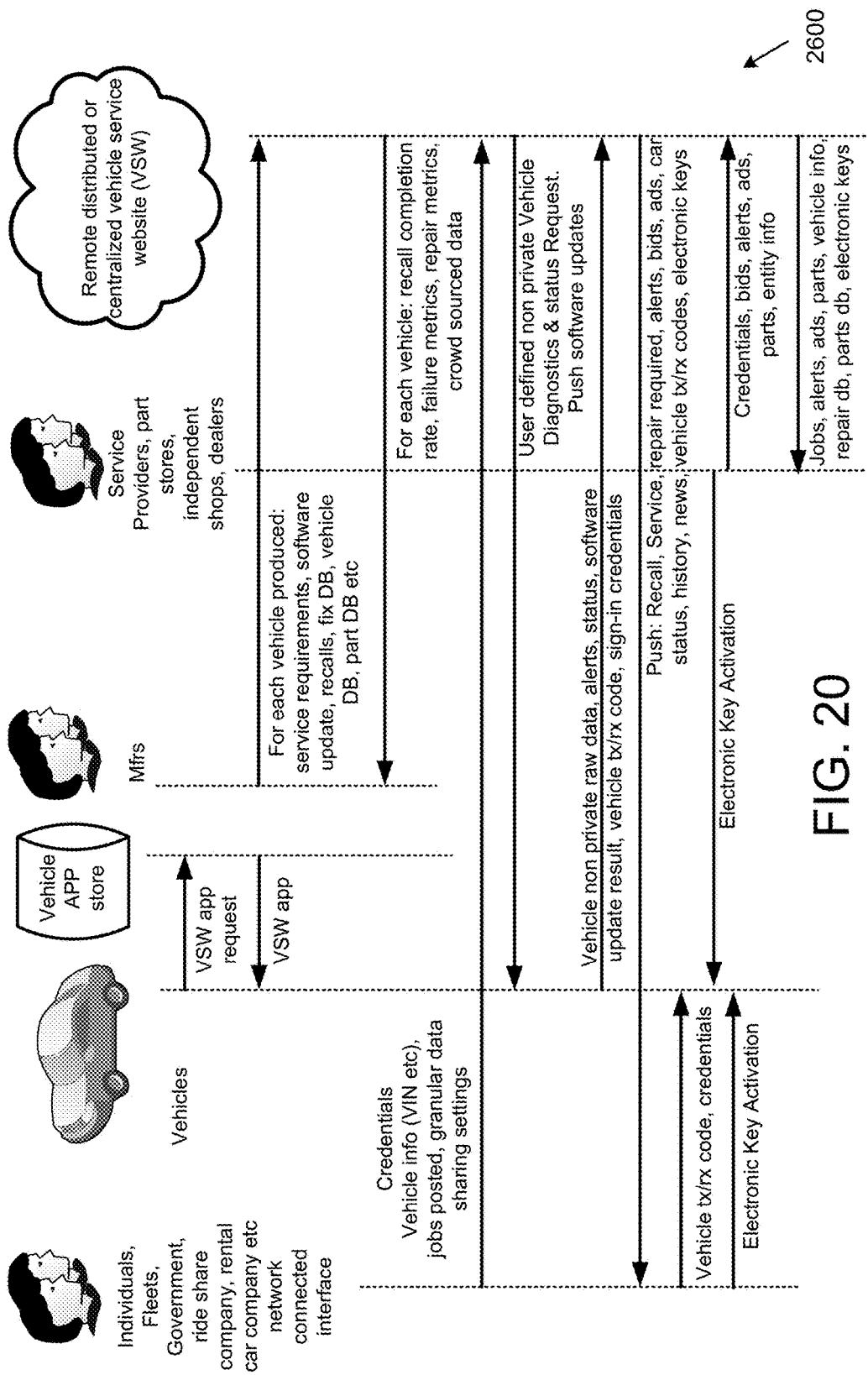
FIG. 20 illustrates a data flow diagram of one possible rendition of a VSW in which participants, vehicles, systems and applications transmit data to each other in order to intelligently process, store and interpret data useful for managing services related to vehicles and their owners, software updates to vehicles, database master data from manufacturers, electronic key generation and transmission, vital vehicle data among other pieces of transmittable data.

FIG. 20 shows one possible implementation of a data flow diagram 2600 showing the flow of data between different entities interacting on a VSW. The VSW contains constructs that are designed to receive, transfer, process and store information between the entities. For example, in order for a vehicle to share data regarding its state with the VSW, the vehicle may have an APP or VSW client that allows for the structured transfer of raw data from the vehicle to the VSW for processing. In one embodiment, the vehicle contacts a vehicle application marketplace either automatically or with human interaction thus downloading to the vehicle the appropriate VSW APP or client. Once the vehicle has a VSW APP or client, it can transmit data either ad hoc or automatically as a reactionary or periodic action.

When a user on a VSW enters the credentials for the vehicle they own (or have access to), the VSW will attempt to make contact with the vehicle the user has described to the VSW. The VSW then makes a call to the vehicle which has a VSW APP or client that is actively listening for data requests from the VSW. The VSW will request certain raw pieces of vehicle data the VSW will then process and run through algorithms to then display, alert, or take further action from a user after the user has learned the results of the processing. The vehicle transfers the requested data to the VSW, which the VSW then updates using algorithms and procedure logic on the entity relationship database construct. The user is then polled to notice, take or request further actions. Once this pairing of a vehicle to a user on the VSW is complete, various periodic or ad-hoc functions may be completed. For example, once data describing a vehicle has been loaded in the VSW and associated with a user, the VSW algorithms and logic will determine if the vehicle, based on data shared with the VSW by the vehicle, is due for maintenance, requires recall servicing, has repairs that need to be performed etc. among other actions.

In one embodiment, the VSW will then alert the user to take further action, either by allowing the user to broadcast to other entities on the VSW such as service providers and or repair shops that the vehicle requires a specific maintenance procedure and is accepting bids. The VSW compiles data from the user, the vehicle, the vehicle database, the vehicle's physical location, service history, user preferences etc. to create a job posting that other servicing entities can then bid on.

Additionally, a user owning a given vehicle may also request that the VSW create, request, encrypt, activate, deactivate, and transfer vehicle electronic keys. These electronic keys are specific to a vehicle, which in this case may be transferred to a servicing entity after the servicing entity has been granted the job through, for example, a winning bid. A user may elect to give the servicing entity an electronic key that the servicing entity can download to a device or receive a code to locally access and operate the user's vehicle. In some embodiments, each electronic key may have a unique duration effectiveness, certain restrictions as well as encryption or security features useful for operating a user's vehicle while the vehicle is being serviced. The VSW can monitor how the electronic keys are being used as well as remotely alter the usefulness and parameters of an electronic key. For example, once a user has paid for the service a servicing entity has performed, the user may elect for the electronic key to no longer function, thus the VSW remotely deactivates that electronic key leaving the vehicle in a locked position for the vehicle owner to recover.

Figure 21:
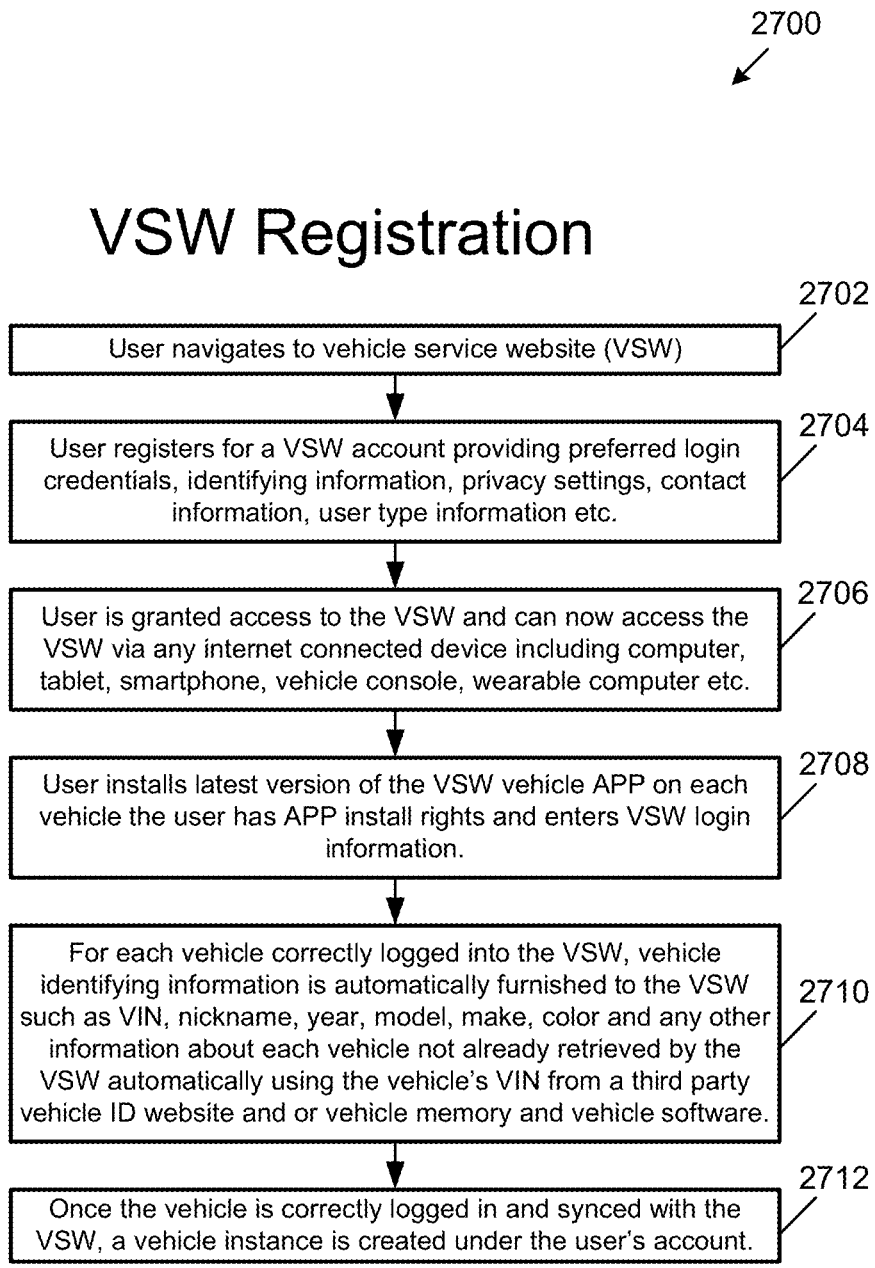
FIG. 21 illustrates one possible flow of events in order for a user to establish a presence on the VSW by signing up to become a participant on the VSW. Once a user has established a user account on the VSW, further automated actions may occur such as automatic vehicle information syncing and connection establishment.

FIG. 21 describes one possible VSW registration 2700 flow. To gain access to a VSW, a user navigates to the vehicle service website VSW via an Internet connected device 2702. After reaching the VSW interface via an Internet connected device, a user may provide registration credentials such as login user name, password, identifying information, privacy settings, contact information as well as user type information among other registration necessary data inputs 2704. The user then is granted access to the VSW in 2706 at which point the user would install the VSW APP or client on his or her vehicle in 2708. After the VSW app or client is installed on the user's vehicle, the user would provide VSW log in credentials for the VSW APP or client to use to make an authenticated connection the VSW cloud distributed website.

Once the vehicle makes a connection to the VSW, the VSW polls the vehicle for its data, at which point the vehicle begins to transmit its data for the VSW to process and associate with the owner of the VSW account in 2710. Once the data is transmitted from the vehicle to the VSW, the VSW retrieves additional data from the VSW databases maintained by other users, manufactures and service providers to provide complementary data about the vehicle to the VSW databases as well as to algorithms and logic methods designed to make determinations on required actions. In operation 2712, the data for a user's car has been aggregated and the user's vehicle is now added to the user's account as an instance of a vehicle associated with that user.

Figure 22:
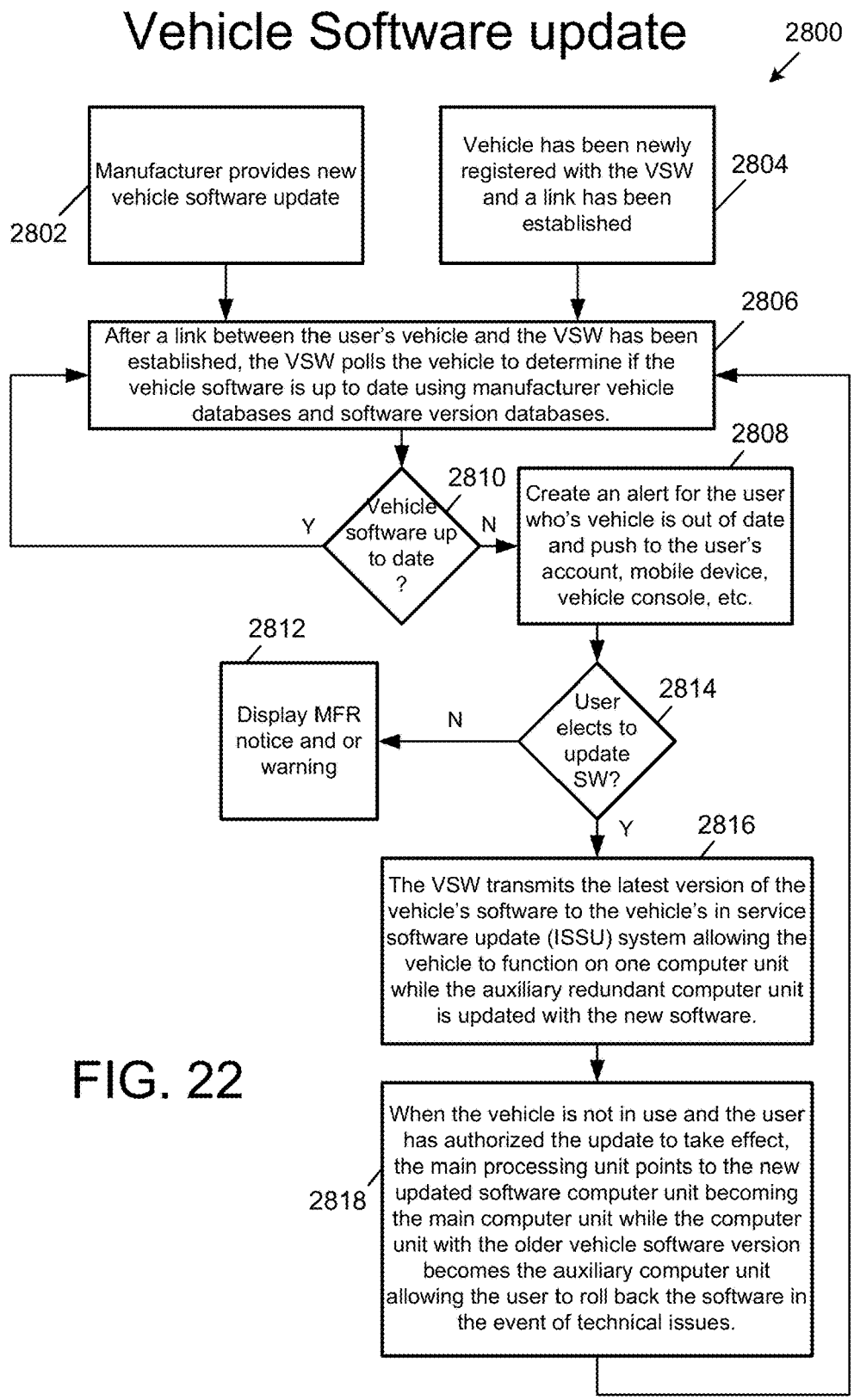
FIG. 22 illustrates one possible flow of events, actions and decisions useful for updating a vehicle's internal operating software.

FIG. 22 describes one possible method for performing an on-board software update 2800 via VSW, for a vehicle. Two possible triggers could signal an action for a user to take regarding a vehicle's software update. In one trigger 2802, a manufacturer could provide a new software update for one or more vehicles a manufacturer produces. The new software would be uploaded to the VSW at which point the VSW via algorithms and methods would determine which vehicles on the VSW require the software update. In a second trigger 2804, the scenario could arise where a new vehicle has just been registered on the VSW and a link has been established with the VSW. Either trigger 2802 or 2804 would instigate the VSW algorithms to determine if each vehicle is either up to date by comparing the version of the vehicle software to the latest provided by the manufacturer on the VSW vehicle software database in 2806. If the vehicle's software is determined to be up to date, then the system will poll the vehicle again at the next data transmission and run the same or different logical test.

If the vehicle is determined to have vehicle system software that is out of date, in 2808 an alert will be created for the owner of the vehicle and pushed to the user's account which will then be displayed on the user's preferred device connecting to the VSW website. The system will then test to see if the user has elected to update the software 2814 for the vehicle affected by the availability of a new version of the software. If the user elects not to update the vehicle system software in 2812, then a message and/or warning may be displayed or provided to the user. However, if the user does elect to update the vehicle software, the VSW transmits the latest version of the software in 2816 to the vehicle using an in service software update methodology where the vehicle continues to operate on its current software while the new software is loaded on a redundant computer unit. In 2818, when the vehicle is not in use, and the user has authorized the updating of the vehicle's software with the new downloaded vehicle software, the main processing unit points to the new updated software computer unit as it becomes the new master computer unit now running the updated software. The last vehicle software version is still available on the slave computing unit in case the user experiences difficulties or errors with the new updated software. In one embodiment, the computer units are virtual computers, or systems loaded and executed on partitions of a single system.

Alternatively, the new vehicle software can be updated after it is transmitted by the VSW to the vehicle by any variety of vehicle update methodologies as determined by the manufacturer of the given vehicle, this methodology taking advantage of the new software facilitated by the VSW APP or client running on the vehicle.

Figure 23:
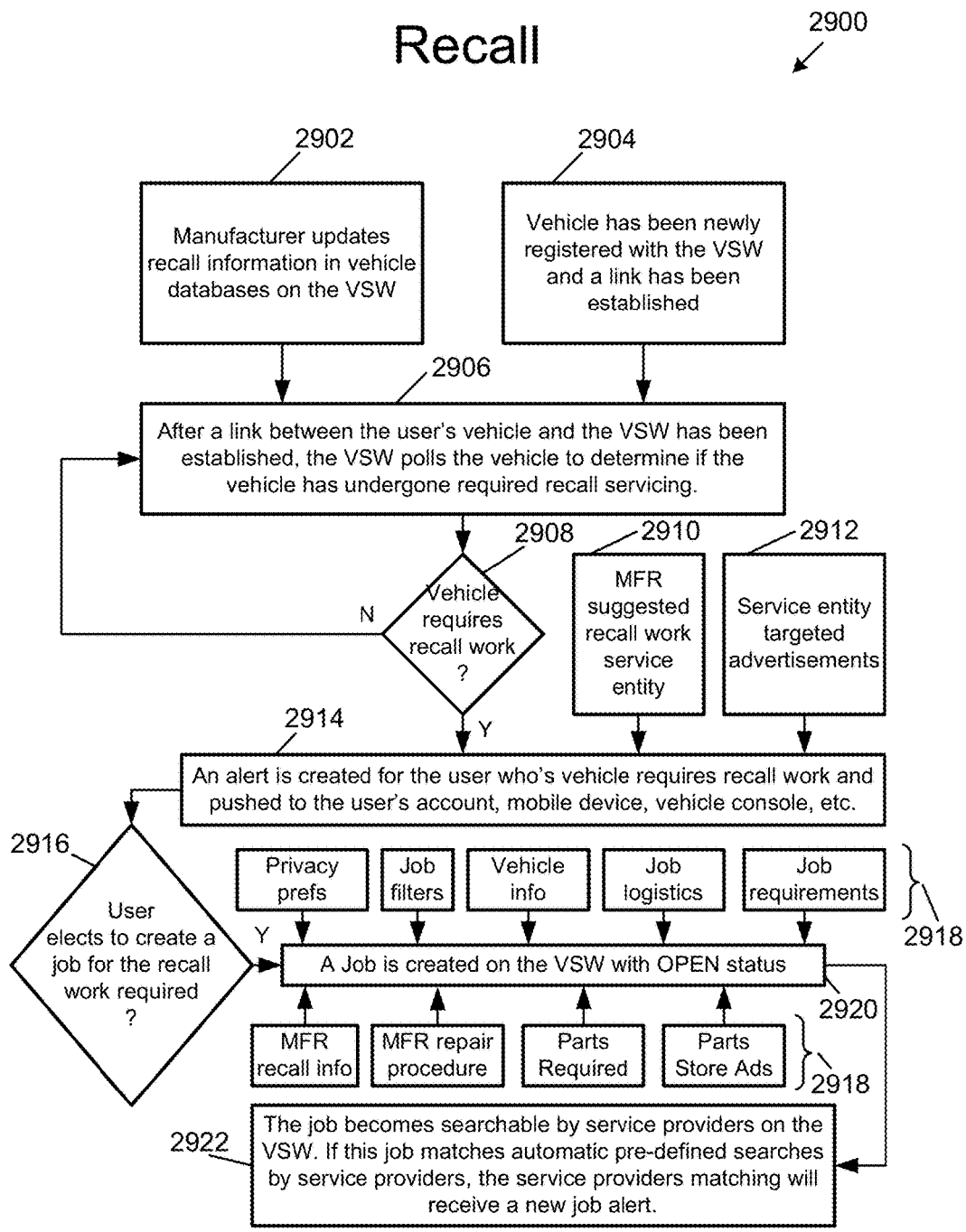
FIG. 23 illustrates one possible flow of events, actions and decisions useful for transmitting information to a user regarding important recall information for the user's vehicle either from an initial sync with the VSW or event triggered by a manufacturer VSW participant as well as generating a job on the VSW for service providers and or advisors to bid on along with associated triggered events.

FIG. 23 describes one of many possible processes a VSW may utilize to transmit, relay, process and execute a recall scenario 2900 for a given vehicle registered on the VSW. Two possible triggers could instigate an action for a user to take regarding a vehicle's recall requirements. In one trigger 2902, a manufacturer could provide new recall information for one or more vehicles that the manufacturer produces. The new recall information would be updated on the VSW, at which point the VSW via algorithms and methods, could determine which vehicles on the VSW are affected by the recall. In a second trigger 2904, the scenario could arise where a new vehicle has just been registered on the VSW and a link has been established with the VSW.

Either trigger 2902 or 2904 would instigate the VSW algorithms to determine if each vehicle is either up to date by comparing prior recall work done to the vehicle to the latest recall requirements provided by the manufacturer on the VSW database in 2906. If the it is determined that the vehicle does not require recall work, then the system will poll the vehicle again at the next data transmission and run the same or different logical test. If the vehicle is determined to require recall work, in 2908 an alert may be created for the owner of the vehicle and pushed to the user's account which will then be displayed on the user's preferred device connecting to the VSW website in 2914. This alert may also contain information or advertisements 2910 and 2912 regarding the manufacturer's suggested and/or preferred recall work service entity, as well as targeted advertisements from service entities on the VSW that have performed this type of recall work or are capable of doing the same.

The VSW will then give the user, along with the alert, the option to create a job on the VSW for service providers to bid on. If it is determined that the user has elected to create a job on the VSW in 2916, then a job is created with an associated status (e.g., OPEN, CLOSED, PENDING, etc.) 2920. This job carries with it associated data 2918 either automatically or manually entered regarding privacy preferences such as omitting the user's full name for instance, job filters such as excluding receiving bids from service entities with low ratings, vehicle info gathered by the vehicle and supplemented by the user, job logistics such as time of day the vehicle is available for the job to be performed, job requirements such as notes regarding the type of work expected, manufacturer recall information automatically found by the VSW on the VSW database, manufacturer repair procedure automatically found by the VSW on the VSW database maintained by the manufacturer, parts required as prescribed by the manufacturer and automatically added by the VSW.

Also provided, may be, parts store ads as added by the VSW where a parts store is determined to carry the prescribed parts required for the recall service. In one embodiment, the parts store may have elected to purchase advertisements to be associated with and displayed with a job for a service provider to use in the event the service provider wins the bid to perform the recall service on the vehicle associated with an OPEN job. Once the job has been created and loaded with relevant associated information, the job become searchable by service providers 2922. The service providers may search open jobs for criteria. The service providers may accept jobs, bid on jobs, and receive a VSW generated alert (e.g., winning bids, losing bids, updates on bids, etc.) which may be available to the service provider via the VSW.

Figure 24:
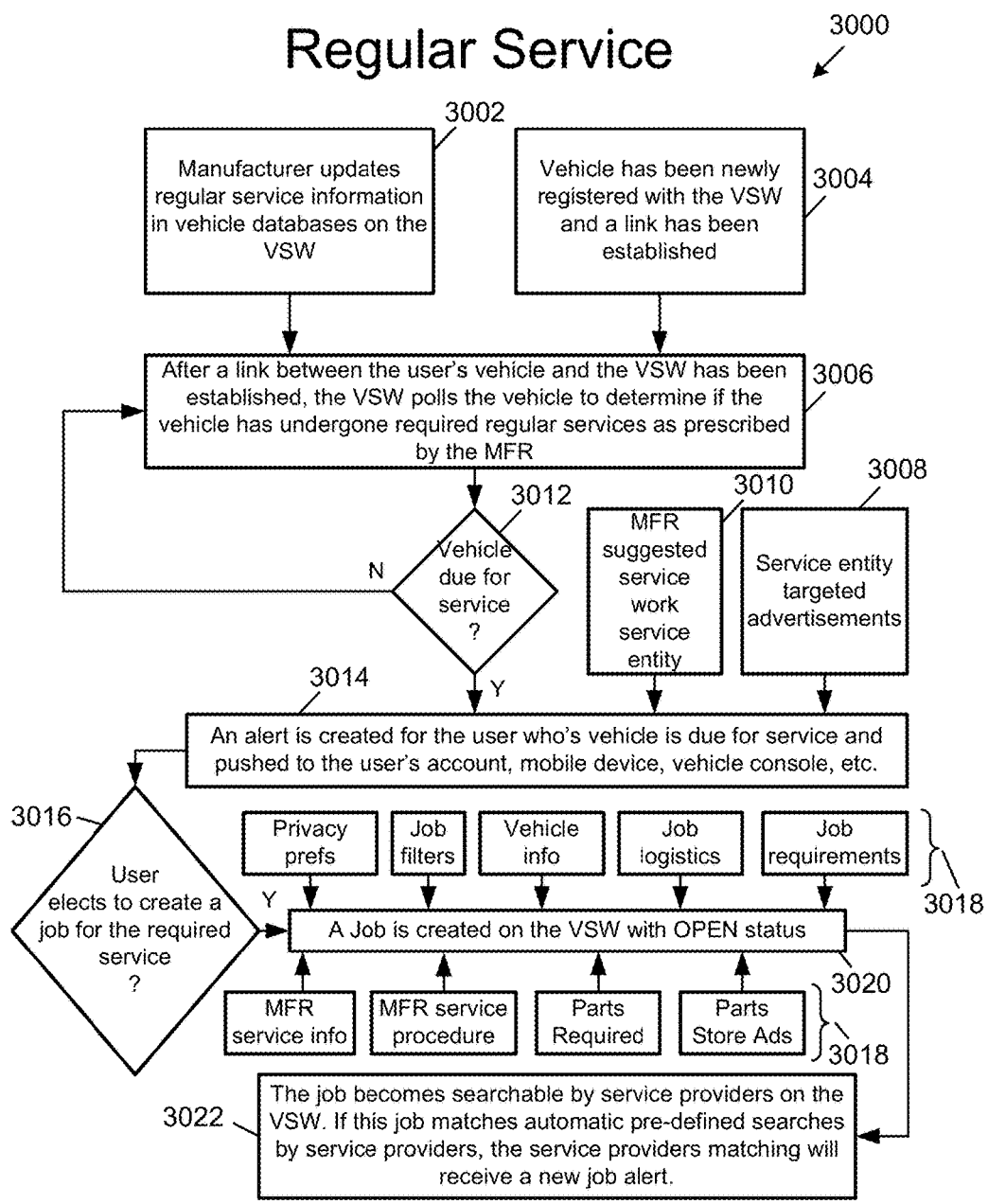
FIG. 24 illustrates one possible flow of events, actions and decisions useful for updating, managing and administering vehicle regular service as well as generating a job on the VSW for service providers and or advisors to bid on along with associated triggered events.

FIG. 24 describes one of many possible processes a VSW may utilize to transmit, relay, process and execute on a regular service scenario 3000 for a given vehicle registered on the VSW. Two example triggers could instigate an action for a user to take regarding a vehicle's regular service requirements. In one trigger 3002, a manufacturer could provide new regular service information for one or more vehicles that a manufacturer produces. The new regular service information would be updated on the VSW at which point the VSW via algorithms and methods would determine which vehicles on the VSW are affected by a regular service. In a second trigger 3004, the scenario could arise where a vehicle has just been registered on the VSW and a link has been established with the VSW.

Either trigger 3002 or 3004 would instigate the VSW algorithms to determine if each vehicle is either up to date by comparing prior regular service work done to the vehicle to the latest regular service requirements provided by the manufacturer on the VSW database in 3006. If the it is determined that the vehicle does not require regular service work, then the system will poll the vehicle again at the next data transmission and run the same or different logical test. If the vehicle is determined to require regular service work, in 3012 an alert will be created for the owner of the vehicle and pushed to the user's account which will then be displayed on the user's preferred device connecting to the VSW website in 3014. This alert may also contain information or advertisements 3010 and 3008 regarding the manufacturer's suggested and or preferred regular service work service entity as well as targeted advertisements from service entities on the VSW that have performed this type of regular service work or are capable of doing the same.

The VSW will then give the user along with the alert, the option to create a job on the VSW for service providers to bid on. If it is determined that the user has elected to create a job on the VSW in 3016, then a job is created with an associated status of OPEN 3020. This job carries with it associated data 3018 either automatically or manually entered regarding privacy preferences such as omitting the user's full name for instance, job filters such as excluding received bids from service entities with low ratings, vehicle info gathered by the vehicle and supplemented by the user, job logistics such as time of day the vehicle is available for the job to be performed, job requirements such as notes regarding the type of work expected, manufacturer regular service information automatically found by the VSW on the VSW database, manufacturer regular service procedure automatically found by the VSW on the VSW database maintained by the manufacturer, parts required as prescribed by the manufacturer and automatically added by the VSW, parts store ads as added by the VSW where a parts store is determined to carry the prescribed parts required for the regular service and the parts store has elected to purchase advertisements to be associated with and displayed with a job for a service provider.

Figure 25:
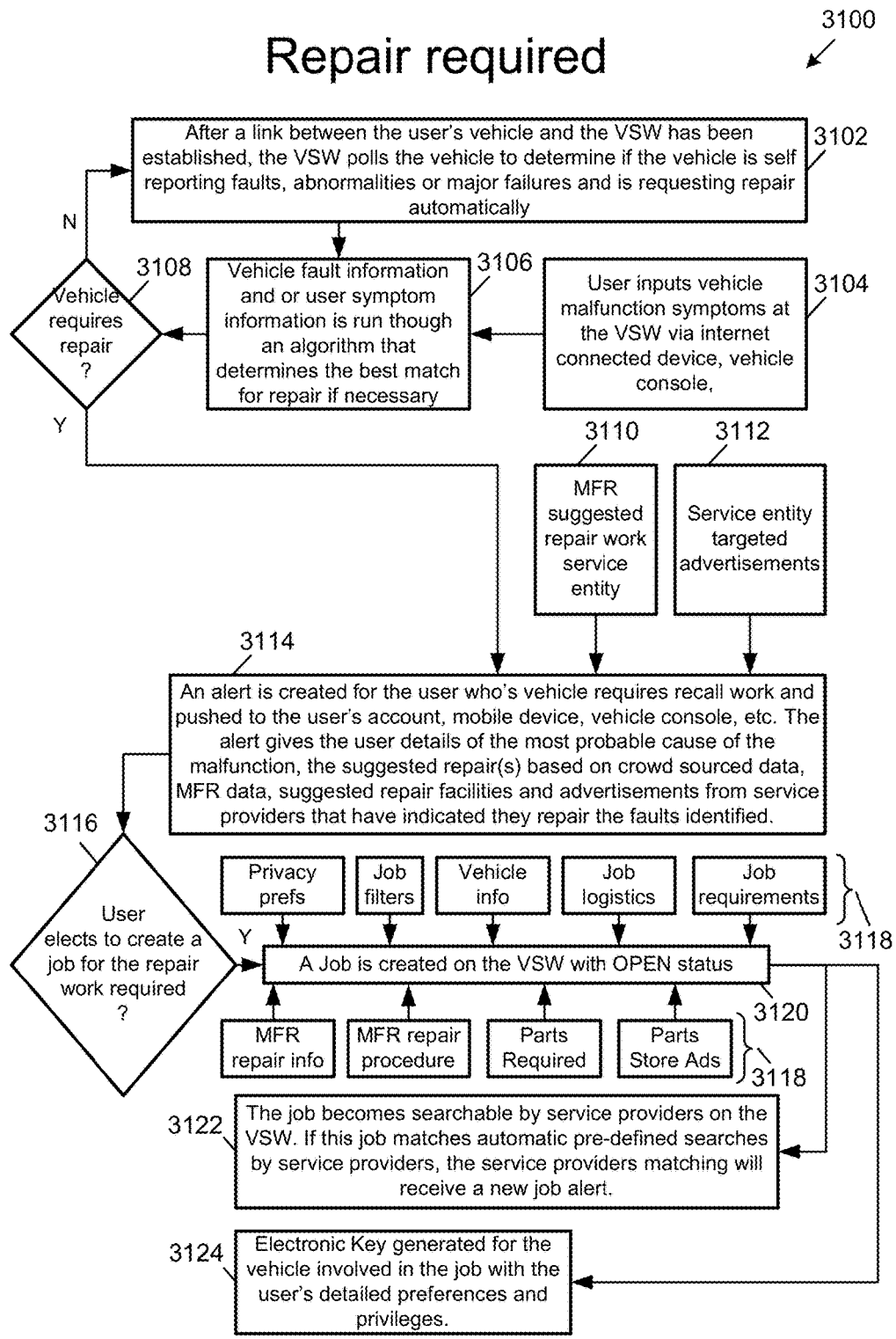
FIG. 25 illustrates one possible flow of events, actions and decisions useful for updating, managing and administering vehicle repairs as well as generating a job on the VSW for service providers and or advisors to bid on along with associated triggered events.

FIG. 25 describes one possible scenario 3100 where a vehicle that is connecting to the VSW requires a repair and the subsequent flow for alerting the vehicle's owner and creating a job to remediate the problem. A user's vehicle has the ability to report to the VSW that a repair is required using vehicle on-board metrics and sensors. In one embodiment, when a vehicle establishes a link with the VSW as described in 3102, the VSW may poll the vehicle to search for faults, abnormalities or major failures whereas the vehicle is requesting repair automatically.

The VSW in 3106 then aggregates the data that it has received from the vehicle as well as manually entered symptoms supplied by a vehicle user as described in 3104 and runs the data through algorithms and logic to determine the most likely cause of the fault, abnormality or major failure. The algorithm to determine the most likely cause of the fault and most probable repair required uses an aggregation of historical data from past faults from other users on the VSW (and obtained from other sources and crowed sourced), and the subsequent successful repair as well as data entered by the manufacturer used to match set of symptoms with possible failures and most likely repairs that will remediate/address/fix the issue.

If the VSW determines that the vehicle that is reporting problems does not require repair in 3108 the VSW continues to periodically poll the vehicle as it establishes a link. However, if the VSW determines that the vehicle reporting the problem requires repair in 3108 then the VSW aggregates both manufacturer suggested repair work service entities 3110 and service entity targeted advertisements 3112 that are most likely to be able to complete the repair based on paid participation by service entity in the advertisement and service entity service history of successful repairs completed for the type of repair the VSW has determined is required for the user's vehicle.

The preceding aggregation of data is used to create an alert for the user who owns the vehicle that is reporting the problem. Information regarding the repair necessary as well as the most probable cause based on crowd sourced data, manufacturer data, suggested repair facilities, and advertisements from services providers is aggregated to the alert presented to the user in 3114. The VSW will then give the user along with the alert, the option to create a job on the VSW for service providers to bid on. If it is determined that the user has elected to create a job on the VSW in 3116, then a job is created with an associated status of OPEN 3120.

This job carries with it associated data 3118 either automatically or manually entered regarding privacy preferences such as omitting the user's full name for instance, job filters such as excluding receiving bids from service entities with low ratings, vehicle info gathered by the vehicle and supplemented by the user, job logistics such as time of day the vehicle is available for the job to be performed, job requirements such as notes regarding the type of work expected, manufacturer repair information automatically found by the VSW on the VSW database, manufacturer repair procedure automatically found by the VSW on the VSW database maintained by the manufacturer, parts required as prescribed by the manufacturer and automatically added by the VSW, parts store ads as added by the VSW where a parts store is determined to carry the prescribed parts required for the repair and the parts store has elected to purchase advertisements to be associated with and displayed with a job for a service provider to user in the event the service provider wins the bid to perform the repair on the vehicle associated with the OPEN job.

Once the job has been created and loaded with relevant associated information, the job become searchable by service providers 3122. All those service providers with pre-screened automatic searches or those that match the criteria and are accepting jobs for review for bidding will receive a VSW generated alert that will be available to the service provider user on the VSW. The VSW will optionally automatically create an electronic key that the vehicle's owner will release to the service provider once the bid has won so that the service provider can operate the vehicle during a prescribed duration with prescribed rules and limitations in 3124. If the vehicle's owner decides to use electronic keys for the transaction, the VSW will automatically communicate with the vehicle in question via the vehicle's Internet connected VSW APP or client to create a one-time use encrypted vehicle key that will allow the service provider to operate the vehicle. The VSW will transmit the electronic key once it is generated to the service provider which will then be able to produce the electronic key locally or remotely to operate the vehicle.

Figure 26:
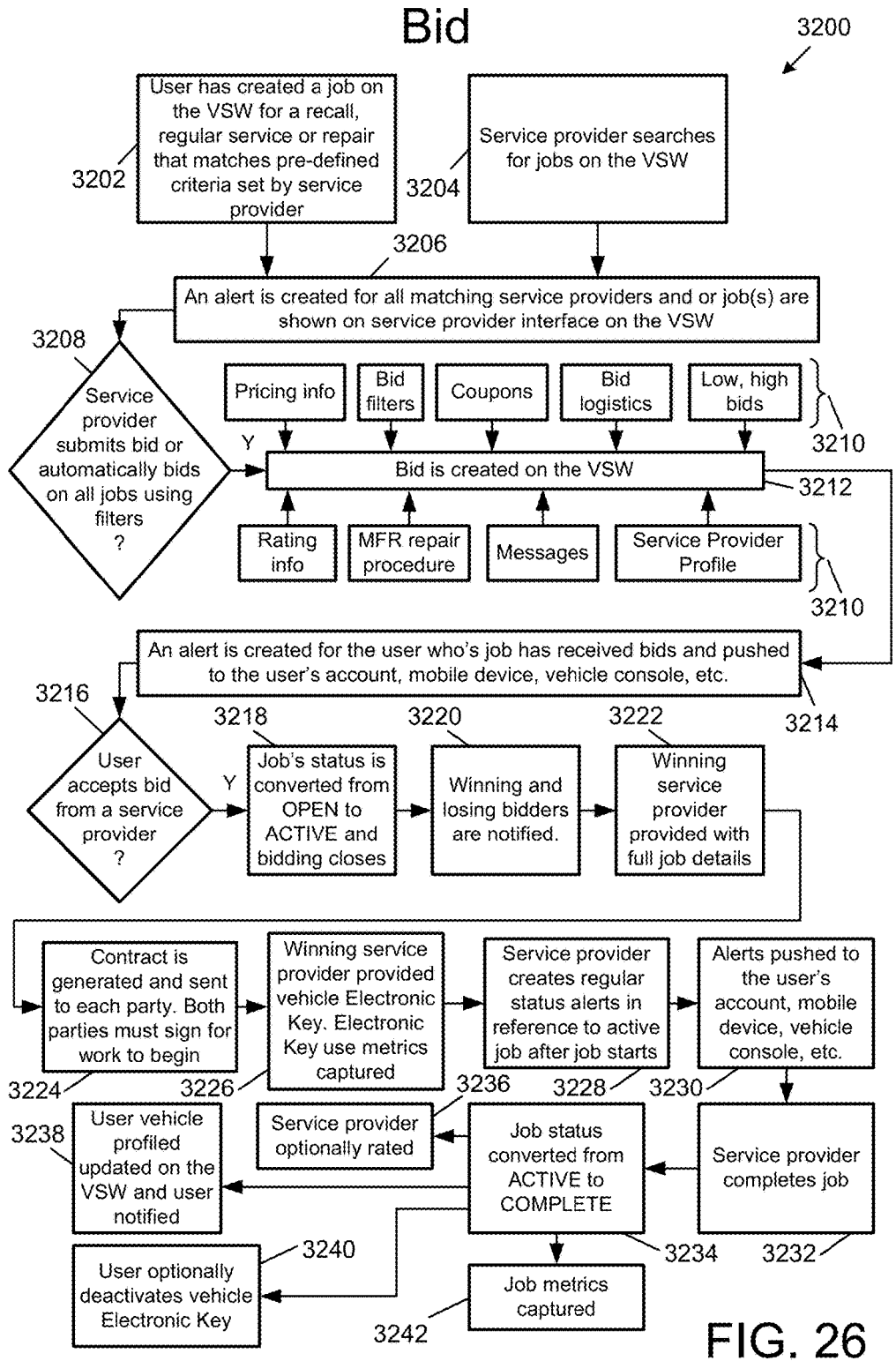
FIG. 26 illustrates one possible flow of events, actions and decisions useful for updating, managing and administering bids as well as generating alerts on the VSW for service providers and or advisors, vehicle owners and others to select from along with associated triggered events.

FIG. 26 describes one possible flow of events 3200 for entering a bid on the VSW in response to a job on the VSW. Two possible triggers for discovering bids on the VSW are presented 3202 and 3204. In one trigger, for instance, a user has created a job in the VSW for a recall, regular service or repair that matches pre-defined criteria set by a service provider. This allows the service provider to automatically get jobs pushed to them as they are created if they match what the service provider prefers.

Alternatively, service providers may manually search for jobs in the VSW using filters and search criteria. If a job is created that matches a service provider's preference and the service provider is set up to receive automatic matches, the service provider will receive an alert describing the matching jobs. If the service provider is searching manually, the service provider will be displayed a matching listing on the fly as described in 3206. When a service provider is presented with matching bids, the service provider has the option to bid on an open job. In one embodiment, the bidding process can include an "accept" now option, if the service provider wishes to provide a pre-approved cost.

In one embodiment, the VSW may determine in 3208 if the service provider has elected to enter a bid for an open job on the VSW. If the bid has been submitted it is created in 1212 supplemented with additional aggregated data 3210 such as pricing info regarding the cost or cost range the service provider will charge, bid filters which will aid the service provider in entering automatic bids for all jobs matching the service providers preferences on the service provider's behalf by the VSW, coupons to incentivize the job poster, bid logistics regarding how to drop off of pick up the vehicle as well as repair locations, low and high bids for automatic bidding, rating information for the service provider to be displayed to the job poster, manufacturer repair procedures to show the job poster what work exactly will be done, special notes or messages to the job poster, and the full service provider profile information for the job poster to determine if the bidder fits their needs. Once the bid has been created, an alert in 3214 is created for the user whose job has received the bid and pushed to the user's account, mobile device, vehicle console etc.

The VSW will then poll the user to determine in 3216 if the user has elected to accept a bid from a service provider. If the bid is accepted by the vehicle owner, then the job's status is converted from OPEN to ACTIVE and the JOB is no longer open for bidding in 3218. The winning bidder is notified as well as losing bidders in 3220. The winning service provider is provided with the full job details at this point in 3222. The VSW then automatically generates a contract for both the job poster and winning bidder to sign and document before the job can begin in 3224.

If the vehicle owner provided the option, the service provider will be provided with electronic key information automatically by the VSW to operate the vehicle without needing the physical keys from the user. When the electronic keys are in use by the service provider, the VSW captures all usage metric data such as length of use, date, time, miles traveled, method used to enable access to the vehicle by the access key among other metrics for reporting back to the vehicle's owner in 3226. While the service provider has possession of the vehicle, the service provider has the ability to create alerts and status updates on the ACTIVE job that will be viewable by the vehicle owner in 3228.

These alerts may include but are not limited to percentage of the work completed, complications alerts, alerts for the user to authorize additional work and contract amendments, vehicle service completion alerts among other types of alerts and status updates which can all be pushed to the vehicle's owner on the VSW and accessed through any internet connected device or console in 3230. The service provider will then complete the job in 3232, which then switches the job status in 3234 from ACTIVE to COMPLETE. At this point, the vehicle's owner can optionally rate the service provider in 3236. Information and history metrics in 3242 including but not limited to specific repairs, services, parts used, time to execute, addendums used, satisfaction, job completion details and winning bid details are all updated and associated with the user, the vehicle, the service provider and all crowd sourced data generation databases are updated for future modeling and repair prediction in 3238. When the repair is complete, the vehicle's owner may opt to disable the vehicle electronic key that was provided to the service provider in 3240.

Figure 27:
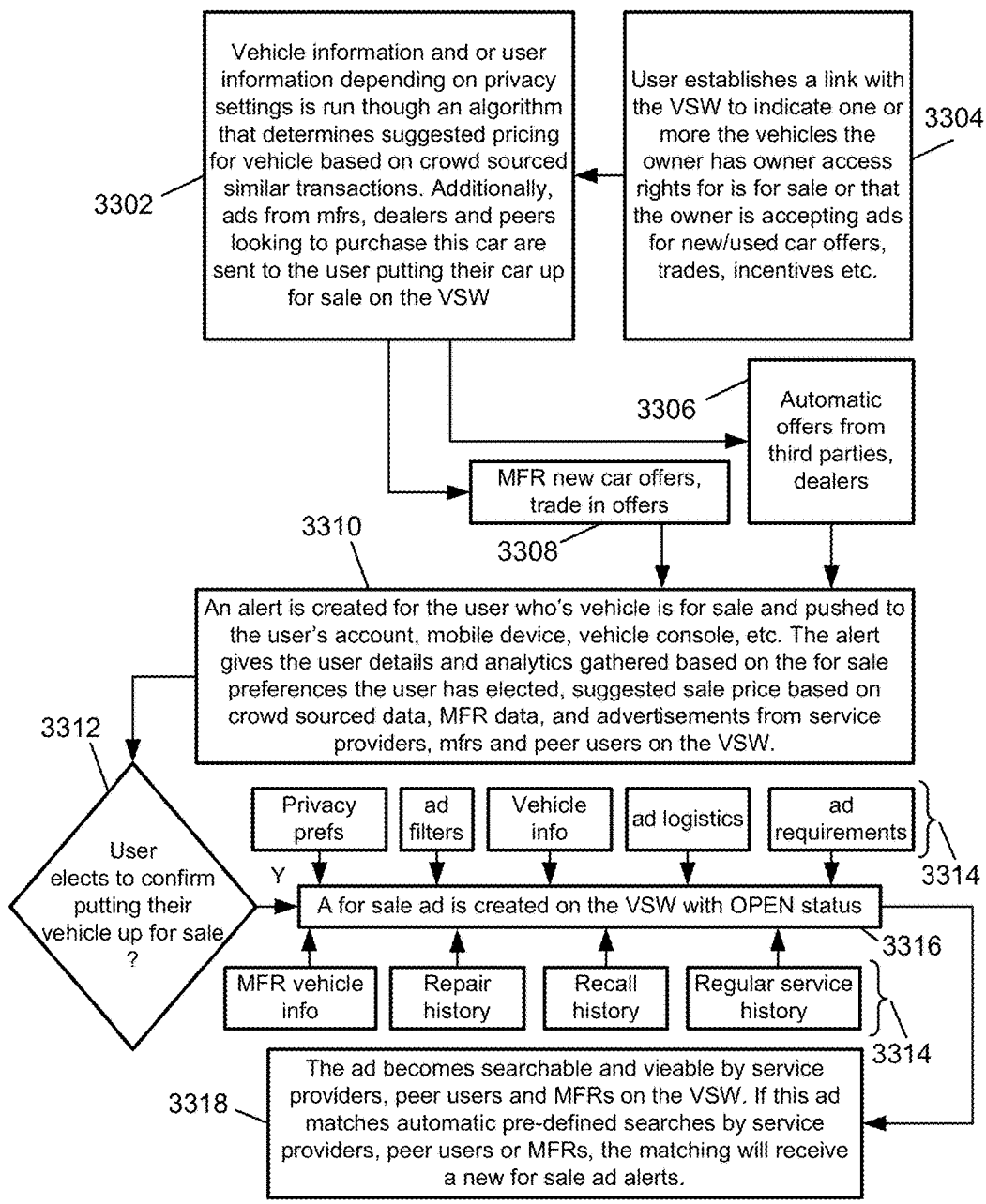
FIG. 27 illustrates one possible flow of events, actions and decisions useful for a user to put their vehicle(s) up for sale along with updating, managing and administering offers, as well as generating alerts on the VSW for peers, vehicle owners and others with associated triggered events.

FIG. 27 describes one possible flow 3300 for vehicle sale advertisements on the VSW. A user, being a member of the VSW, could optionally post their vehicle(s) registered on the VSW for sale 3304. After the VSW establishes a link with the vehicle, the vehicle's owner can tag the vehicle as being for sale. The user can indicate that he or she is accepting offers for the vehicle. The owner may also indicate that they are accepting ads for new or used vehicles, trades and incentives for example. This information is then run through an algorithm in the VSW in 3302 which will determine the suggested sale price the vehicle will demand based on crowd sourced data for similar transactions on the VSW for similar vehicles with similar metrics such as mileage, repair history among other metrics and displayed to the vehicle's owner.

Additionally, the VSW may determine the most relevant ads from manufacturers, dealers and peers looking to purchase this vehicle or take this vehicle as a trade-in and display the results to the vehicle's owner. New car offers and trade-in offers from manufacturers 3308 and automatic offers from third parties and dealers 3306 may be aggregated and used to present the vehicle's owner with all relevant data in an alert as described in 3310. The alert in the VSW for the vehicle's owner will give the user details and analytics gathered based on the for sale preferences the user has elected, a suggested sales price based on crowd-sourced data, manufacturer data and advertisements. The VSW will poll the user who has posted their vehicle for sale to determine if the user has elected to formally post the vehicle for sale on the VSW in 3312.

If the vehicle's owner has elected to post the vehicle for sale on the VSW, the VSW will create a for sale ad on the VSW with OPEN status in 3316 with aggregated data 3314 such as privacy settings that can be used for instance to hide the true name and identity of the vehicle's owner, ad filters to ensure only relevant responses are collected, vehicle info collected automatically from the vehicle by the VSW via data link as well as manually entered vehicle data by the vehicle's owner, ad logistics to determine for instance the radius to search for buyers, ad requirements for instance to only consider certain offers, vehicle manufacturer data automatically retrieved by the VSW using VSW manufacturer databases, vehicle repair history on file with the VSW, recall fix information and outstanding recall services yet to be performed on file with the VSW, regular services completed on file with the VSW.

Once the ad has been created and supplemental information has been added, the ad becomes searchable in 3318 by service providers, peers, manufacturers, and other entities on the VSW. If this ad matches automatic pre-defined searches by entities on the VSW, then the matches will receive alerts. Those entities searching for ads that match this newly created ad will be presented with the ad in the newest related searches based on search preferences and filters.

Figure 28:
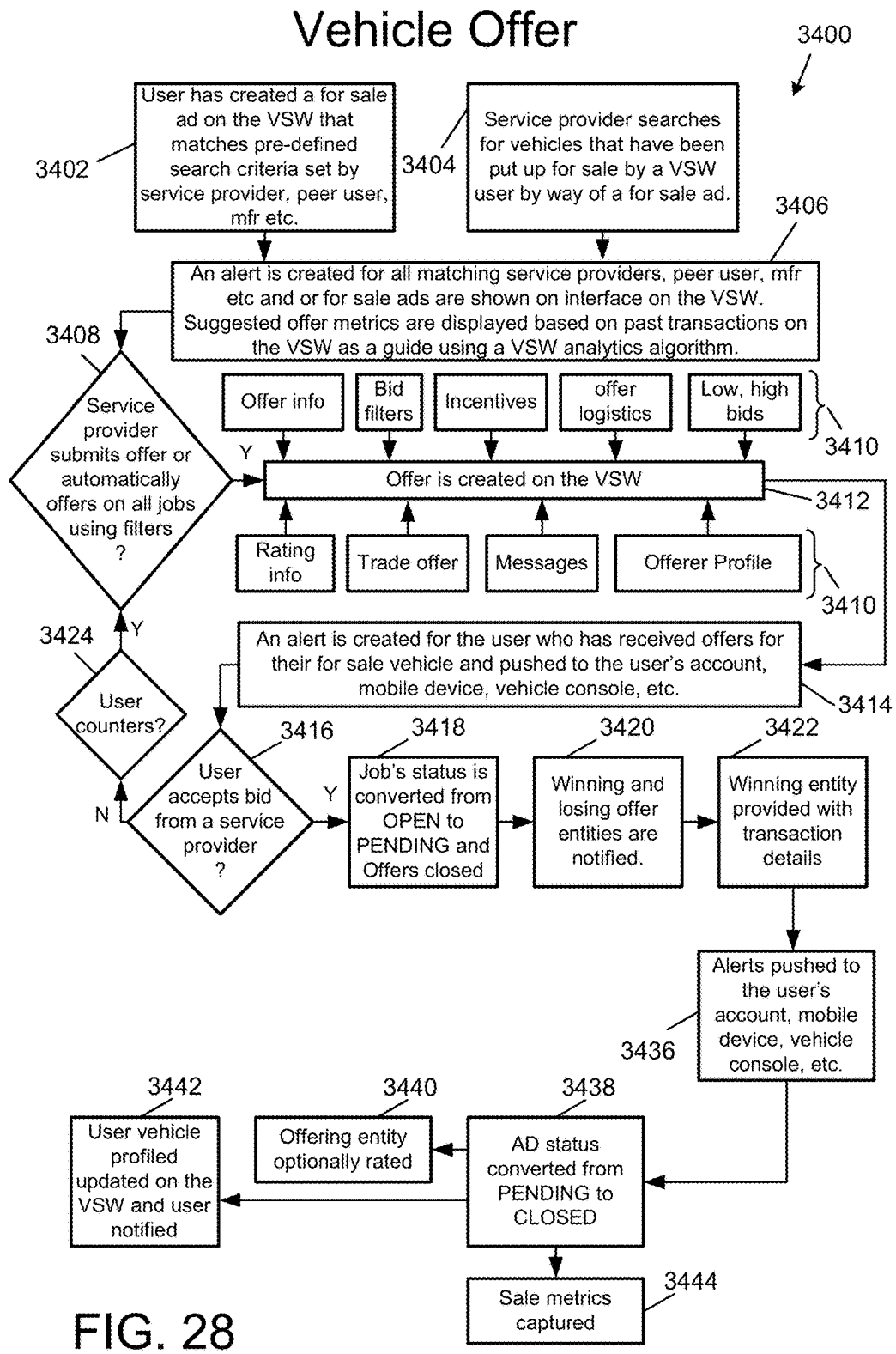
FIG. 28 illustrates one possible flow of events, actions and decisions useful for updating, managing and administering offers for vehicles that are for sale on the VSW as well as generating alerts on the VSW for service providers and or advisors, vehicle owners and others to select from along with associated triggered events.

FIG. 28 describes one possible flow 3400 of events for offers to be submitted in response to vehicle for sale ads on the VSW. Possible triggers could instigate an action for a user to take regarding offers for a vehicle that has been posted for sale on the VSW. In one trigger 3402, a user has created a for sale ad on the VSW that matches pre-defined search criteria by an entity on the VSW. In a second trigger 3404, an entity manually searches for vehicles for sale on the VSW. Either trigger 3002 or 3004 would instigate the VSW algorithms to create alerts or real time results for entities requesting to find ads for vehicles for sale that match their search requirements in 3006. The VSW in 3408 will then determine if the entity on the VSW has decided to submit an offer for a vehicle that is for sale on the VSW or if any entity has opted to automatically make offers for matching ads for vehicles for sale. If either of the preceding is true, an offer is created on the VSW in 3412, which is supplemented by various manually entered or automatically aggregated data points 3410 by the VSW.

The data points may include offer info such as the basic offer terms, offer filters to ensure that the offer is for the intended ad, incentives such as a rebate on a new vehicle or trade in if the vehicle's owner accepts this offer, offer logistics including data regarding the location or radius in which the offer is valid, low and high offers in case there is a bidding war, rating info from the entity that is submitting the offer to give the vehicle's owner an indication of how serious the offer submitter may be, trade offer and supplemental information such as cash plus trade suggestions, personalized messages, and the profile for the entity submitting the offer for the vehicle's owner to review before accepting any offer from the submitter.

In one embodiment, an alert is created in 3414 for the user that has created the ad for the vehicle that is for sale containing the full aggregated information of the offer that has been submitted. The VSW in 3416 will then poll the user in the VSW to determine if the user that posted their vehicle for sale has accepted the offer presented to the user from the offer submitter. If the user does not accept the offer, the user can elect to either counter offer or dismiss the offer all together. If the user counters, the user then returns to a state of waiting for the new offer to appear or an offer to appear in response to the counter. If the user accepts the offer the for sale ad's status is converted from OPEN to PENDING and no further offers can be accepted in 3418. The winning and losing offering entities are notified in 3420 at which point the winning entity in 3422 is presented with transactional details. Alerts are pushed to both the ad poster and winning offer submitter's VSW accounts in 3436. The ad status is then converted from PENDING to CLOSED in 3438 at which points sale metrics are captured in 3444 such as but not limited to the length of time the vehicle was for sale, the original asking price, the actual sale price, the sale terms, the sale conditions, the sale properties such as trade in, cash, credit etc. The winning offer entity is optionally rated in 3440. Both the ad submitting entity and the offer submitting entities' profiles are updated on the VSW and they are notified of the metrics and updates in 3442.

In one embodiment, provided is an ecosystem where centralized and distributed data centers and computing centers interact with each other with the use of cloud services, wired and/or wireless connections, to transmit data between vehicles, the computing systems, users and their network connected devices and third parties. This ecosystem is useful for associating a vehicle to a user account, transmitting and receiving data with a vehicle and/or network of connected device, receiving and identifying vehicle conditions, searching or correlating data useful for identifying possible vehicle conditions that may have occurred in the past, generating appropriate alerts for users of vehicles to take action and binding a vehicle condition to a status on a system that can allow third parties to diagnose and/or bid to complete necessary work required based on what the system has determined is the actual or possible condition of the vehicle.

In one embodiment, a vehicle is registered on a VSW application running in a centralized or distributed system. As used here, a VSW application can be defined in various forms. For instance, the application can be in the form of an APP on a user device or vehicle, and servers of a provider will interact with the APP and cloud services. The servers and APPs can, for instance, be offered a vehicle maker. In a like manner, each vehicle maker can have its own servers and APPs. In alternate configurations, servers and APPs can be defined and managed by a service that allows process for any vehicle type/brand. In such alternate configurations, the service can share information to enable more accurate determination of alerts that affect similar vehicles or parts of vehicles.

The example systems, therefore enable a connection with a vehicle and the vehicle supplies the VSW with its condition. The condition may include failure or alert data in the form of symptoms and/or conditions. In other embodiments, the alter can specify the actual symptom.

In one embodiment, the VSW can search for possible failure causes using a symptom matching and ranking algorithm that can return a list of possible failures and actions required or recommended. The list of possible failures is run through an algorithm that can allow the VSW determine a level of confidence. The level of confidence is assigned to the diagnosed failure, which may apply or correlate to the set of symptoms or alerts the vehicle is reporting.

Once the VSW determines the most likely causes of the vehicle failure, the VSW can select data for notification to the user (e.g., or account of the user) of the vehicle. The notification, having information of the likely failure/symptom/alert, can provide simply options to the user. The options can be in the form, for example, of a description, chart, lists, icons, data, text, audio, voice messages, or combinations thereof. The notification, when provided in an interface of an APP or website, can also include selection options for the user. The selection options can be, for instance, a button to click on a user interface.

One of the buttons can be, for example, allowing the user to create an entry/request with the VSW to allow bidding of the repair. The entry can include pertinent information regarding the failure and the symptoms along with corre-lated parts the fix may need as well as any associated repair manuals and steps. Bidding can then take place by third party advisers and service providers.

Figure 29:
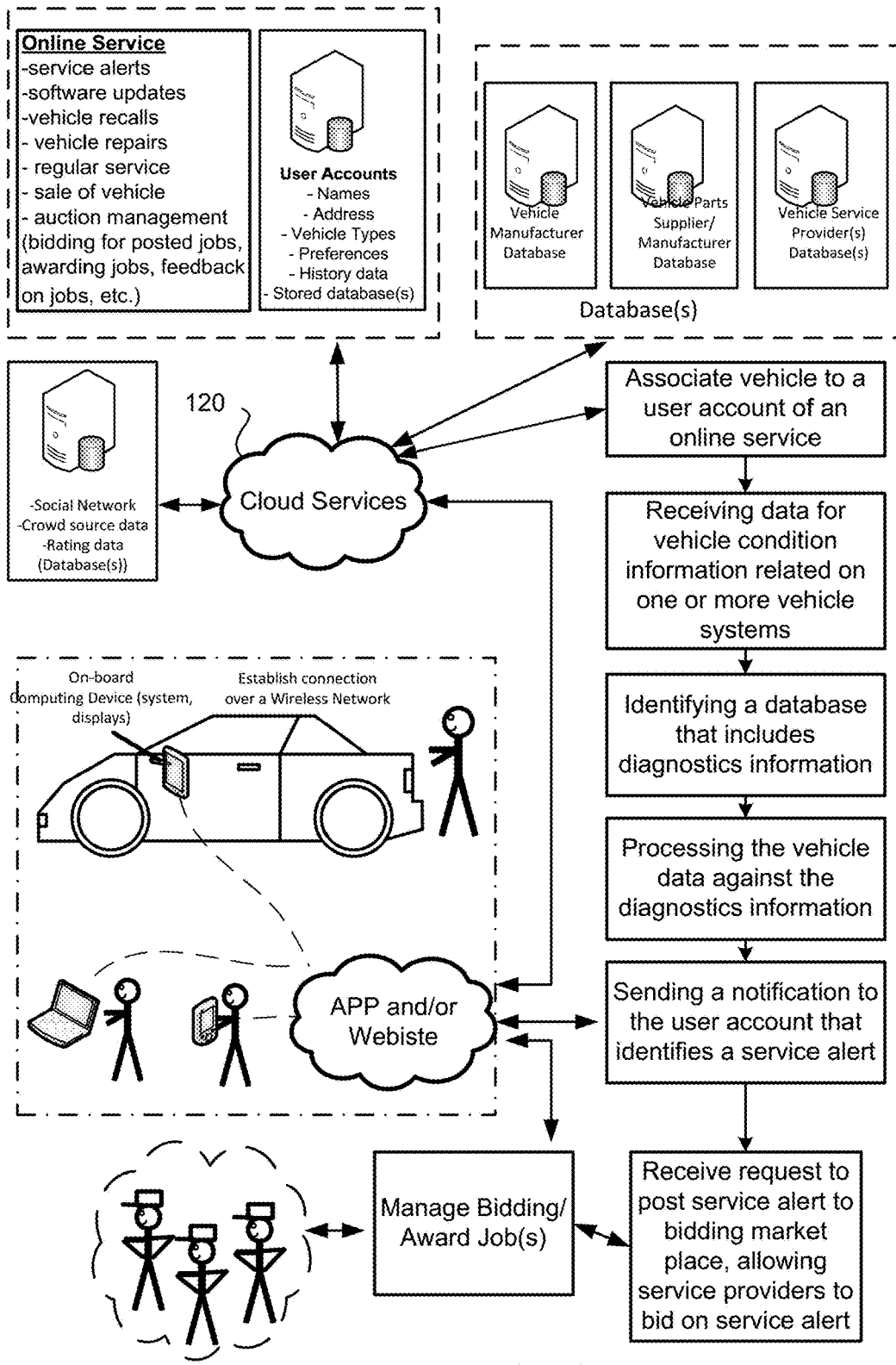
FIG. 29 illustrates one possible ecosystem where a network and or cloud services running within or using a network can connect in a wired or wireless fashion with other networks including but not limited to social networks, networks containing user account information within a centralized or distributed storage system, ancillary databases with vehicle, supplier and services information.

FIG. 29 describes one possible ecosystem where a network and/or cloud services running within or using a network can connect in a wired or wireless fashion with other networks including, but not limited to social networks, networks containing user account information within a centralized or distributed storage system, ancillary databases with vehicle, supplier and services information.

In the embodiment of FIG. 29, a vehicle electronics can communicate with a network. The network, for instance, can be a connection to the Internet. The connection to the Internet will provide access to cloud services 120. The cloud services enable connection to online services. The online services can access data and logic, which may be managed in various databases. In one embodiment, the online services can include social network data. The social network data can be, in one embodiment, related to vehicle repairs, issues, comments, groups, or communities. In one embodiment, the data obtained by the social network can be passively collected and shared, provided privacy privileges are maintained. The data collected from sharing, in one embodiment, is referred to as crowed sourced data. The identity of the sharing person or entity may not be needed. In some embodiments, a vehicle manufacturer may simply share repairs made for specific alerts.

Over time, the sharing by the vehicle manufacturers will grow to generate more data that can be analyzed to identify similarities, repeat events, and such processes can be used to identify a confidence level for the possible alert. The crowd sourced data can be blended with data obtained from various databases and entities. In one embodiment, as more data is accessed by cloud services, the interconnections in the data, similarities and patterns can be identified with a higher confidence score. The confidence score can range, for instance, between 1 and 100 percent.

In some embodiments, cloud services will not actually identify or suggest the symptom or cause until a the confidence score has reached some threshold. For different symptoms, the threshold may be different. For example, if the alert is associated with significant safety part of a vehicle (e.g., brakes), then the threshold may be lower, so that the user gets notified early, even if it later turns out to not be related to brakes. Alternatively, if the alter is regarding the air conditioning, the threshold may be higher, so that the user is not prematurely provided with a notification identifying the possible condition.

As further shown in FIG. 29, the databases can be from social networking sites, message boards, community online postings, crowed sourced databases, rating databases, vehicle manufacturer databases, service provider databases (e.g., service stations, repair shops, etc.). In one embodiment, if data is obtained from various sources, the data can be regarded as crowd sourced, as the data in the sources obtained from more than a single source.

In one embodiment, the vehicle is associated to the user account of an online service. As discussed above, the service may be provided by one vehicle manufacturer, or by multiple vehicle manufacturers, or by third party sites or services. The user account will identify the user and the vehicle(s) that the user has associated/registered with the service. The user account will also hold history data. The databases of the service may therefore store history data of many users and vehicles. This data itself can provide significant information to allow identification of possible conditions for alerts associated to the vehicle.

As further shown, the vehicle can, in one embodiment, provide data associated with its condition information. The condition may be provided to the service, even though the vehicle is not showing an alert. The server(s) of the service can identify and connect to one or more databases to find data that for a vehicle like that of the user or similar to the user. The condition information is then processed by the servers of the service. The processing can occur each time the vehicle transmits condition information, or can occur periodically, or on demand. In one embodiment, the vehicle simply transmits condition information over time, or when internet connection is present. In one example, the communication of information is not made because the vehicle is experiencing a fault. In fact, in this example, the vehicle may appear to be operating properly.

The processing can detect and/or predict, however, that some symptom may occur. For example, if the vehicle type (e.g., brand, year, model) experiences a radiator break at about 63,000 miles, the user can be notified that some condition may produce an alert. In this manner, the user is provided with a recommendation to attend to a preventative action, before the actual failure occurs. In one embodiment, the communication with the service can occur on demand, or at the request of the user. For instance, the user can access his account and select to run processing. The processing can run analysis of received condition information and check it against databases, which may include crowd sourced data. The processing can then trigger a notification of a service alert or alert.

The notification can include information of what condition exists, what condition may occur, what actions to take, what recommendation exits for the condition, what others have done to handle the alert or condition, what level of success others have had with specific repairs, and a level of confidence for the recommendation. In one embodiment, the recommendation can include other possible conditions, for instance, less likely conditions and recommendations. These other possible conditions can be, for example, alternate repairs or alternate possible conditions. Accordingly, it should be understood that crowd sourced data should include data obtained from various disparate sources, from individuals, from rating services, from vehicle manufacturers, from parts suppliers, from social networks, from history databases of user accounts, from a combination of database data, from processed data obtained from various databases, etc.

By crowd sourcing data, more information can be obtained, which allows the processing and logic to generate recommendations with higher levels of confidence. For example, if more data indicates that users/vehicles are reporting a particular symptom, and the type of vehicle is known, the recommendation can be made with a higher level of confidence that the recommendation will serve to address the actual source of the alert or service alert or condition.

In one embodiment, the notification can be sent to the user's account. The user's account can provide notifications to the user via a mobile device or any connected device having access to the service. Additionally, the notification can be provided to the vehicle, and the notification can be handled on the vehicle display. The notification, as it is provided to the user's account, it can be handled and seen via any device having access to the service.

In one optional embodiment, information in the notification can be provided to a bidding market, at the request of the user. The bidding market is a system, which allows the user to post data concerning the notification. The posting can be, for example, a job request. Service providers, such a service stations, advisors, shops, etc., which subscribe to the bidding market place, can view the open jobs. The service providers can filter to view only jobs they want to bid on, and/or can be notified when specific type of jobs are available. In this manner, certain repair shops that specialize in a type of repair can immediately see what jobs matching their specialty are available, and they can then bid on the jobs. If the service provider is a specialist for a job type, it is likely that they will provide the best price to the vehicle owner and can still make a profit, due to their specialization.

Figure 30:
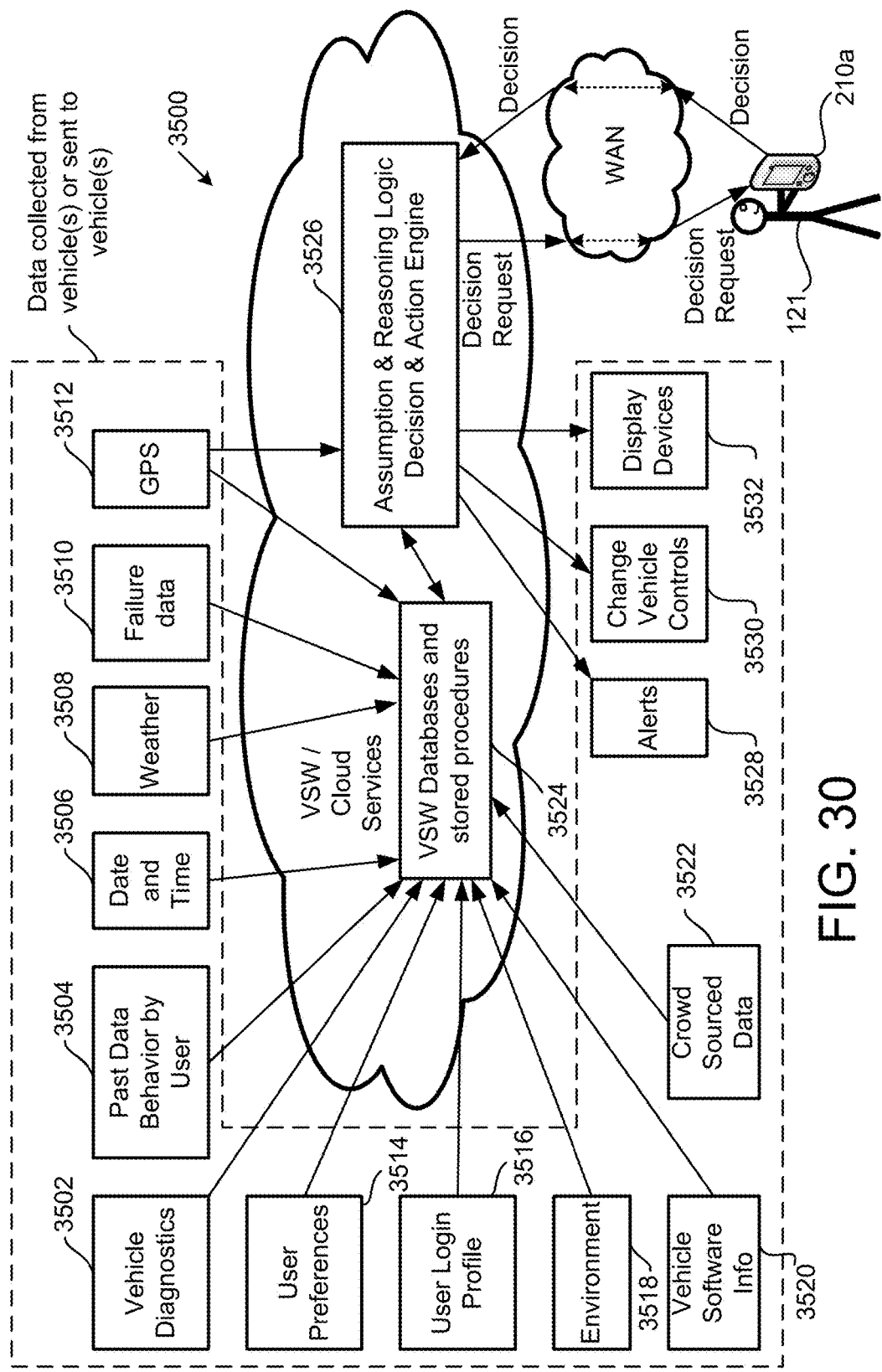
FIG. 30 illustrates how an application such as VSW can reside on cloud services in a centralized or distributed fashion in which stored procedures, algorithms and networked connections are used to collect data from a vehicle and its environment, process the data, organize the data, compare the data with existing data, produce assumptions using stored logic procedures and create alert/actions which are distributed to affected users. The VSW can then take the data, user input and user decisions to update and further refine predictive, assumption and reasoning algorithms as well as create workflows based on the data provided in the decision process when a user is polled.

FIG. 30 shows examples of how data that is collected from and transmitted to vehicles is used in conjunction with stored procedures, databases and logic to produce workflows, predictions, assumptions, alerts and vehicle user polling for decision inputs.

In one embodiment, a vehicle may establish a connection with a VSW in which the vehicle reports problems. The vehicle provides not only the symptoms of the problems but also provides other prices of data that will help the VSW pinpoint what the problem may be. Some of this ancillary data may include but is not limited to vehicle GPS data, failure metrics, the weather when the failure occurred or occurs, the data and time when the failures occur or when they occur the most, past data and/or behavior of the vehicle when the problems occur, vehicle basic raw data diagnostics, user preferences, user login information, the environment, vehicle software information, crowd sourced data of all the preceding as well, and/or past alerts.

The VSW may also send alerts to the vehicle, change vehicle controls, update software and display devices to warn, poll or ask for a decision from the vehicle's owner. The data that is collected from the vehicle may be sent to the VSW's databases, which can help create instances of the symptoms with associated data. This data is collected and then processed through an assumption and reasoning algorithm, which uses the vehicle failure data to try and determine what the problem may be with the vehicle. Once the VSW determines what the problem may be with a certain degree, e.g., level of confidence, an appropriate alert can be sent to the user of the vehicle (e.g., by way of a notification).

If the VSW has determined for instance that the vehicle needs a simple software update, the VSW will poll the user using an alert and request that a decision be made to update the software or ignore the recommendation (e.g., for later handling). If the user decides to update the software, the VSW will establish connection with the vehicle (if not already connected) and update the software remotely (e.g., using servers of the VSW (e.g., service)). If the problem is determined to be a more intensive repair or a major fix, the VSW will inform the user via alert. For example, the notification can inform the user that the repair needed is that the transmission be replaced, and the user is provided with an option to add the job for bidding. The job can then be bid on by providers that are able to handle the transmission repair.

As further shown in FIG. 30, the cloud services can access various databases, generate alerts and provide recommendations. The recommendations can be provided, for example, once the confidence level has reached a threshold. The alert can then be provided to the user/user account, based on the assumptions, reasoning, and logic processing performed on the data. The assumptions can include, for instance, determining that other users have performed the same fix for the same alert, that the fix has indeed repaired the issue, that the crowed sourced data indicates or suggest that the fix will be successful, that the conditions that are occurring occur given the same circumstances. The circumstances can include, in one embodiment, the same or similar temperature, the same or similar weather, the same or similar geo-location, the same or similar symptoms of the parts or components of the vehicle, the same or similar times of day, etc. Using at least this data, the reasoning can determine that that since the same or similar issues occurred on other vehicles and the same or similar repairs or acts solved the issue, the recommendation can be made with a level of confidence that exceeds some level of threshold for that repair, condition or alert(s).

Further shown in FIG. 30 is block 3500, including various data types, which may be obtained to perform the assumptions, reasoning, decisions, and actions, by engine 3526, in one embodiment. In the example, without limitation, databases, data sources, or data, can include vehicle diagnostics 3502, past data behavior by users (e.g., vehicles of users) 3504, data and time data 3506, weather data 3508, failure data 3510, global positioning (GPS) data 3512, user preferences 3514, user login profiles (and associated data in the profile, e.g., history) 3516, environment data (e.g., weather, current conditions of traffic, emergency data, reported accidents, congestion of traffic, collisions, etc.) 3518, vehicle software information 3520, crowd sourced data 3522 (e.g., crowd sourced data can include data obtained from more than one database, which in essence includes data from more than one individual or vehicle) 3522, alerts (e.g., alerts generated over time, and current alerts, and alerts generated by other vehicles over time) 3526, changes in vehicle controls 3530, display devices (e.g., changes in user interface conditions, displays, instrument panels, auxiliary displays, etc.) 3532. The databases and/or stored procedures can be accessed by cloud services in 3524, and communication can be made to and from other logic.

In one embodiment, one or more servers can execute logic to process the data, to obtain data from various vehicles and then produce recommendations to specific vehicles. The logic 3526 can then process the data obtained to implement reasoning, assumptions and take actions. In one example, the user 121 can be notified of the recommendation, which may request a decision from the user. The recommendation, message, signal, data or information can be provided to the user's account. The account can be accessed via any device, such as mobile device 210a. Decisions can then be made and communicated back to cloud services. These decisions are, as is other data, processed for making future decisions (e.g., which can be, in one example, considered crowd sourced data).

Figure 31:
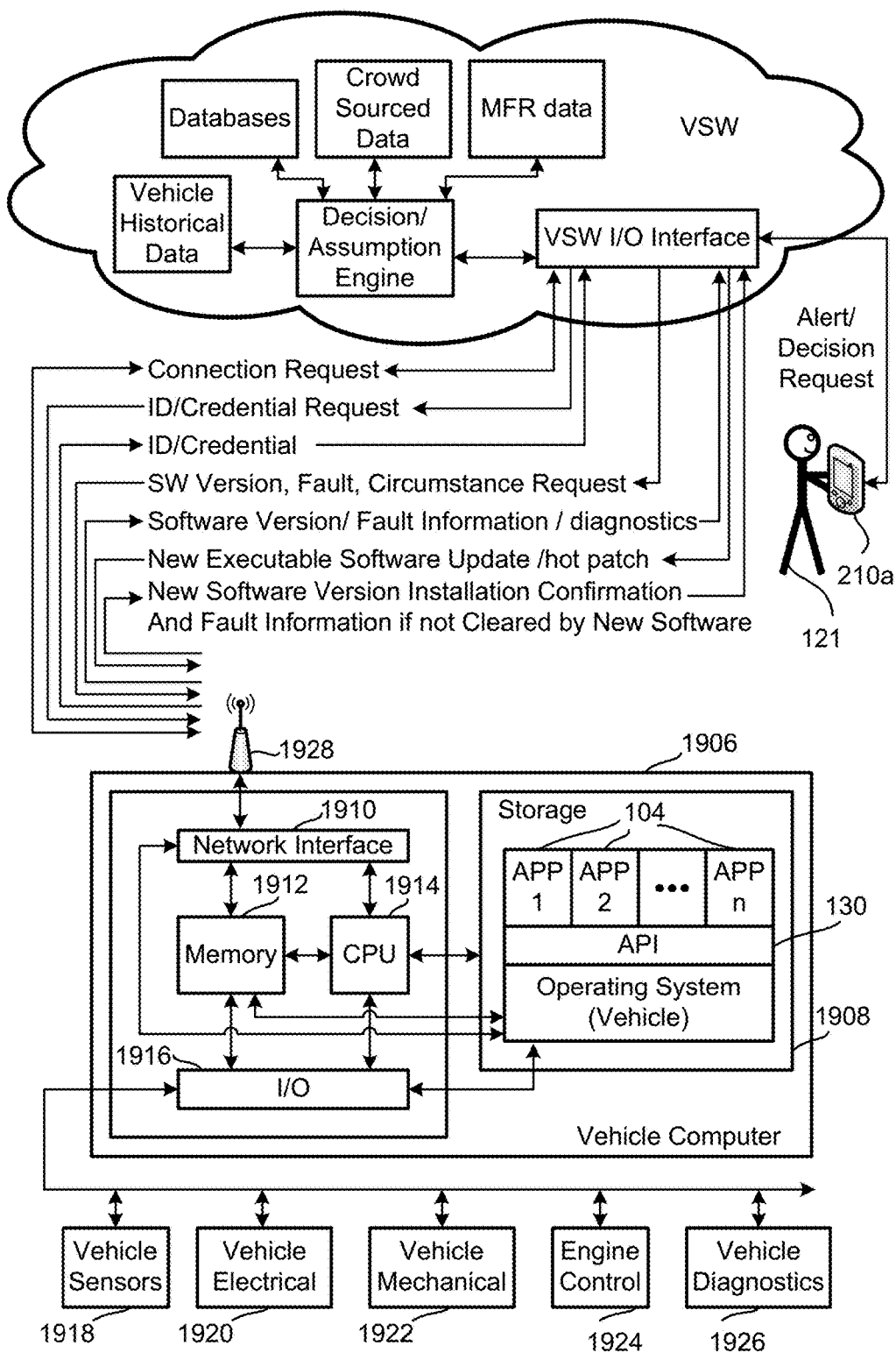
FIG. 31 illustrates one possible method out of many in which a vehicle's electronics including its operating system, memory, input output sources, CPU, network interfaces, antenna, sensors, electrical systems, mechanical systems, engine control systems, and vehicle diagnostics can work together to establish connection with, transmit to, receive data from an application such as a VSW using a network connection.

FIG. 31 shows one example of a vehicle's computer using a wired or wireless network to establish a data transmission stream/communication between an application, e.g., such as a VSW running on a centralized or distributed network, in accordance with one embodiment.

In one embodiment, a vehicle's computer establishes a connection with a VSW where the vehicle requests to establish a connection or the VSW requests to establish a connection with a vehicle. The VSW requests for the vehicle to provide ID and/or credential information. The vehicle then sends ID and credential information to the VSW. The VSW then requests for the vehicle to update the VSW on its status, software version, condition, any fault or fault symptom information, or any raw diagnostics information. The Vehicle responds with the requested data. The VSW then uses the data provided by the vehicle in conjunction with vehicle historical data stored on servers used or accessed by the VSW, databases used by the VSW, crowed sourced data, and manufacturer data among other data points to interface with the user. In this case the VSW let the user know that based on the fault data reported by the vehicle, the VSW has determined that the faults can be easily cleared/handled by installing an on-the-fly hot patch software update. In this example, the VSW determined this because it compared the set of vehicle faults to the faults present in past failures and resolutions from other users. The user decides to install the hot patch at which point the hot patch is delivered to the vehicle using the network connection. Once the vehicle has installed the hot patch it responds back with the latest version of the running software for verification by the VSW.

In one embodiment, the vehicle may use any computer or computing resource on board or remote computer to interact with the VSW. In this case, the on board computer was used to interact with the VSW. The on board computer uses software to communicate with the rest of the vehicle's sensors, electrical systems, mechanical systems, engine control systems and diagnostic systems to report the raw data back to the VSW using the computer's algorithms and network interface. The data the vehicle collects and transmits may not be meaningful to the user of the vehicle or the vehicle itself, but the VSW can use the data to make assumptions, predictions and decisions based on logic that assembles the data provided by the vehicle and other vehicles in a meaningful manner. For example, in light of the collected data from other vehicles, certain patterns, resolution reports, faults, similarities, and/or data can identify what the data means and such can be used to provide recommendations. Such recommendations can be provided with a confidence level, and that level can be filtered based on assigned thresholds for the type of alert.

Figure 32:
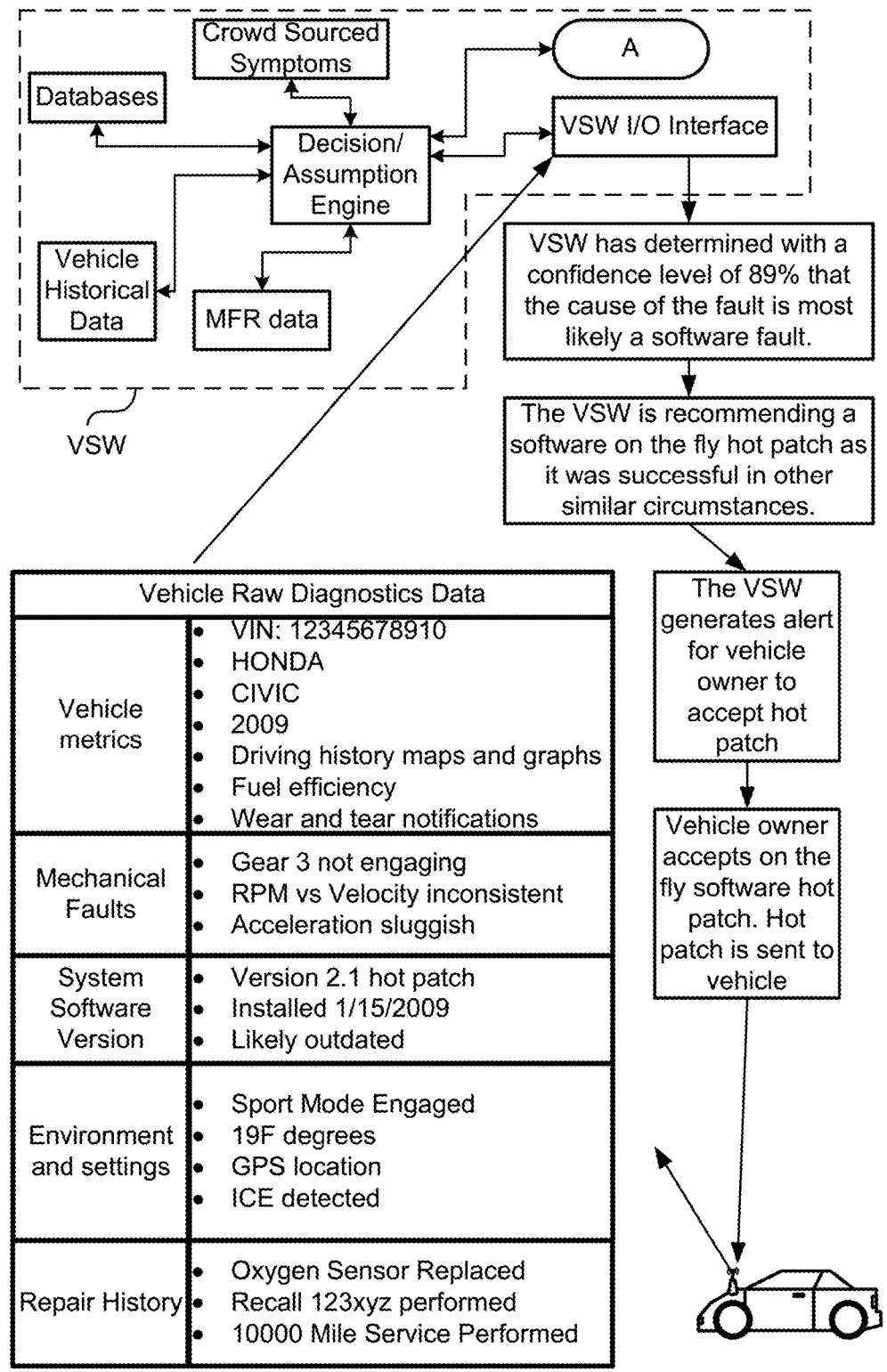
FIG. 32 further illustrates one possible data set that may be shared by a vehicle with the VSW. The may share including but not limited to vehicle metrics, mechanical faults, system software version, environment and settings and repair history among other data points.

FIG. 32 illustrates one possible set of data points that a vehicle may share with the VSW when it is reporting faults, conditions, symptoms, or raw data. In this example, the vehicle is reporting that it is a 2009 Honda civic with VIN 12345678910. In other embodiments, the vehicle ID is a masked to preserve privacy of the user, or actual identification of the actual vehicle and/or user. The vehicle may also share its driving history, fuel efficiency as well as wear and tear information. Again, this shared information may be filtered (or masked, or scrambled, or encrypted) to avoid sharing identifying information of the actual user or the actual vehicle.

In one example, the vehicle may also report certain faults such as the fact that gear #3 is not engaging. The engine revolutions per minute does not correlate with the calculated velocity, and that the acceleration performance is below normal. The vehicle may also share with the VSW which version of the vehicle software it is running, in this case, the vehicle is running version 2.1 via hot patch. The date it was installed is also shared as well as the fact that it is likely outdated due to the fact that it was installed beyond a date of validity or support. Not only does the vehicle report the physical fault symptoms, but also environmental and circumstantial data, such that the vehicle's sport mode is engaged during the faults, it is 19 degrees C. (e.g., temperate-weather) outside when the faults are occurring, the GPS location of the vehicle in traditionally icy areas, and that ice has been detected by the vehicle's sensors.

Repair history may also be shared with the VSW to ensure the data the VSW has matches what has been performed on the vehicle so that the VSW can diagnose the vehicle more accurately. This data is then compiled by the VSW and sent through an algorithm that determine the best possible match for the cause of the problem and possible fixes. The data that is collected from the vehicle is used in conjunction with VSW databases, crowd source data, vehicle historical data, manufacturer data, among other data points to run through an algorithm(s).

FIG. 33 shows a continuation (A) of FIG. 32, on accordance with one embodiment. In this example, vehicle data and associated data is compared with historical, crowd sourced and other stored or accessed data on the VSW databases. For instance, The VSW compares the vehicle symptoms, vehicle info and circumstantial data with all similar (or at least partially similar) data sets in the VSW databases.

In this example, the symptoms reported refer to the vehicle's $3^{rd}$ gear not engaging, RPM vs Velocity inconsistencies and acceleration difficulties. This was occurring on a 2009 Honda Civic with VIN 12345678910 while the sport mode was engaged, it was 19 degrees C. outside, with a given GPS location where ICE was detected by the vehicle, etc. As noted above, this analysis (or any data processing) can be performed in an anonymous manner, so that the VSW does not collect data that may be considered private to the user. In a similar manner, the data stored regarding any user account may be saved anonymously, so that that the data cannot be used without the user consent by any third party.

The VSW in one possible scenario comes across two seemingly similar occurrences by other users and their vehicles. In one occurrence, a 2008 Ford Explorer with VIN 198754213 (or other ID information that is not compromising of privacy settings) had problems with its $3^{rd}$ gear, RPM vs. velocity issues when the temperature was below freezing, its GPS was where ice may occur and ice was detected by the vehicle. The determination in that case was that there was a gear failure; the user created a job (e.g., using the bidding market place or via some other repair) and it was fixed. Although the VSW has determined that this incident was very similar to the current vehicle's failures, it was only 50% confident using matching and comparison algorithms that this was in fact the same issue the current vehicle is experiencing.

The VSW also returned another possible matching set of symptoms and failures from a past occurrence from another user. In this case, the vehicle reporting the problems was a Honda Civic just like the current vehicle, it was also close in manufacture year as the current vehicle, it too was having issues with its' $3^{rd}$ gear, issues with RPMs vs. velocity and its acceleration was sluggish. The sport mode was engaged just like the current vehicle and the temperature was below freezing as well.

The GPS data for the similar occurrence also detailed that the vehicle was traveling in an area where ice may occur and the vehicle detected ice. In this similar symptom set, the fault was determined to be that that sport mode was overriding the vehicle's limited slip differential causing it to slip in icy conditions. The action was taken that an on the fly software patch could be installed to alleviate the override of the sport mode in icy conditions. The action was deemed to be successful in that event. In one embodiment, past successful resolutions (e.g., success, no success, comments) can be used and added to databases for future data mining.

In one embodiment, the VSW has determined that this event has enough matching criteria to generate a confidence level of 89% for instance. Further, a threshold, for this type of event has been set to be, for example, at 80%. That means, that if the confidence level is at least 80%, then any confidence score greater than 80%, such as the 89% confidence score should produce an alert and/or notification. It should be understood that 80% and 89% have been used only as an example, and various percentages, such as greater than 50%, greater than 60%, greater than 70%, greater than 80%, greater than 90%, etc. can be used. The associated thresholds can also be set at different levels, based on the type of alert. As noted above, different or same thresholds can be assigned to different types of alerts, conditions and/or combinations of alerts, scenarios, conditions and/or events.

The VSW can, in one embodiment, take this information to create an alert for the user of the reporting vehicle in FIG. 32. The alert lets the vehicle user (e.g., via a user account) know what the problem with the vehicle is most likely to occur or is be based on the ranking, prediction and confidence level algorithm and also supplies the vehicle's user with the suggested steps to remediate the problem.

In the past, for this condition, installing a hot patch software update was successful in the similar case stored in the VSW databases so the VSW is suggesting the vehicle user accept the hot patch to fix the issues. The vehicle's owner may then accepts the remediation steps and the VSW establishes connection with the affected vehicle transferring and consequently installing the new hot patch software. The vehicle will then report back to the VSW if the action was successful.

In one embodiment, the VSW will then poll the vehicle to determine if the same (or similar) faults as before still exist. If the faults are no longer present, the fix was successful and this event along with the symptoms, metrics, faults, environmental and circumstantial data along with the subsequent fix and result are all stored in a database so that the VSW's assumption, prediction, ranking and confidence level generating algorithms are further refined and made more accurate (e.g., for future predictions and recommendations for this or other vehicles). As such, the more occurrences that are recorded via this method, the more precise the prediction, assumptions and confidence levels are for subsequent occurrences with other vehicles reporting problems to the VSW (or service(s)).

FIG. 33 describes how a VSW (or service) can take raw (or structured data) information and data points from a vehicle described in FIG. 32, to make logical and systematic comparisons with existing, past, and historical data. The VSW can condense a fault to a set of faults and symptoms along with accompanying circumstantial data to search for, rank, and list possible failure causes and associated successful remediation(s) associated with the fault in past occurrences. As noted above, as more data is collected over time, the data itself may expose one or more patterns and similarities. Intersections of such patters or similarities in the data can be used to identify possible causes for faults or conditions, which can then be used to provide recommendations to users. This data, as noted above, can include crowd sourced data, which can include social media data, data of users provide to service entities, data obtained from various databases on the internet, combinations thereof, and other examples described in this application and applications incorporated by reference herein.

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

It should be understood that various examples are shown herein, and the examples and figures should not limit a claimed embodiment to any specific example or figure. To the contrary, it should be understood that various embodiments are possible which can be made by combined features found in the illustrations, description and figures. Thus, some embodiments are possible for specific combinations of figures and parts taken from the various drawings, descriptions to define specific implementations, as supported by the description. Additionally, any of the flow diagrams should not require any embodiments to include any enumerated step, operation or order. Some operations may be taken in different orders from that show as examples in the figures, depending on the desired implantation, as supported by the description.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

What is claimed is:

1. A system of a vehicle, the system comprising:
   a wireless communication device providing the vehicle with access to a network for exchanging vehicle condition information with a server;
   an on-board computer of the vehicle configured for interfacing with vehicle systems and said wireless communication device, the on-board computer is configured to process input received from at least one vehicle interface of the vehicle and processing output via at least one vehicle output of the vehicle, the on-board computer is programmable to access a user account that is used to interface with said server;
   the wireless communication device is configured to send vehicle data, based on settings in the user account, to the server over the network for vehicle status information, the vehicle status information being for one or more vehicle systems of the vehicle, the server is configured to access at least one database that include diagnostics data for a vehicle type of the vehicle and access crowd sourced data for the vehicle type, the crowd sourced data includes comments received from one or more users of vehicles of the vehicle type that relate to the vehicle status information of one or more vehicle systems of the vehicle, the server is configured to process the comments to identify a descriptive condition derived at least partially from the comments related to substantially similar circumstances associated with a condition of the vehicle, the server is configured to automatically process the vehicle data that is received against the diagnostics data and the crowd sourced data, the processing is configured to select an alert from among a plurality of possible alerts, the alert being selected to describe the condition of a vehicle system of the one or more vehicle systems of the vehicle;
   the on-board computer is configured to output data using the at least one vehicle output to present the alert describing the condition of the vehicle system;
   wherein electronic keys are transferrable to a service provider for enabling the service provider to access the vehicle to handle the alert, the electronic keys are accessible by a device of the service provider with privileges for access of the vehicle;
   wherein use of the vehicle is recorded when the electronic keys are active, the use being made viewable by an administrator of the vehicle identified by the user account or another user account.

2. The system of claim 1, wherein the vehicle output is configured to additionally display or output a recommended solution for handling the condition, the at least one vehicle output being one of an audio speaker, a display screen, or message that is communicated to a portable device associated with the user account.

3. The system of claim 1, wherein the output data includes a link to a webpage that provides additional information regarding the alert and options for handling the alert, wherein one option includes,
   enabling posting the alert to an online bidding service, or
   enabling service providers access a website of the online service to view the alert, the access enabling service providers to bid for handling the alert and notifications regarding awarding of a job to handle the alert based on one or more bids.

4. The system of claim 1, wherein the output data is a notification sent to the user account for access from one or more of a mobile device, a computing system of the vehicle, or a user interface of a website that is accessible for the user account, or a computer terminal, or personal computer.

5. The system of claim 1, wherein a client application is executed on the on-board computer of the vehicle, the client application is configured to process a plurality of routines that are configured to capture the vehicle data for the vehicle status information, the capturing occurring periodically by the client application, the client application configured to communicate with a server application of the server at predefined times or when particular conditions of the vehicle trigger the communication, or in response to a user input.

6. A system of a vehicle, the system comprising:
   a wireless communication device providing the vehicle with access to a network for exchanging vehicle condition information with a server;
   an on-board computer of the vehicle configured for interfacing with vehicle systems and said wireless communication device, the on-board computer is configured to process input received from at least one vehicle interface of the vehicle and processing output via at least one vehicle output of the vehicle, the on-board computer is programmable to access a user account that is used to interface with said server;
   the wireless communication device is configured to send vehicle data, based on settings in the user account, to the server over the network for vehicle status information, the vehicle status information being for one or more vehicle systems of the vehicle, the server is configured to access at least one database that include diagnostics data for a vehicle type of the vehicle and access crowd sourced data for the vehicle type, the crowd sourced data includes comments received from one or more users of vehicles of the vehicle type that relate to the vehicle status information of one or more vehicle systems of the vehicle, the server is configured to process the comments to identify a descriptive condition derived at least partially from the comments related to substantially similar circumstances associated with a condition of the vehicle, the server is configured to automatically process the vehicle data that is received against the diagnostics data and the crowd sourced data, the processing is configured to select an alert from among a plurality of possible alerts, the alert being selected to describe the condition of a vehicle system of the one or more vehicle systems of the vehicle;
   the on-board computer is configured to output data using the at least one vehicle output to present the alert describing the condition of the vehicle system, and further comprising,
      receiving data from the server regarding analysis of one or more bids received for handling the alert from one or more service providers;
      granting, in response to feedback from the user account, one of the service providers with a job to handle the alert, and
      sending over a network, electronics keys for access of the vehicle, to the service provider that was granted the job.

7. The system of claim 6, wherein the granting of the job is at least in part determined based on conditions for awarding the job as defined in a posting by a user of the user account, wherein one of the conditions is a price the user is willing to pay for handling the alert.

8. The system of claim 7, wherein one of the conditions is that the service provider has a predefined service rating or that the service provider is located within a predefined distance of an address.

9. The system of claim 6, wherein the vehicle output is configured to additionally display or output a recommended solution for handling the condition, the at least one vehicle output being one of an audio speaker, a display screen, or message that is communicated to a portable device associated with the user account.

* * * * *